United States Patent [19]

Moriyama

[11] Patent Number: 4,680,647

[45] Date of Patent: Jul. 14, 1987

[54] METHOD FOR RECORDING AND REPRODUCING VIDEO FORMAT SIGNAL

[75] Inventor: Yoshiaki Moriyama, Saitama, Japan

[73] Assignee: Pioneer Electronic Corporation, Tokyo, Japan

[21] Appl. No.: 654,694

[22] Filed: Sep. 26, 1984

[30] Foreign Application Priority Data

Sep. 26, 1983 [JP] Japan ............................ 58-178648
Sep. 26, 1983 [JP] Japan ............................ 58-178649
Sep. 26, 1983 [JP] Japan ............................ 58-178651
Sep. 26, 1983 [JP] Japan ............................ 58-178661

[51] Int. Cl.$^4$ .................................................. H04N 5/76
[52] U.S. Cl. .................................................. 358/343
[58] Field of Search .................. 360/19.1, 32, 33.1, 360/48, 49, 72.2; 358/342, 343, 335

[56] References Cited

U.S. PATENT DOCUMENTS

| | | | |
|---|---|---|---|
| 3,991,265 | 11/1976 | Fukuda et al. ................ | 360/19.1 |
| 4,295,154 | 10/1981 | Hata et al. ..................... | 360/19.1 |
| 4,402,021 | 8/1983 | Sonoda et al. ................. | 360/72.2 |
| 4,463,387 | 7/1984 | Hashimoto et al. ............ | 360/33.1 |
| 4,468,710 | 8/1984 | Hashimoto et al. ............ | 360/19.1 |
| 4,473,850 | 9/1984 | Foerster et al. ................ | 360/33.1 |

Primary Examiner—Donald McElheny, Jr.
Attorney, Agent, or Firm—Sughrue, Mion, Zinn, Macpeak & Seas

[57] ABSTRACT

A method for recording and reproducing a video format signal on and from a recording medium. A two-dimensional screen is divided based on the video format signal into a plurality of blocks with one of them being divided into a plurality of subblocks, and video information or information compressed on a time basis is inserted into each of the subblocks. Video information and control information are inserted in the remaining blocks while recording the information on the recording medium. The information in at least one of the subblocks is written into memory in a reproduction mode, and thereafter the information in the at least one subblock is read out of the memory while expanding the information on a time basis, and simultaneously writing the information next to the information in the at least one subblock into the memory, whereby the information in the at least one subblock and the next information can successively be reproduced.

17 Claims, 85 Drawing Figures

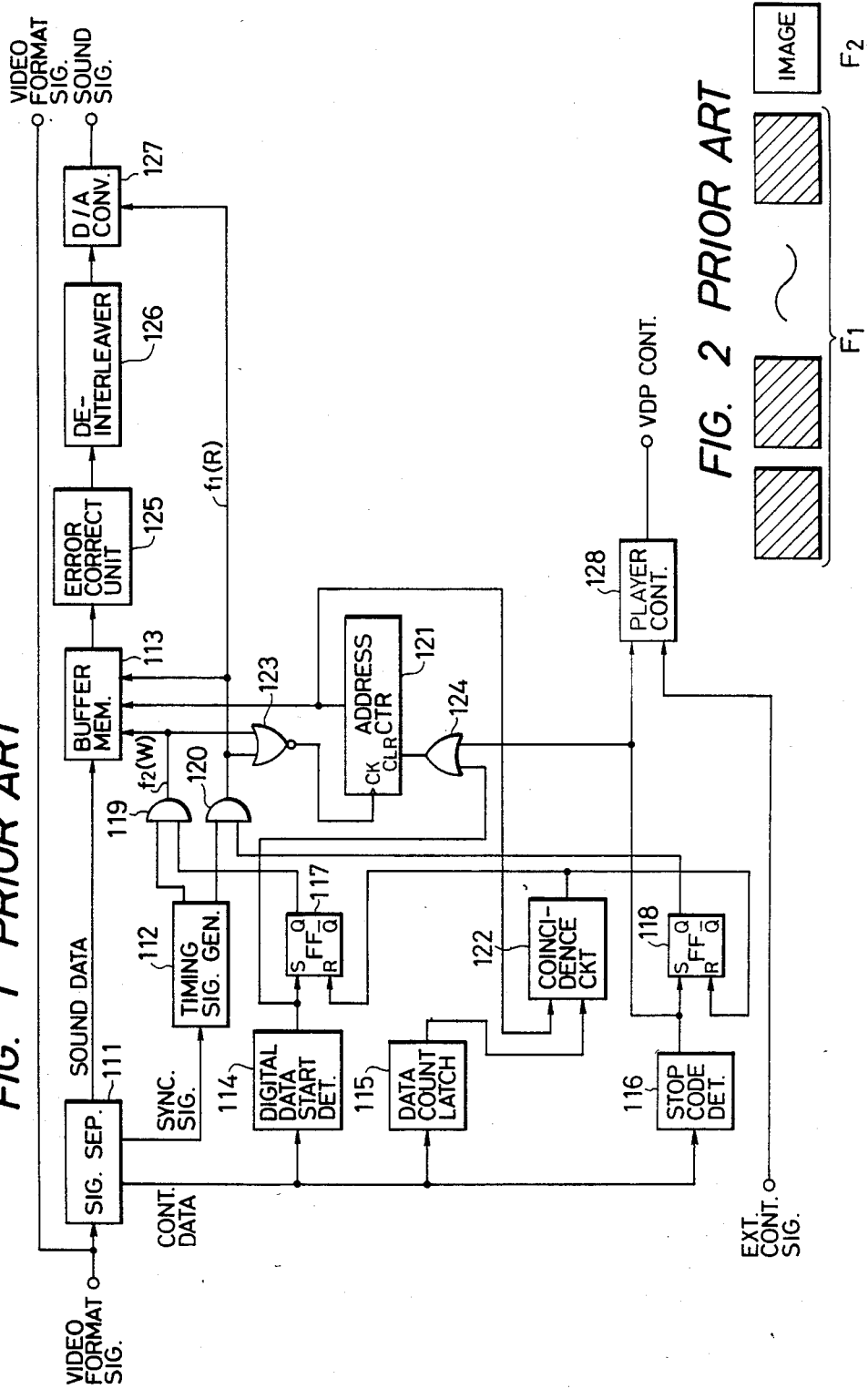

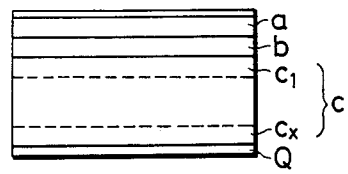
FIG. 3
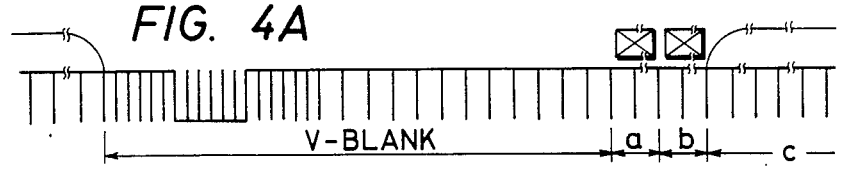
FIG. 4A
FIG. 4B
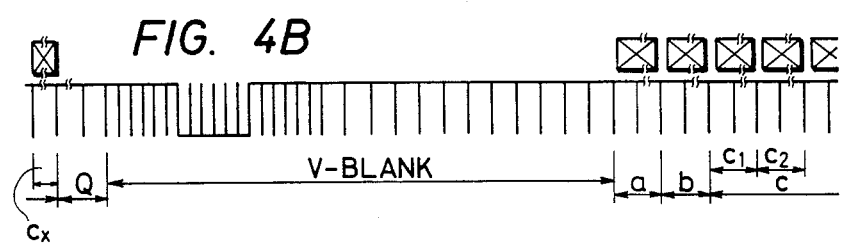
FIG. 5
| | | |
|---|---|---|
| a— | FIELD SYNC | 22 |
| b— | CONTROL CODE | 23 ~ 26 |
| c { | $C_1$ | 27 ~ 52 |
| | $C_2$ | 53 ~ 78 |
| | $C_3$ | 79 ~ 104 |
| | $C_4$ | 105 ~ 130 |
| | $C_5$ | 131 ~ 156 |
| | $C_6$ | 157 ~ 182 |
| | $C_7$ | 183 ~ 208 |
| | $C_8$ | 209 ~ 234 |
| | $C_9$ | 235 ~ 260 |
| Q— | BLANK | 261~262.5 |
FIG. 6
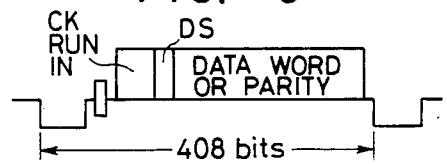

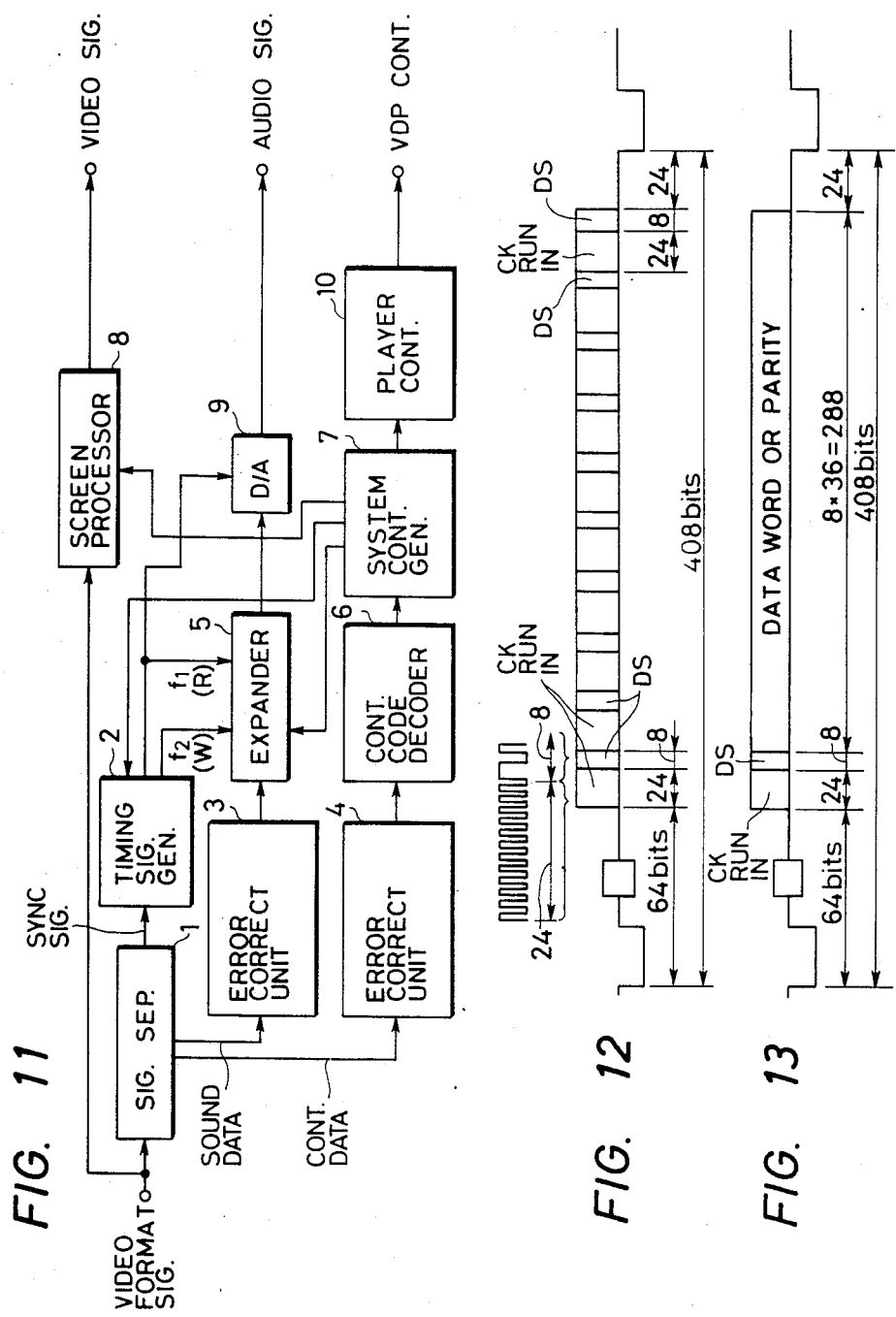

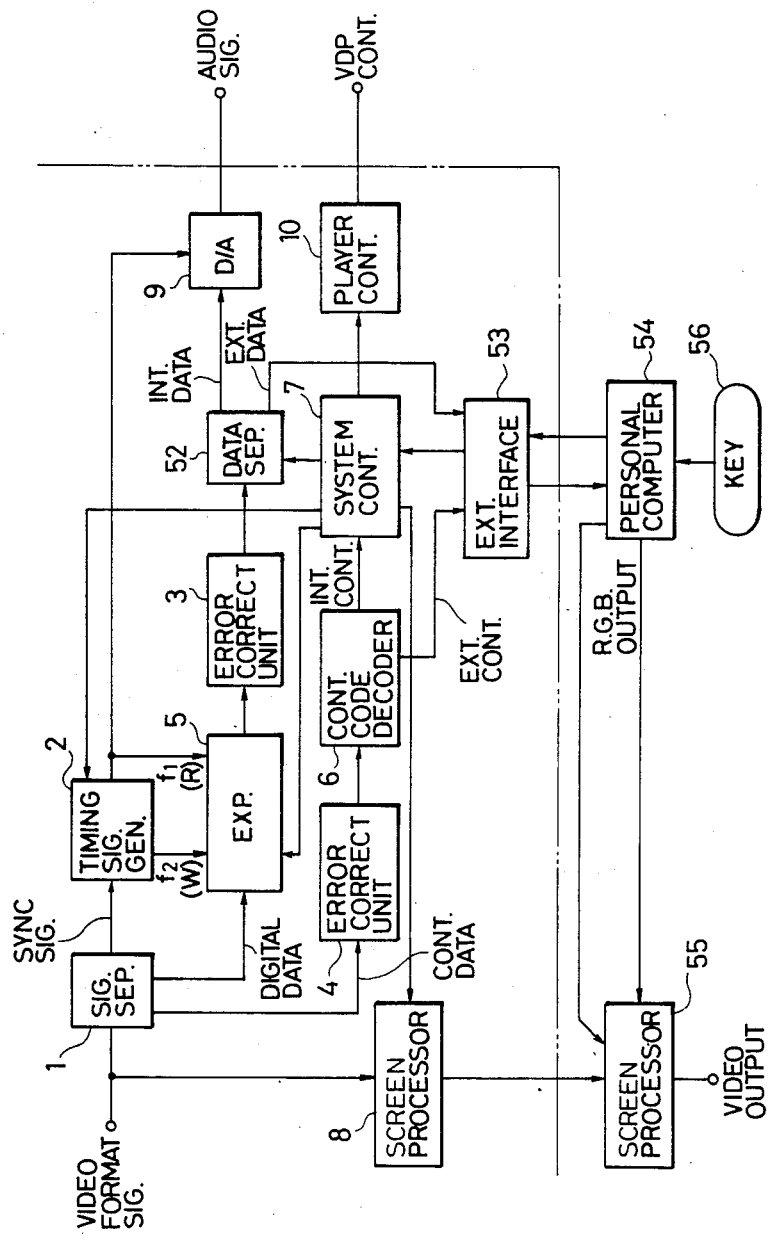

| FIELD NO. | SEGMENT NO. | BLOCK NO. | BLOCK COUNT NO. | DATA ID. CODE |
|---|---|---|---|---|
| 1 | 1 | 5 | 0 | 0 (SWS) |
|  |  |  | 1 |  |
|  |  |  | 2 |  |
|  |  |  | 3 |  |
| 2 |  |  | 4 |  |
| 3 | 2 | 6 | 5 | 1 (EXT.) |
|  |  |  | 6 |  |
|  |  |  | 7 |  |
|  |  |  | 8 |  |
| 4 |  |  | 9 |  |
|  |  |  | 10 |  |
|  |  |  | 11 |  |

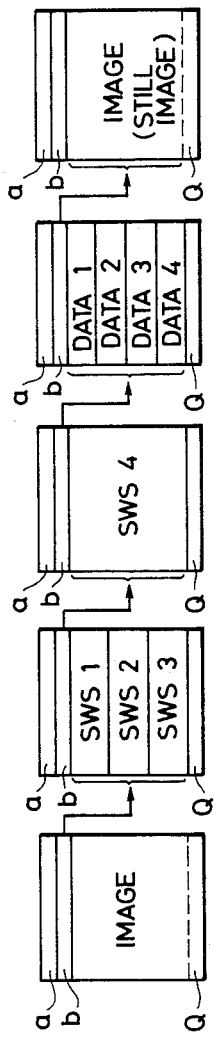

FIG. 31

| SYMBOL | CONTENT OF PROCESSING |
|---|---|
| AN | NORMAL SOUND (PLAYER) OUTPUT WITH MOVING IMAGE |
| AS | SOUND (COMPRESSED /EXPANDED) OUTPUT WITH STILL IMAGE |
| AM | AUDIO MUTING |
| PO | DIRECT OUTPUT OF IMAGE (VIDEO OUTPUT OF PLAYER) |
| PA | OVERLAY OF DATA ON PLAYER IMAGE |
| PM | IMAGE MUTING |
| DAW$Y_1Y_2$($X_1$~$X_6$) | WRITING OF COMPRESSED SOUND DATA IN BUFFER |
| DAR$Y_1Y_2$ | READOUT OF COMPRESSED SOUND DATA FROM BUFFER |

| SYMBOL | CONTENT OF PROCESSING |
|---|---|
| DCW$Y_1Y_2$($X_1$~$X_6$) | WRITING OF CHARACTER DATA INTO BUFFER |
| DCR$Y_1Y_2$ | READOUT OF CHARACTER DATA FROM BUFFER |
| DPC$Y_1Y_2$ | FOR COMPARISON WITH EXTERNAL INPUT DATA |
| INP | DATA INPUT FROM EXTERNAL SOURCE |
| OUT | DATA OUTPUT TO EXTERNAL DEVICE |
| SCT | OUTPUT OF DATA SPECIFIED BY EXTERNAL DEVICE |

$Y_1, Y_2, X_1$--$X_6$ : ASCII CODE INCLUDING NUMERICAL VALUES

| CODE OF (A) | CODE OF (B) | CODE OF (C) | CODE OF (D) |
|---|---|---|---|
| AM<br>PM<br>DAW01006018<br>DAW02006048<br>DAW03006078 | AM<br>PM<br>DAW04018144 | AM<br>PM<br>DCW01004536<br>DCW02004516<br>DCW03004556<br>DCW04004536 | AS<br>PA<br>SCT<br>DAR01006018<br>DAR02006048<br>DAR03006078<br>DAR04018144<br>SCT<br>DCR01004536<br>DCR02004516<br>DCR03004556<br>DCR04004536 |
| (37 byte) | (15 byte) | (48 byte) | (98 byte) |

FIG. 39

| STEREO | X | X | MONO | SWS | ch1 | ch2 | MUTE |
|--------|---|---|------|-----|-----|-----|------|

OUTPUT CONT. CODE (STEREO, X, X, MONO) | INPUT CONT. CODE (SWS, ch1, ch2, MUTE)

FIG. 41

| OUTPUT | CODE | ENERGIZED RELAY |
|--------|------|-----------------|
| STEREO | 80 (HEXADECIMAL) | RY 1 |
| ch 1 MONO | 14 (HEXADECIMAL) | RY 2, RY 4 |
| ch 2 MONO | 12 (HEXADECIMAL) | RY 2, RY 5 |
| SWS MONO | 18 (HEXADECIMAL) | RY 2, RY 3 |
| MUTE | 11 (HEXADECIMAL) | RY 2, RY 6 |

FIG. 48
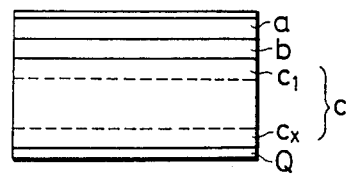
FIG. 49A
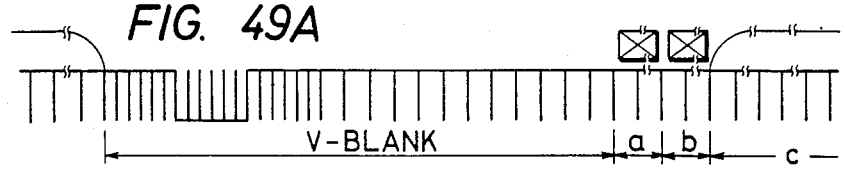
FIG. 49B
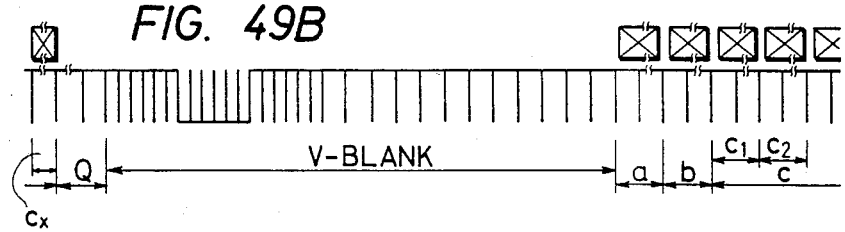
FIG. 50
| | | |
|---|---|---|
| a — | FIELD SYNC | 22 |
| b — | CONTROL CODE | 23 ~ 26 |
| | $c_1$ | 27 ~ 52 |
| | $c_2$ | 53 ~ 78 |
| | $c_3$ | 79 ~ 104 |
| | $c_4$ | 105 ~ 130 |
| c | $c_5$ | 131 ~ 156 |
| | $c_6$ | 157 ~ 182 |
| | $c_7$ | 183 ~ 208 |
| | $c_8$ | 209 ~ 234 |
| | $c_9$ | 235 ~ 260 |
| Q — | BLANK | 261~262.5 |
FIG. 51
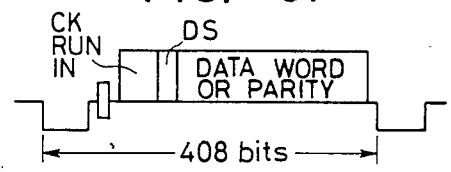

FIG. 52A  FIG. 52C  FIG. 52E
FIG. 52B  FIG. 52D
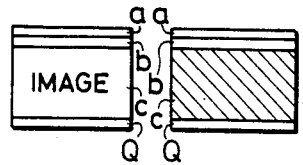 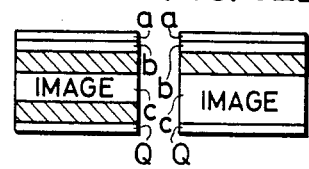 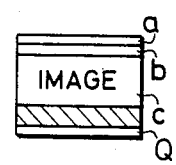
FIG. 53
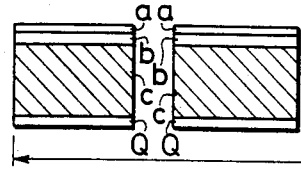 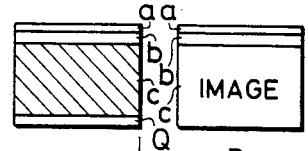
FIG. 54
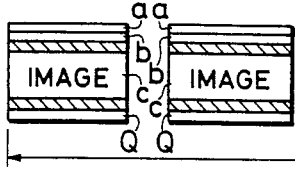 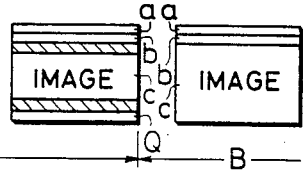
FIG. 55
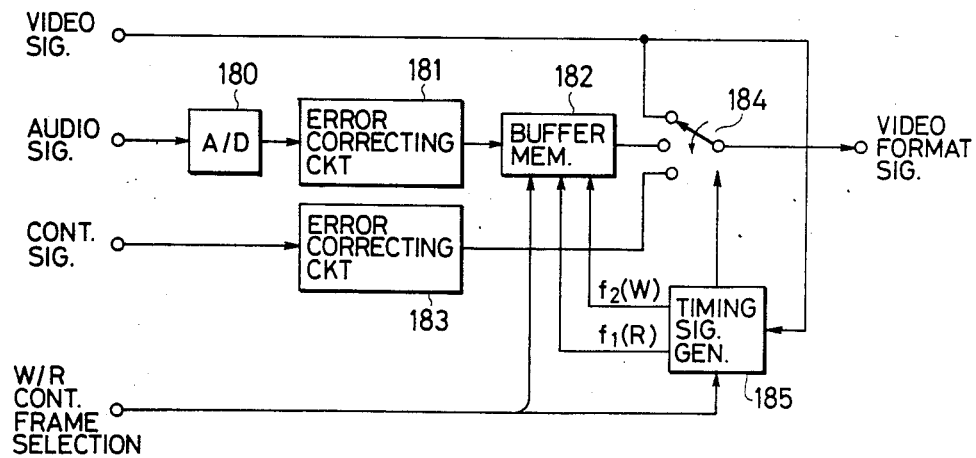

METHOD FOR RECORDING AND REPRODUCING VIDEO FORMAT SIGNAL

BACKGROUND OF THE INVENTION

The present invention relates to a method for recording and reproducing a video format signal, and more particularly to a system for recording and reproducing video and audio information as a video format signal on and from a recording medium.

For recording audio information accompanying video information on a recording medium at the same time the video information is recorded, there is known a method of inserting the audio information on a compressed time basis in a portion of a video format signal, and inserting the video information in the remainder of the video format signal. The audio information is recorded in a digitized form. More particularly, one sampled value of the digitized audio information is expressed by a prescribed number of bits constituting one word which is recorded. In reproducing the recorded information from the recording medium, it is necessary to achieve data word synchronization and clock (bit) synchronization when demodulating the video format signal.

Further, for recording audio information accompanying video information on a recording medium at the same time the video information is recorded, there is known a method of inserting the audio information on a compressed time basis in a portion of a video format signal, and inserting the video information in the remainder of the video format signal. With such a conventional method, the audio and video information is inserted in fixed patterns in the video format signal, and the video format signal is generated by the following processing: The analog audio signal is converted into a digital signal by a modulation process of high compression capability such as ADM (Adaptive Delta Modulation). The produced digital signal is interleaved or rearranged on a time basis, and thereafter a redundancy bit serving as an error correcting code which is completed in each block is added to the digital signal. The digital signal with the error correcting code added is then written at a sampling frequency $f_1$ into a buffer memory which compresses the signal on a time basis. The stored digital signal is thereafter read out of the buffer memory at a frequency $f_2$ higher than the frequency $f_1$ to thereby compress the audio information. The digital data including the audio information, and control data such as a digital start code indicative of a position wherein the digital data starts to be inserted, a stop code for commanding reproduction of a still image, and data count data representative of the amount of digital data are inserted into a desired block. Video information may sometimes be inserted in remaining blocks.

The video format signal thus produced is recorded on a recording medium, and the recorded information will be reproduced from the recording medium by a reproducing system. FIG. 1 of the accompanying drawings illustrates a sound adding device in such a reproducing system for adding sound to a still image obtained by an information readout device after the compressed audio information has been gained by the information readout device.

As shown in FIG. 1, a video format signal (FIG. 2) produced by a video disc player (not shown) serving as the information readout device is supplied through a video output terminal to an image reproducing device (not shown) and also to a signal separator 111. The signal separator 111 separates from the video format signal audio data composed of digital data including audio information, control data, and a synchronizing signal. The synchronizing signal issued from the signal separator 111 is supplied to a timing signal generator 112. The sound digital data issued from the signal separator 111 is supplied to a large-capacity buffer memory 113. The control data issued from the signal separator 101 is fed to a digital data start detector 114, a data count latch 115, and a stop code detector 116. The digital data start detector 114 generates a pulse when it detects a digital start code from the control data. The pulse from the digital data start detector 114 is supplied to a set terminal of a flip-flop 117, which produces a Q output of logic "1" in response to the pulse applied to the set terminal and a Q output of logic "0" in response to a pulse applied to a reset terminal thereof. Therefore, when the digital start code is detected, the Q output of logic "1" is produced by the flip-flop 117 and supplied as a write flag signal to an input terminal of an AND gate 119. The stop code detector 116 generates a pulse when it detects a stop code from the control data. The pulse issued from the stop code detector 116 is supplied to a set terminal of a flip-flop 118. Therefore, when a stop code is detected, the Q output of the flip-flop 118 becomes a logic "1" and is supplied as a readout flag signal to an input terminal of an AND gate 120. The data count latch 115 serves to store and hold data count data in the control data.

When data is to be written into or read out of the buffer memory 113, an address input terminal thereof is supplied with an output signal from an address counter 121 which specifies storage positions. The address counter 121 is a binary counter which counts upwardly in response to rising edges of pulses supplied to a clock input terminal thereof, and which holds an initial condition while a logic "1" is applied to a clear input terminal. The output signal from the address counter 121 is also supplied to an input terminal of a coincidence detector 122, the other input of which is supplied with an output from the data count latch 115. The coincidence detector 122 compares the output from the data count latch 115 with the output from the address counter 121, and issues a pulse when the compared outputs coincide with each other. The pulse from the coincidence detector 122 is supplied to reset terminals of the flip flops 117 and 118. Therefore, when all audio data separated by the signal separator 111 is supplied to the buffer memory 113, or all audio data is read out of the buffer memory 113, the Q outputs of the flip-flops 117 and 118 become a logic "0".

The other input terminals of the AND gates 119 and 120 are supplied with two pulse signals having different repetitive frequencies from the timing signal generator 112. The timing signal generator 112 produces such two pulse signals based on the snychronizing signal fed thereto. When the Q output of the flip-flop 117 is a logic "1" or the write flag is ON, one of the output pulse signals from the timing signal generator 112 is passed by the AND gate 119 to be supplied as write pulses $f_2(W)$ to the buffer memory 113. When the Q output of the flip-flop 118 is a logic "1" or the readout flag is ON, the other output pulse signal from the timing signal generator 112 is passed by the AND gate 120 to be supplied as readout pulses $f_1(R)$ to the buffer memory 113. The repetitive frequency of the write pulse signal $f_2(W)$ is higher than that of the readout pulse signal $f_1(R)$ to expand the compressed audio information. The write and readout pulse signals $f_2(W)$ and $f_1(R)$ issued from the AND gates 119 and 120 are supplied as inputs to a NOR gate 123, which issues an output to the clock input terminal of the address counter 121. When the buffer memory 113 is in a write mode in response to the write pulse signal $f_2(W)$ supplied thereto, the address counter 121 counts up a pulse to successively change the specified storage position each time the audio data is written. Likewise, when the buffer memory 113 is in a readout mode in response to the readout pulse signal $f_1(R)$ supplied thereto, the address counter 121 counts up a pulse to successively change the specified storage position each time the audio data is read out. The clear input terminal of the address counter 121 is fed with pulses supplied through an OR gate 124 from the digital data start detector 114 and the stop code detector 116, thereby initializing the address counter 121. Accordingly, when a digital start code is detected, audio data items are successively stored into storage positions in the buffer memory 113 which start from the storage position corresponding to the initial value of the address counter 121. When a stop code is detected, audio data items are successively read out of storage positions in the buffer memory 113, which start from the storage position corresponding to the initial value of the address counter 121.

The audio data as read out of the buffer memory 113 is corrected by an error correcting circuit 125, and the corrected audio data is supplied to a deinterleaver 126. The deinterleaver 126 rearranges the audio data into an original series of data items, which are then supplied to a D/A (digital-to-analog) converter 127, with its clock input terminal supplied with the readout pulse signal $f_1(R)$. The D/A converter 127 stores the input data in response to the readout pulses $f_1(R)$, and thereafter generates a voltage having a level corresponding to the input data. The D/A converter 127 thus issues an analog audio output to an audio playback device (not shown).

The output pulse from the stop code detector 16 is supplied to a player controller 128 which is also supplied with a play command signal generated in response to depression of a play switch (not shown). The player controller 128 generates control signals to reproduce a still image when the pulse is issued from the stop code detector 116 and a moving image when the play command signal is produced, and supplies such control signals to a video disc player (not shown).

When a digital start code and data count data are issued from the video disc player in advance of audio data recorded in a sound recording frame $F_1$ extending over a plurality of frames, the flip-flop 117 is set to turn on the write flag and initialize the address counter 121. At the same time, data count data is stored and held in the data count latch 115. Audio data in the amount indicated by the data count data is then written into the buffer memory 113. Thereafter, when a stop code is issued prior to video information recorded in an image recording frame $F_2$, a still image is reproduced and simultaneously the flip-flop 118 is set to turn on the readout flag, whereupon the audio data is read out of the buffer memory 113 to add sound to the still image. After all of the audio data has been fully read out of the buffer memory 113 to finish the sound reproduction, the PLAY switch or the like is manually operated to disable the still image reproduction, and the above operation can then be repeated.

With the reproducing system including the sound adding device according to the conventional recording and reproducing system, audio data corresponding to one still image is first all written into the buffer memory, and then the still image is reproduced and at the same time the written audio data is read out to generate reproduced sound. After all written audio data items have been fully read out, a next cycle of operation is started. Therefore, reproduced sounds based on audio data accompanying a plurality of still images cannot successively be generated, and hence it has not been possible to effect a mode in which still images are successively switched on while reproducing music recorded as audio data. The buffer memory is required to have a capacity large enough to store all audio data items corresponding to a single still image, with the result that the circuit arrangement of the reproducing system is undesirably large.

Still further, for recording audio information accompanying video information on a recording medium at the same time the video information is recorded, there is known a method of inserting the audio information on a compressed time base in a portion of a video format signal, and inserting the video information in the remainder of the video format signal. With such a method, it is necessary to identify the audio and video information on a reproducing side, and process reproduced signals dependent on the information.

Moreover, for recording audio information accompanying video information on a recording medium at the same time the video information is recorded, there is known a method of inserting the audio information on a compressed time base in a portion of a video format signal, and inserting the video information in the remainder of the video format signal. Since the narration for a still image is recorded as a compressed form, the narration is representative of sound continued for about 10 seconds for one still image. Therefore, the method has been limited to use as a so-called automatic projector.

SUMMARY OF THE INVENTION

It is an object of the present invention to provide a method for recording and reproducing a video format signal while easily and accurately allowing data word synchronization and clock (bit) synchronization in digital data on a reproducing side.

According to the present invention, there is provided a method for recording and reproducing a video format signal, comprising steps of dividing horizontal scanning lines constituting one field in the video format signal into a plurality of blocks, and inserting digitized digital data of prescribed information in a first block of the plurality of blocks and inserting at least a data synchronizing signal for determining synchronizing timing for words constituting the digital data into a second block of the plurality of blocks.

Further according to the present invention, there is also provided a method for recording and reproducing a video format signal, comprising steps of dividing horizontal scanning lines constituting one field in the video format signal into a plurality of blocks, inserting digitized digital data of prescribed information in a first block of the plurality of blocks and inserting at least a data synchronizing signal for determining synchronizing timing for words constituting the digital data into a second block of the plurality of blocks, recording the data on a recording medium, and synchronizing the digital data with the data synchronizing signal upon reproduction of the digital data.

It is yet another object of the present invention to provide a method for recording and reproducing a video format signal in which reproduced sounds based on audio data items accompanying a plurality of still images can successively be generated, and a buffer memory used for expanding data on a time base is small in capacity.

According to another aspect of the present invention, there is provided a method for recording and reproducing a video format signal on and from a recording medium, comprising dividing a two-dimensional screen based on the video format signal into a plurality of blocks with one of them being divided into a plurality of subblocks, inserting video information or information as compressed on a time basis into each of the subblocks, inserting video information and control information in the remaining blocks while recording the information on the recording medium, and writing the information in at least one of the subblocks into memory means in a reproduction mode, thereafter reading the information in the at least one subblock out of the memory means while expanding the information on a time basis, and simultaneously writing the information next to the information in the at least one subblock into the memory means, whereby the information in the at least one subblock and the next information can successively be reproduced.

It is another object of the present invention to provide a method for recording and reproducing a video format signal, in which video information and other information such as digital information can be discriminated on a reproducing side.

A method for recording a video format signal according to the present invention is characterized in that horizontal scanning lines constituting one field in the video format signal are divided into a plurality of blocks, digitized digital data of given information is inserted in a first block, video information is inserted in a second block, and a control signal for identifying at least one of positions where the digital data and the video information are inserted is inserted in a third block. Upon reproduction, the control signal is used for discriminating the video information and the digital data for reproduction processing.

With the present invention, information on positions where video information and digital data are inserted is recorded in control data in advance, and the control data items are arranged to correspond to fields or frames. Positional information is not required to be stored temporarily in a memory and processed, but can be processed for each field or frame, with the result that the capacity of the memory can be reduced and signal processing simplified.

Where information in each field (frame) is to be controlled by an external computer or the like, it is necessary to change the program each time the content of a recording disk is varied. If a ROM (read-only memory) is employed, then the ROM should be changed for each recording disk. According to the present invention, since control data is recorded in each disk, it is only necessary to play back the disk to read the recorded control disk, but unnecessary to change the program or ROM for each disk.

It is an object of the present invention to provide a method for recording and reproducing a video format signal in which various different items of audio information, characters, and other control information are also recorded, and desired audio information, character information and the like selected and issued upon reproduction so that the system can be used in a wide variety of applications.

A method for recording and reproducing a video format signal according to the present invention is characterized in that digital data to be inserted comprises a plurality of items of information such as different items of audio information, character information, and control information, and upon reproduction one or more of the pluarlity of items of digital data are selected in combination and reproduced together with the video information by referring to the given control signal and a control signal supplied from an external source.

With the present invention, several types of audio, characters, and other digital data can be added to a still image (the still image may present a problem and the added data may present the answer, for example), and the level of the narration may be varied dependent on the level of the viewer, and additionally an important point may be emphasized with characters or symbols for a greater understanding by the viewer. Furthermore, equivalents in various languages may be issued selectively through sounds and characters. If the above process were to be effected by a conventional system, only sounds would be produced since it was not possible to record character codes and audio signals together. Still images would have to be added to different sounds, and for reproduction each audio segment would have to be searched and reproduced, and data would have to be read and issued, resulting in complex scanning. According to the present invention, desired sounds and characters can be issued by operating a selector switch. For example, English and French narrations can alternately be issued successively as many times as desired simply by operating the selector switch. With the conventional system, however, desired data would have to be searched and reproduced in each occasion for reproduction.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 is a block diagram of a conventional sound adding device;

FIG. 2 is a diagram of a conventional video format;

FIG. 3 a diagram showing a field divided into a plurality of blocks in accordance with the present invention;

FIGS. 4A and 4B are a set of diagrams showing a video format signal in the vicinity of a vertical blanking interval;

FIG. 5 is a diagram describing horizontal scanning lines in the blocks illustrated in FIG. 3;

FIG. 6 is a diagram showing digital data items inserted in a first horizontal scanning line;

FIG. 11 is a block diagram of a system for reproducing a video format signal;

FIG. 12 is a diagram showing the waveform of a field synchronizing signal in a block a;

FIG. 13 is a diagram showing the waveform of digital data in a block b for a first horizontal line;

FIG. 24 is a diagram illustrative of another control data pattern;

FIG. 25 is a block diagram of still another system for reproducing a video format signal;

FIGS. 29A through 29E and diagrams of still another example of video data;

FIGS. 30A-30C are diagrams showing the content of digital data;

FIGS. 31 and 32 are diagrams of examples of control data;

FIG. 33 is a timing chart of operations of a reproducing system for the video data pattern of FIG. 29A through 29E;

FIG. 39 is a diagram showing an example of control data;

FIG. 41 is a diagram showing the relationship between the control data of FIG. 39 and the operation of audio signal switching relays in FIG. 40;

FIG. 48 is a diagram showing the manner in which one field screen is divided into blocks;

FIGS. 49A and 49B are diagrams showing at an enlarged scale a video format signal in the vicinity of a vertical blanking period;

FIG. 50 is a view illustrative of the numbers of horizontal scanning lines in the blocks illustrated in FIG. 48;

FIG. 51 is a diagram showing digital data items inserted in a first horizontal scanning line;

FIGS. 52A through 52E, 53 and 54 are views showing the manner in which digital data and images are inserted;

FIG. 55 is a schematic block diagram of a system for recording a video format signal according to the present invention;

DESCRIPTION OF THE PREFERRED EMBODIMENTS

FIG. 3 is schematically illustrative of principles of the present invention. Horizontal scanning lines corresponding to one field of a video format signal as it is recorded are divided into a plurality of blocks a, b, c, Q. The blocks a, b, c are each composed of an integer number of horizontal lines. The number of horizontal scanning lines in the block c can be exactly divided by a given integer x so that $m=c/x$ (where m is an integer). Therefore, the block c is composed of x subblocks $c_1$-$c_x$ each containing m scanning lines. The number of scanning lines in the block Q need not be an integer.

FIGS. 4A and 4B show a portion of the video format signal shown in FIG. 3, of which FIG. 4A shows a waveform in which an image is recorded in the blocks c and Q, and FIG. 4B shows a waveform in which digital data is recorded in the block c. FIG. 5 is illustrative of specific numerical values in the divided blocks a, b, c, Q in an NTSC signal. The number of effective scanning lines (those containing information to be displayed) in a field composed of 262.5 scanning lines is 241.5, and the blocks a and b are located out of the visible range of the television screen. In the illustrative example, the number of lines for blocks a, b, c and Q are 1, 4, 254 and 2.5, respectively, and $x=9$ and $m=26$. A field synchronizing signal composed of a clock synchronization signal and a data synchronization signal is inserted in the block a, and a control code as control information is inserted in the block b.

Where digital data items are inserted in the blocks b and c, the data items are interleaved so that no successive errors will be produced even if errors are concentrated due to dropouts, and an error correcting code is added for error detection and correction. In the illustrated block b, the data items are interleaved independently of the other blocks and error correction is completed in the block. Likewise, the data items are interleaved and error correction completed independently in the respective subblocks $c_1$ through $c_x$ of the block c.

FIG. 6 is a diagram showing an example in which digital data items are inserted in one horizontal scanning line. The data transfer rate is $408f_H$ (where $f_H$ is the horizontal scanning frequency), and a clock run-in signal, which is a clock synchronization signal, is inserted prior to the digital data items. The clock run-in signal is followed by a few bits of a data synchronization signal for achieving data synchronization, which are in turn followed by a data word and a code for error detection and correction.

Figures 7A, 7B, 7C, 7D, 7E:
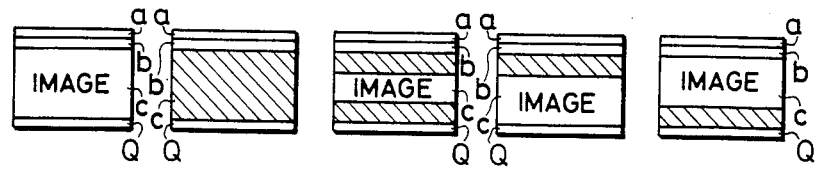
FIGS. 7A through 7E, 8, and 9 are views showing the manner in which digital data and images are inserted.

FIGS. 7A to 7E illustrate various recording modes. FIG. 7A shows a mode in which only an image is inserted in the block c and Q with the blocks a and b located out of the visible range. The image mode of FIG. 7A is the same as for ordinary television images. FIG. 7B shows a mode in which digital data items are inserted in all of the subblocks of the block c, and FIG. 7C shows a mode in which digital data items are inserted in the subblocks $c_1$, $c_2$, $c_8$, $c_9$ out of the nine subblocks of the block c, while an image is inserted in the subblocks $c_3$ through $c_7$. FIG. 7D is illustrative of a mode in which digital data items are inserted in the subblocks $c_1$ and $c_2$, and an image is inserted in the subblocks $c_3$ through $c_9$, and FIG. 7D of a mode in which an image is inserted in the subblocks $c_1$ through $c_7$ with digital data items inserted in the subblocks $c_8$ and $c_9$.

Figure 8:
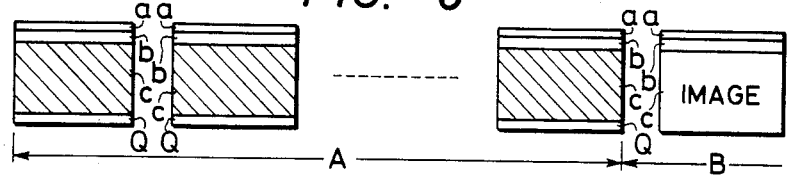

In FIG. 8, frames (fields) in which the digital data items are inserted in the block c are successively present for a period A. Such successive frames range from a few frames to a few tens of frames dependent on the amount of data required. An image is inserted in the block c in a succeeding period B. In the period B, there is inserted an image corresponding to the data in the period A, which may be a still image or one of successively varying images. Where a still image is inserted, there may be instances in which one image is recorded in a few frames to prevent crosstalk between adjacent frames.

Figure 9:
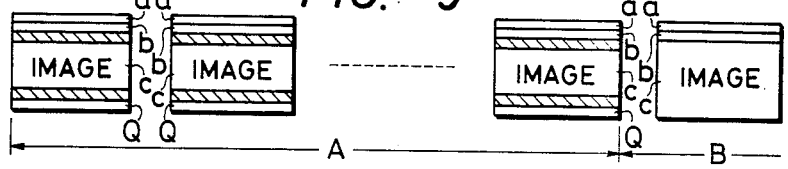

FIG. 9 shows an example in which there are a few to a few tens of successive frames over the period A, each frame having digital data items inserted in the subblocks $c_1$ and $c_9$ and an image inserted in the subblocks $c_2$ through $c_8$, and only an image is inserted in the block c in the following period B. In this pattern, a portion of the screen displays an image in the period A, resulting in an uninterrupted image.

Figure 10:
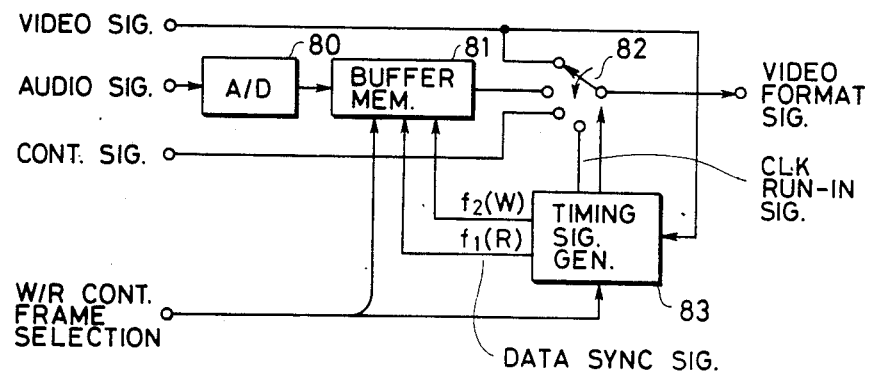
FIG. 10 is a schematic block diagram of a system for recording a video format signal according to the present invention.

FIG. 10 shows in block form a recording arrangement for producing a video format signal according to a recording system of the present invention. An analog audio signal is digitized by an analog-to-digital converter 80 into a digital signal which is written at a sampling frequency $f_1(R)$ into a buffer memory 81 for compression on a time basis. The signal can be compressed on a time basis by being read out of the buffer memory 81 at a frequency $f_2(W)$ higher than the frequency $f_1(R)$. A control signal providing control information includes the content and capacity of information in each subblock and various items of processing information at the time the information in each subblock is reproduced. The digital data signal containing audio data compressed on a time basis by the buffer memory 81 and the control information are supplied to a switching circuit 82, which is also supplied with a video signal and a clock run-in signal and a data synchronization signal from a timing signal generator 83. Selective operation of the switching circuit 82 is controlled by the timing signal generator 83, and the data items are written into and read out of the buffer memory 81 also under the control of the timing signal generator 83. The timing signal generator 83 has an internal oscillator operable in synchronism with the synchronizing signal of the applied video signal for producing various timing signals in response to a control signal supplied from an external source. The switching circuit 82 produces as an output a video format signal to be recorded.

FIG. 11 is a schematic block diagram of an arrangement for reproducing a still image with general audio information. A video format signal to be reproduced is applied to a signal separator 1 which separates the applied signal into a synchronizing signal and digital data, and also separates audio data and control data from the digital data. A timing signal generator 2 is responsive to the synchronizing signal for generating timing signals such as writing pulses of $f_2(W)$, reading pulses $f_1(R)$, and the like. An error of the control data is detected and corrected by an error correcting unit 4. The control data is decoded by a control code decoder 6 and delivered to a system control generator 7. The audio data is written through an error correcting unit 3 into a memory 5 with the pulses $f_2(W)$ and read out of the memory 5 with the pulses $f_1(R)$ for expansion on a time basis. The error correction for the audio data may be effected after the audio data has been expanded. The expanded audio data is converted by a digital-to-analog converter 9 into an analog audio signal for reproduction.

Various control signals are generated by the system control generator 7 in response to control commands decoded by the control code decoder 6. A video signal for reproduction is delivered through an image processor 8 operated by a control signal from the system control generator 7. More specifically, for a block in which digital data is inserted, the image processor 8 processes the video format signal with the image as a black level and produces a video signal. A player controller 10 issues a control signal for controlling playback operation of a VDP (Video Disc Player) to stop the VDP and effect the PLAY mode and other modes.

As described with reference to FIG. 5, several sets of data in which the clock run-in signal for clock and data synchronization and the data synchronizing signal are combined are inserted in horizontal scanning lines in the first block a in one field. The signal in the block a serves to establish clock and data word synchronization at the initial stage of each field. The data portion corresponding to the block a is referred to as a field synchronizing, and the details of the field synchronizing in the first horizontal line are illustrated in FIG. 12.

The data transfer rate is $408f_H$, and no digital data is inserted in the 64 bits from the falling edge of the horizontal line synchronizing pulses. 320 serial bits are employed as the field synchronizing. The 320 bits are divided into ten 32-bit units, each of which constitutes one set of a clock synchronizing signal and a data synchronizing signal. 24 out of the 32 bits are a clock run-in signal in which successive signals of 1010 . . . 10 are inserted for 12 cycles, followed by an eight-bit data synchronizing signal of 11100100. The ten units of 32 bits composed of 24 bits and eight bits, as described above, are successively inserted. A front porch corresponds to 24 bits.

In this embodiment, a=1, and the foregoing signal series is inserted in the 22nd horizontal line. In the block b there are inserted various control signals corresponding to the content of the information inserted in the block c. Where digital data items are to be inserted in the blocks b and c, the effective data range is composed of 320 bits, in the same manner as the field synchronizing, as shown in FIG. 13. Like the field synchronizing shown in FIG. 12, the interval from a horizontal synchronizing pulse to the beginning end of a data series is composed of 64 bits and a front porch is composed of 24 bits. 320 bits are represented by a 24-bit, 12-cycle clock run-in signal at the beginning end of the data series, an eight-bit data synchronizing signal, and 288 bits divided into 30 eight-bit (one byte) units of information. According to the present invention, four horizontal lines are allotted to the block b. More specifically, control signals are recorded respectively in the 33rd, 24th, 25th, and 26th lines. The eight-bit (one byte) information is the block b is interleaved and subjected to error correction without the block b. Where digital data items are to be recorded in the block c, 26 horizontal lines constitute one block, and digital data can be recorded in the maximum of nine blocks in one field and in the maximum of 18 blocks in one frame, allowing a display of digital data over an entire screen, an image over an entire screen, and a combination of digital data and an image over an entire screen. The digital data in the block is arranged so that it can be interleaved and subjected to error correction within the block.

Figure 14:
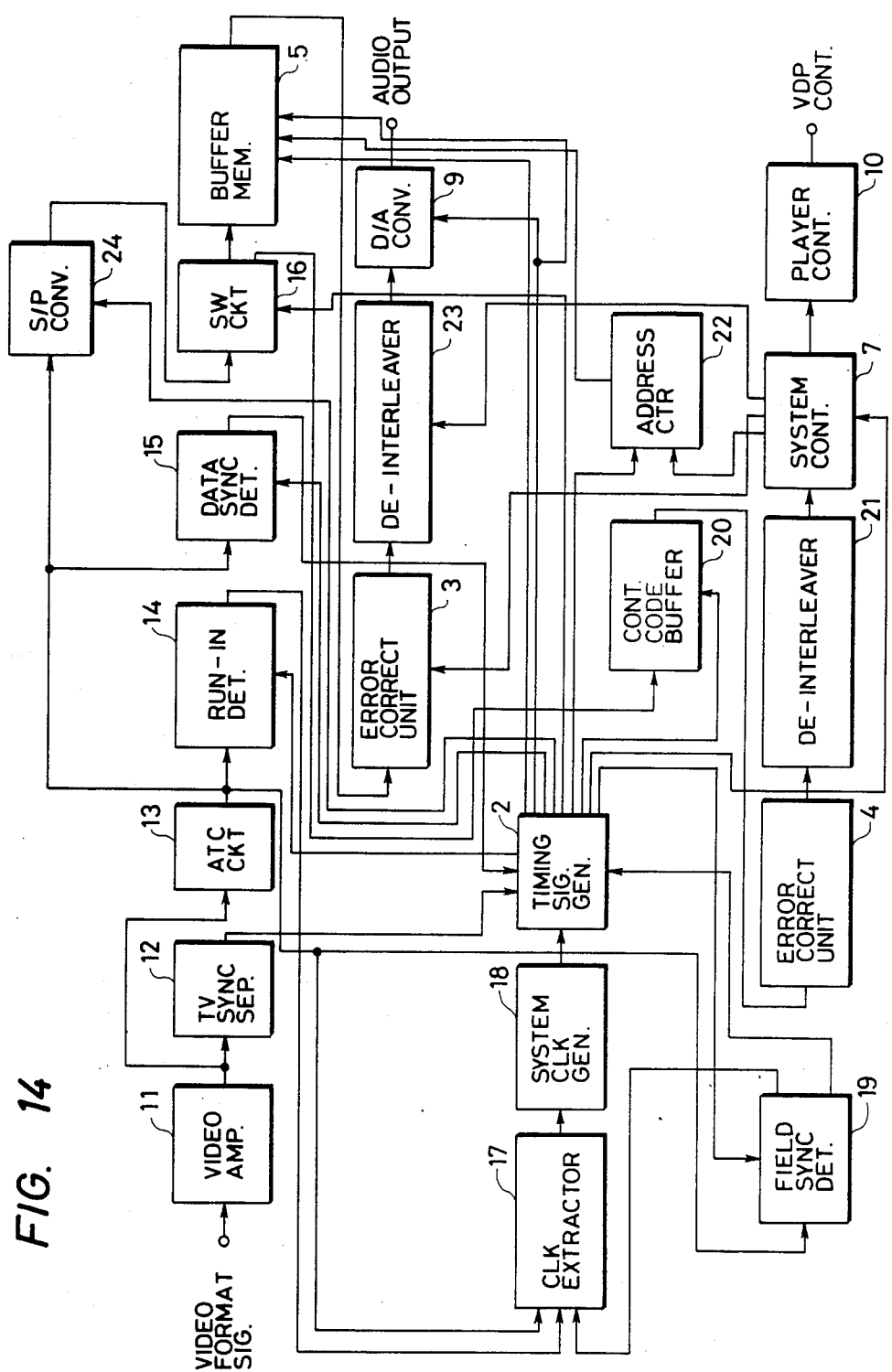
FIG. 14 is a block diagram of another system for reproducing a video format signal.

FIG. 14 is a block diagram of a reproducing system. In FIG. 14, digital data items are compressed on a time basis, and the system serves to add an audio accompaniment to a still image. The system includes a video amplifier 11 for amplifying a video signal, a TV synchronizing separator 12 for separating vertical and horizontal synchronizing signals from the video signal, an ATC circuit 13 for automatically setting a threshold level to an optimum value according to the data level based on the amplified video signal level and for converting an analog video signal into a NRZ (NonReturn-to-Zero) digital data series, run-in detector 14 for detecting a clock run-in signal from the digital data series, and a data synchronization detector 15 for reading the digital data series with a clock, detecting an eight-bit data synchronizing signal to detect the initial position of data in the blocks b and c in each horizontal line. The system also includes an S/P (Serial-to-Parallel) converter 24 for reading the data series into eight-bit parallel data, a switching circuit 16 for detecting the 23rd to 26th horizontal lines in the field to separate a control data signal for switching outputs, a clock extractor 17 for extracting a clock component from the data series based on the run-in signal, a system clock generator 18 for generating a clock signal required for operating the system by subjecting the extracted clock to PLL (Phase Locked Loop), and a timing signal generator 2 for generating various timing signals under the control of the vertical and horizontal synchronizing signals separated by the TV synchronizing separator 12 based on the clock signal generated by the system clock generator 18 and a data head detecting signal generated by the data synchronization signal 15.

The system further includes a field synchronizing detector 19 controlled by the timing signal generator 2 for detecting a field synchronizing signal and achieving clock and data synchronization at the beginning and end of each field from the clock run-in signal and the pattern of data synchronization, a control buffer 20 for temporarily storing a control code separated by the switching circuit 16, an error correcting unit 4 for correcting errors in the control code read out of the control code buffer 20, a deinterleaver 21 for arranging the corrected control code according to a control sequence, a system controller 7 for generating various control signals by decoding a series of control codes, an address counter 22 for supplying an address signal to a large capacity buffer memory 5 by obtaining an initial address signal when writing control signals from the system controller 7 into the large capacity buffer memory 5 or reading control signals out of the buffer memory 5 and counting clock pulses generated by the timing signal generator 2 when writing and reading eight-bit data, the large capacity buffer memory 5 for temporarily storing the digital data in the block c with a signal of a frequency $f_2(W)$ from the timing signal generator 2 and reading the digital data with a signal of a frequency $f_1(R)$, an error correcting unit 3 for correcting errors in the digital data in each block read out of the large capacity buffer memory 5, a deinterleaver 23 for converting the corrected data into a time-successive series of data items, a digital-to-analog converter 9 for converting the series of digital data into an analog signal with a timing of $f_1(R)$ obtained by the timing signal generator 2, and a play controller 10 responsive to a control signal for a VDP (Video Disk Player) from the system controller 7 for supplying a VDP control signal to the VDP.

When a recorded video format signal having the pattern shown in FIG. 8 is to be reproduced, the VDP operates in a normal reproducing mode over the period A. During this time, the digital data items inserted in the block c are successively stored into the large capacity buffer memory 5. In the following period B, the VDP reproduces a still image or successive images. At this time, the digital data items stored in the large capacity buffer memory 5 are read out. Where these data items are time-compressed audio digital data, they are expanded and issued as an analog audio signal at the time a still image or successive images are reproduced. In the period A, the television motor displays images as clamped at a black level by the image processor 8 shown in FIG. 11. Although such image processor is omitted from illustration in FIG. 14, its construction and operation are the same as those of the image processor of FIG. 11.

For reproducing a video format signal having the pattern shown in FIG. 9, the digital data items in the block c are successively stored in the large capacity buffer memory 5 in the period A. During this time, upper and lower portions of the monitor screen are processed so as to be at a black level, with an image appearing in a central portion.

Furthermore, a video format signal to be reproduced which is fed from a video output terminal is applied to an amplified by the video amplifier 11. The amplified output signal from the video amplifier 11 is applied to the TV synchronizing separator 12, from which separated vertical and horizontal synchronizing signals are supplied to the timing signal generator 2.

The amplified video signal is also applied to an input terminal of the ATC circuit 13. The ATC circuit 13 detects peak and pedestal levels of the data items, establishes threshold levels automatically and sequentially according to the data items, and extracts a series of NRZ digital data items from the video signal. The run-in detector 14 detects a 24-bit, 12-cycle clock run-in signal from the extracted digital data series under the control of the timing control signal from the timing signal generator 2. An output from the run-in detector 14 is applied to an input terminal of the clock extracting circuit 17 which extracts a clock component from the normal data series based on the clock run-in signal. The extracted clock component is then applied to the system clock generator 18 which generates a system clock signal for operating the system in synchronism with the serial data with a PLL circuit based on the extracted clock component. The clock signal produced by the system clock generator 18 is applied to the timing signal generator 2 which is controlled by the vertical and horizontal synchronizing signals based on the clock signal for detecting the 22th horizontal line in one field to generate a timing signal to be applied to a control terminal of the field synchronizing detector 19 which serves to detects a field synchronizing signal, and also detecting the 23rd to 26th horizontal lines to generate a timing control signal for separating the control data. The timing signal generator 2 also detects the 27th horizontal line to produce a control signal for reading and writing data items in and after the 27th horizontal line. The series of serial data items issued from the ATc circuit 13 is applied to the data synchronization detector 15 and the S/P converter 24, which read the data in synchronism with the clock. The data synchronization detector 15 detects a data synchronizing signal in each horizontal line and applies the detected signal to the timing signal generator 2 to determine the head position of the data for keeping the data and the timing signal in a constant sycnronized relation. The S/P converter 24 converts the serial data into eight-bit parallel data items which are applied to the switching circuit 16. The switching circuit 16 operates to apply the data to the control buffer 20 when there is a signal indicative of the 23rd to 26th horizontal lines from the timing signal generator 2, and apply the data to the large capacity buffer memory 5 when there are other signals. Control codes temporarily stored in the control code buffer 20 are applied to an input terminal of the error correcting unit 4 which applies the corrected control coded to an input terminal of the deinterleaver. 21. The deinterleaver 21 rearranges the control codes under the control sequence. The system controller 7 decodes the control codes, and writes the digital data, controls the screen (not shown), initializes the address counter 22 for the large capacity buffer memory 5, control the capacity of the digital data, and effects other operations under the control of the timing control signal generated by the timing signal generator 2.

Control signals for operating and stopping the player are applied to the player controller 10 which converts the supplied control signals into player drive signals and applies such player drive signals to the player. A signal indicative of the 22nd horizontal line from the timing signal generator 2 is applied to the control terminal of the field synchronizing generator 19. The field synchronizing generator 19 generates a clock signal and a reference signal for data synchronization in the fields based on repeated clock run-in signals and data synchronizing signals and feeds the clock signal and the reference signal back to the clock extracting signal 17 and the timing signal generator 2. Then, the timing signal generator 2 detects the 27th horizontal line, and the control code is decoded to cause the system generator 7 to decode a code indicative of the digital data recorded in the block, whereupon the data items are successively stored in the large capacity buffer memory 5 with the signal of $f_2(W)$ generated by the timing signal generator 2 according to the control signal from the system generator 7. Upon completion of a certain amount of the data, the system controller 7 gives a command to the player for reproducing a still image in a specified frame, thus causing the player to reproduce the still image. Then, a read-out starting address is set in the address counter 22 by the system controller 7, and the data items are successively read out of the large capacity buffer memory 5 by the signal of $f_1(W)$ generated by the timing signal generator 2. The data items successively read out of the large capacity buffer memory 5 are applied to an input terminal of the error correcting unit 3 which corrects errors of the data items and applies the corrected data items to an input terminal of the deinterleaver 23. The deinterleaver 23 rearranges the applied data items into the original sequence, and applies the rearranged data items to an input terminal of the D/A converter 9. The D/A converter 9 converts the digital data items into an output analog audio signal. While this signal is being reproduced, the player reproduces a still image. When data items of a capacity specified by the large capacity buffer memory 5 are issued, a control signal such as for a search mode or a playback mode are supplied to the player according to a control code.

The manner in which clock and data synchronization is achieved by the run-in detector 14, the data synchronization detector 15, and the field synchronizing detector 19 will be described. In each field, clock and data synchronization is first established by ten clock run-in signals and ten data synchronization signals contained in a field synchronizing of the 22nd horizontal line. More specifically, a clock component contained in the clock run-in signals is extracted by the clock extracting circuit 17, and the PLL circuit in the system clock generator 18 is brought into synchronism with the extracted clock component. The head position of data is detected by the data synchronizing signals, and the detected signal is applied to the timing signal generator 2 to place the latter into synchronism with the data. Ten clock run-in signals and ten data synchronizing signals are contained in the field synchronizing because clock and data synchronization can reliably be carried out in the field synchronizing even when a portion of the signal is missing due for example to dropout. Once synchronization is achieved in the field sync, clock and data synchronization is kept while compensating for a clock phase shift and a bit shift with clock run-in and data synchronizing signals present at the head of each horizontal line in which data items are present and detected by the run-in detector and the data synchronization detector. The clock run-in and data synchronizing signals at the head of each horizontal line also serve to accomplish resynchronization when the clock and data are forced out of synchronization due to dropout, for example.

Figure 15:
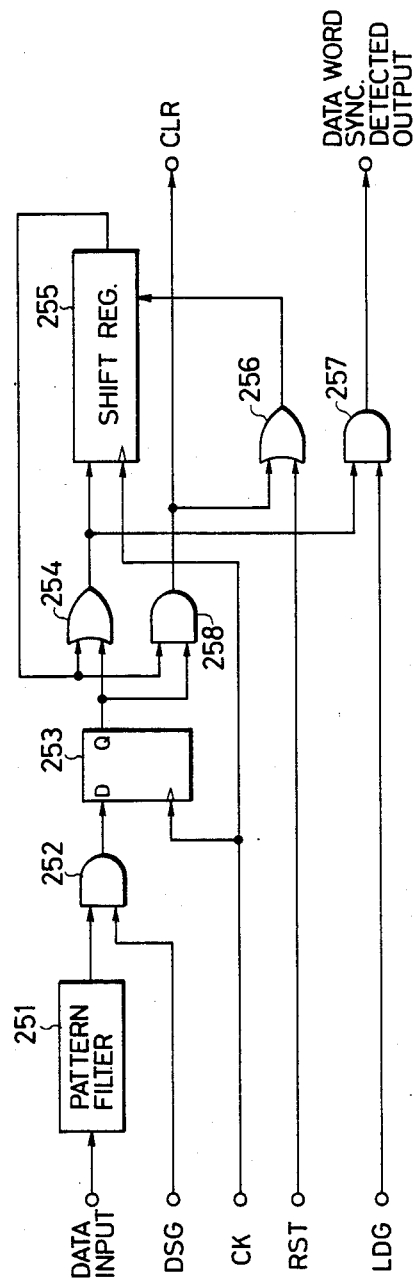
FIG. 15 is a detailed block diagram of a data synchronization detector in the system of FIG. 14.

FIG. 15 is illustrative of a specific arrangement for the data synchronization detector 15. A pattern filter 251 is composed of a shift register and a gate for detecting a pattern of 11100100 of the data synchronizing signal to issue a one-bit detected pulse of "1". Since the detected pulse may possibly represent noise or a false data synchronizing signal, an AND gate 252 is provided for controlling application of the detected pulse to a succeeding circuit with a gate signal DSG of specified timing. The detected pulse is applied to a flip-flop 253 and read thereinto by a clock signal CK which is synchronous with data bits. The signal DSG remains "1" for the period of 16 bits with respect to individual detected pulses. Since 10 data synchronizing signals are inserted in the period of 32 bits in the field synchronizing shown in FIG. 12, DSG repeats alternate "1" and "0" per every 16 bits. Since one data synchronizing signal is recorded in each horizontal line in the period other than the field synchronizing as illustrated in FIG. 13, DSG becomes "1" only for the period of 16 bits so as to bracket a corresponding detected pulse.

Operation of a circuit section following the flip-flop 253 will be described first with respect to the field sync. In the field sync, a highly reliable data synchronizing detected output is obtained, employing ten data synchronizing signals, in the following manner: When only one detected pulse of the data synchronizing signals is obtained, it is used as a synchronizing detected output. When two or more detected pulses are obtained and two of such detected pulses are spaced an interval which is a multiple of 32 bits, one of the pulses is used as a synchronizing detected output. When there are two or more detected pulses and any two pulses are not spaced an interval which is a multiple of 32 bits, either pulse is used as a synchronizing detected output. In this manner, a synchronizing detected output can be obtained even when nine out of ten data synchronizing signals in the field synchronizing are not detected due to dropout. Furthermore, when a false data synchronizing signal is detected due to dropout, a proper synchronizing detected output can be obtained if two or more true data synchronizing signals are detected.

In order to obtain a data synchronizing detected output in the above manner, the circuit will operate as follows: A detected pulse is delivered from a Q output of the flip-flop 253 through an OR gate 254 to a 16-bit shift register 255. Since an output from the shift register 255 is applied again to the OR gate 254, the detected pulse circulates through the OR gate 254 and the shift register 255 at a period of 16 bits. Because the detected pulse is issued from the flip-flop 253 at the period of 32 bits, a next detected pulse appears at the Q output of the flip-flop 253 when the first detected pulse circulates twice through the shift register 255. At this time, an output CLR from an AND gate 258 becomes "1" to reset the shift register 255 through an OR gate 256, and then becomes "0" immediately after the shift register 255 is reset, thus removing the reset signal. A second detected pulse is applied to the shift register 255 in response to a next clock pulse. The output CLR is also applied to the timing signal generator 2 shown in FIG. 14 to cause DSG to be "0", preventing the detected pulse from being issued from the AND gate 252, whereupon the detected pulse will simply circulate through the shift register 255 and the OR gate 254. Where some of data synchronizing signals are not detected due to dropout, for example, and two detected pulses are issued from the flip-flop 253 in spaced relation, a second detected pulse is issued from the flip-flop 253 when the first detected pulse circulates through the shift register 255 several times, causing CLR to be "1" to reset the shift register 255. In case a false detected pulse corresponding to a false data synchronizing signal is mixed with true detected pulses and issued from the flip-flop 253, the mixed false and true detected pulses are applied through the OR gate 254 to the shift register 255. When a second true detected pulse is issued from the flip-flop 253, the output from the shift register 255 is also a true detected pulse so that CLR becomes "1" and only the second true detected pulse remains in the shift register 255 upon application of a next clock pulse. Where only one detected pulse is obtained, CLR will never become "1", and the detected pulse remains in the shift register 255. Thus, only one detected pulse remains in the shift register 255 and will thereafter circulate through the OR gate 254 and the shift register 255. After completion of the field sync, LDG becomes "1" and is picked up as a data synchronizing detected output through the AND gate 257. In the event that any two detected pulses are not spaced an interval which is a multiple of 32 bits, CLR does not become "1" and all detected pulses circulate in the shift register 255. Since LDG is caused by the timing signal generator 2 to be "0" immediately when a data synchronizing detected output is picked up, only the first detected pulse is picked up. For the data synchronizing signal of FIG. 13 other than the field sync, LDG becomes "1" which is one bit delayed with respect to DSG, so that a detected pulse is picked up immediately as a data synchronizing detected output through the OR gate 254 and the AND gate 257. The circuit of FIG. 15 therefore detects data synchronizing signals in the field synchronizing and the other interval than the field sync. Designated at RST in FIG. 15 is an initial reset signal for the shift register 255.

Figure 16:
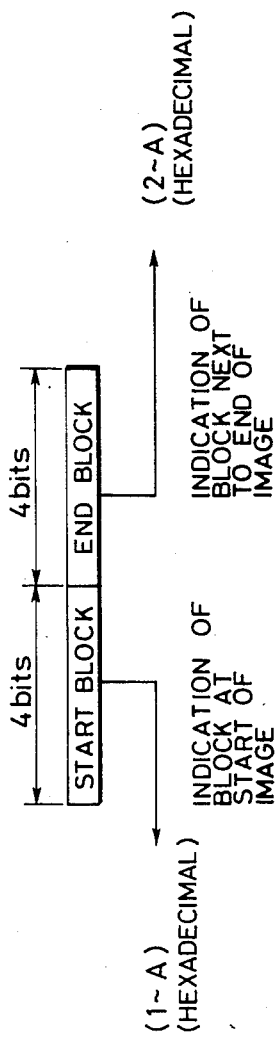
FIG. 16 is a diagram illustrating an example of control data.

It is necessary to differentiate an image from digital data in the block c, and to this end a subblock at the beginning end of an image and a subblock at the terminal end of the image are inserted as control data. FIG. 16 shows an example in which the beginning end of an image is indicated by a START BLOCK composed of 4 bits that can take a value ranging from 1 to A (hexadecimal notation) and a subblock following the terminal end of the image is indicated by an END block composed of 4 bits that can take a value ranging from 2 to A (hexadecimal notation). The value which can be taken varies dependent on the value of x by which the block c is divided into the subblocks. In the illustrated embodiment, x=9, and Table 1 shows various video format signals, codes for the START BLOCK and END BLOCK.

TABLE 1

| FIG. 7 | START BLOCK CODE | END BLOCK CODE | REMARKS |
| --- | --- | --- | --- |
| (A) | 1 (hexadecimal) | A (hexadecimal) | Full image in C |
| (B) | A (hexadecimal) | X | Full data in C |
| (C) | 3 (hexadecimal) | 8 (hexadecimal) | Central image |
| (D) | 3 (hexadecimal) | A (hexadecimal) | Lower image |
| (E) | 1 (hexadecimal) | 8 (hexadecimal) | Upper image |

Note: X is any desired hexadecimal number.

Figure 17:
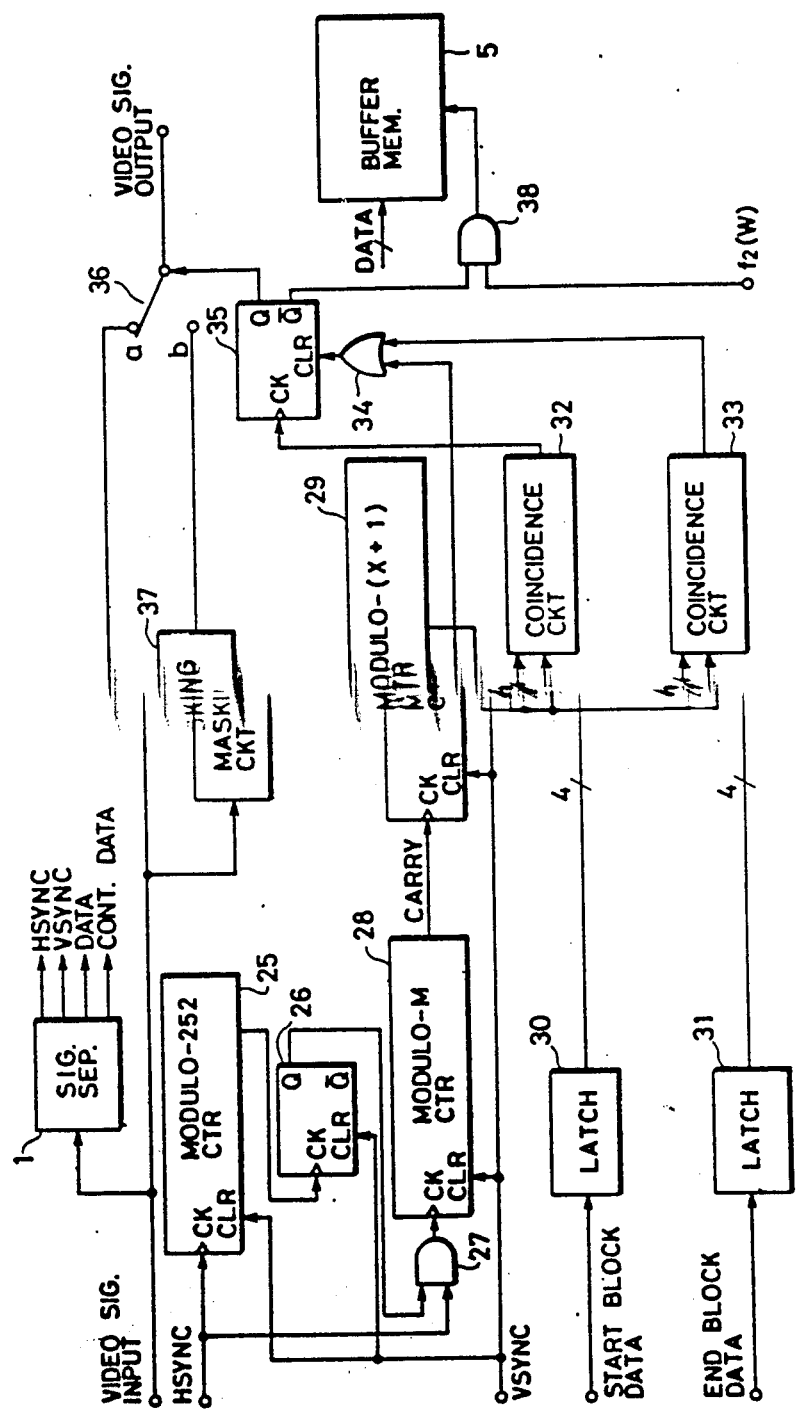
FIG. 17 is a block diagram of still another system for reproducing a video format signal.

FIG. 17 is a block diagram of a reproducing system for controlling reproducting operation using a code indicative of a position in which image information is inserted. The reproducing system includes a modulo-252 counter 25 for detecting a 26th horizontal line using the horizontal synchronizing signal separated by the signal separator 1 shown in FIG. 11 and for effecting control in the field, and a flip-flop (FF) 26 for producing an output Q of "1" in response to a pulse issued from the counter 25 when it counts 16 pulses and received as a clock input and for producing an output Q of "0" in the vertical synchronizing. The output Q from the FF 26 is connected to an input terminal of an AND gate 27 with its other input terminal supplied with the horizontal synchronizing signal. The AND gate 27 produces an output signal by ANDing the output Q from the FF 26 and the horizontal synchronizing signal, and hence produces as an output a 27th or subsequent horizontal synchronizing signal pulse. A modulo-26 counter 28 is supplied with the 27th or subsequent horizontal synchronizing signal pulse as a clock input and cleared with a vertical synchronizing pulse. The counter 28 serves to detect m in the subblocks $c_1$ through $c_9$ in the clock c. Since m=26 in the present embodiment, the counter 28 is a modulo-26 counter. There is a modulo-(x+1) counter 29 which effects counting operation with a carry signal from the modulo-26 counter 28 and is cleared with a vertical synchronizing signal. Since x=9 in this embodiment, the counter 29 is a modulo-10 counter for counting the subblocks in the block c and Q.

The system of FIG. 17 includes a four-bit latch 30 for temporarily storing four bits of a start block code signal out of the output from the control decoder 6 shown in FIG. 11, and a four-bit latch 31 for temporarily storing four bits of an end block code signal. The system further has a coincidence circuit 32 supplied as inputs with an output signal from the four-bit latch 30 and four-bit output signals $Q_1$ to $Q_4$ indicative of output conditions of the modulo-10 counter 29 and issues a pulse when the bits are compared and determined to be equal, and a coincidence circuit 33 supplied as inputs with an output signal from the four-bit latch 31 and the four-bit output signals $Q_1$ to $Q_4$ from the modulo-10 counter 29 and issues a pulse when all bits are equal. A FF 35 is supplied as a clock input signal with a pulse signal from the coincidence circuit 32 and issues a Q output of "0" in response to an output issued from an OR gate 34 when either an output from the coincidence circuit 33 or a vertical synchronizing signal pulse is supplied as an input signal to the OR gate 34. A switch 36 is connected to a contact a when the Q output of the FF 35 is "1" and to a contact b when the Q output of the FF 35 is "0". A masking circuit 37 serves to bring the screen forcibly to a black level. When the switch 36 is connected to the contact a, an input video signal is issued as a video signal output, and when the switch 36 is connected to the contact b, an output signal from the masking circuit 37 is issued as a video signal output. The other output $\overline{Q}$ of the FF 35 is connected to an AND gate 38 for controlling application of writing pulses of $f_2(W)$ to the large capacity buffer memory 5.

A video format signal composed of an image and a digital signal are applied to an input terminal of the signal separator 1 and to the contact a of the switch 36. The vertical synchronizing signal separated by the signal separator 1 is applied to a CLR terminal of the modulo-252 counter 25, a CLR terminal of the FF 26, a CLR terminal of the modulo-m counter 28, a CLR terminal of the modulo-(x+1) counter 29, and one of the terminals of the OR gate 34. The modulo-252 counter 25, the FF 26, the modulo-m counter 28, the modulo-(x+1) counter 29, and the FF 35 are initialized by the vertical synchronizing signal. Then, an horizontal synchronizing signal separated by the signal separator 1 is applied to a clock terminal CK of the modulo-252 counter 25 and one of the input terminals of the AND gate 27.

The modulo-252 counter 25 is a counter for effectng control in each field with respect to NTSC TV signals. In each field, the modulo-252 counter 25 counts up after the vertical synchronizing signal rises to remove a clear signal, that is, each time a horizontal synchronizing pulse is applied from the 11th horizontal line, and generates a pulse after 16 horizontal lines are counted. The generated pulse corresponds to the 26th horizontal line in each field in the NTSC TV signal, and is applied to CK terminal of the FF 26. In response to the pulse applied to the CK terminal, the FF 26 produces a logic output "1" from the Q output thereof. The FF 26 serves as a flag and the Q output remains at the logic "1" until a vertical synchronizing signal pulse is applied to the CLR terminal after the 26th horizontal line. The Q output signal from the FF 26 is aplied to one of the input terminals of the AND gate 27, the other input terminal of which is supplied with the horizontal synchrronizing signal separated by the signal separator 1. Therefore, the AND gate 27 produces as an output an at the 27th horizontal line, that is, a horizontal synchronizing pulse from the block c in the divided screen of FIG. 3 is applied to a clock terminal CK of the modulo-m counter 28.

The modulo-m counter 28 serves as a counter for controlling the subblocks in the block c. In this embodiment, m=26, and the carry signal from the modulo-m counter 28 is applied to a clock terminal CK of the modulo-(x+1) counter 29 which is a counter for controlling the position of the subblocks in the block c. The counter 29 is a modulo-(x+1) counter since it counts pulses not only in the region c but also in the region Q until a vertical synchronizing pulse arrives. In the illustrated embodiment, the modulo-(x+1) counter 29 is a modulo-10 counter since x=9. A four-bit output Q1 to Q4 indicative of the condition of the counter 29 is applied to one of the input terminals of each of the coincidence circuits 32, 33. The code of the start block indicating the starting end of an image in the control data separated by the signal separator 1 is applied to the input terminal of the latch 30 and temporarily stored therein for a period equal to one field or one frame. An output from the latch 30 is applied to the other input terminal of the coincidence circuit 32, which compares the applied bits and issues an output pulse when the 4 bits are equal. Likewise, the code of the end block indicating the number of the subblock next to the terminal end of an image in the control data separated by the signal separator 1 is applied to the input terminal of the latch 31. An output of the latch 31 is applied to the other input terminal of the coincidence circuit 33, which compares the bits and issues an output pulse when the four bits are equal. The output pulses from the coincidence circuit 32 is applied to a clock terminal of the FF 35, and the output pulse from the coincidence circuit 33 is applied to an input terminal of the OR gate 34, which applies its output to a clear terminal CLR of the FF 35. When the coincidence pulse from the coincidence circuit 32 is applied to the FF 35, the FF 35 produces an output Q of "1", and when the coincidence pulse from the coincidence circuit 33 is applied to the FF 35, the FF 35 produces a output Q of "0". The $\overline{Q}$ output of the FF 35 is an inverse of the Q output thereof. The $\overline{Q}$ output from the FF 35 is applied to the switch 36, which is shifted to the contact a when the Q output is a logic "1" and to the contact b when the Q output is a logic "0". The $\overline{Q}$ output of the FF 35 is applied to one of the input terminals of the AND gate 38 with its other input terminal supplied with writing pulses of $f_2(W)$ generated only in the block c from the timing signal generator 2 (FIG. 11). Accordingly, when the Q output of the FF 35 is "0", the AND gate 38 supplies the writing pulses of the $f_2(W)$ to the large capacity buffer memory 5 for allowing the latter to successively store data items separated by the signal separator 1.

In the pattern of FIG. 7C, for example, the code of the start block is 3 and the code of the end block is 8. At this time, 3 and 8 are set respectively in the latches 30 and 31. Since the Q output from the FF 35 is initially "0+, the switch 36 is on the contact b to allow a video output to come from the output of the masking circuit 37. The screen is black at this time since the masking circuit 37 masks at a black level a portion of the video signal except the synchronizing signal and the color burst. Because the $\overline{Q}$ from the FF 35 is a logic "1", the AND gate 38 issues pulses of $f_2(W)$ to permit data items separated by the signal separator 1 to be successively written in the buffer memory 5.

When the modulo-(x+1) counter 29 counts up to 3, the coincidence circuit 32 generates a pulse which upon rising causes the Q output of the FF 35 to be "1". The switch 36 is therefore shifted to the contact a to issue the input video signal or image as an output signal. Since the $\overline{Q}$ output of the FF 35 becomes "0", no pulse is generated from the gate 38, and hence no pulses are written into the large capacity buffer memory 5. Similarly, when modulo-(x+1) counter 29 counts up to 8, a pulse is generated from the coincidence circuit 33 and applied through the OR gate 34 to the CLR terminal of the FF 35 which then issues a Q output of "0". The switch 36 is shifted to the contact b to allow the output from the masking circuit 37 to be issued as a video signal output which indicates a black screen. The $\overline{Q}$ output of the FF 35 becomes "1" to cause the output signal from the AND gate 38 as controlled by the pulses of $f_2(W)$ from the timing signal generator 2 to store data items separated by the signal separator 1 successively into the large capacity buffer memory 5.

Figure 18:
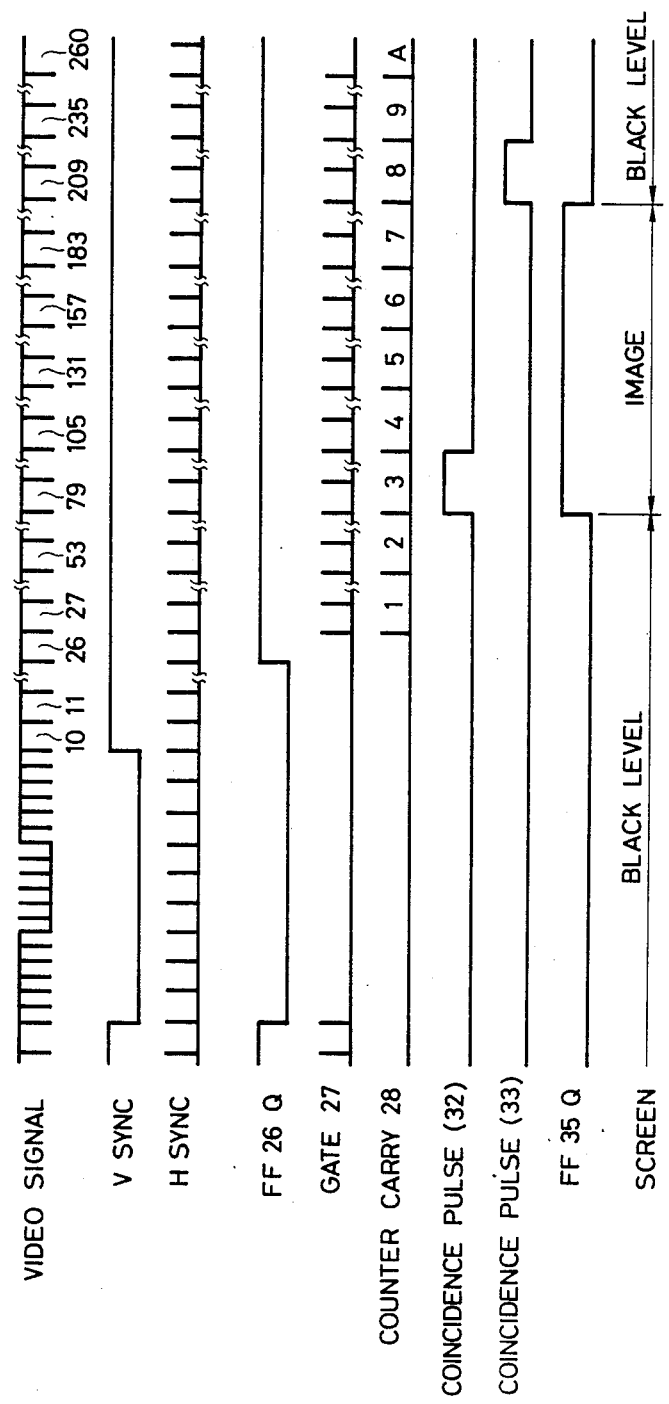
FIG. 18 is a timing chart of operations of the system shown in FIG. 17.

The timing of the above operation is illustrated in FIG. 18. While FIG. 18 shows a video signal in the first field in one NTSC frame, the same video signal is produced in the second field. In the above embodiment, data items indicative of the subblock where an image starts and the subblock next to the terminal end of the image are inserted in the control data for indentifying the image and digital data and detecting the position of the digital data. However, the invention is not limited to such an arrangement but is applicable to any arrangement which allows data identification and positional detection. For example, a subblock where digital data in an upper portion of the screen ends may be used in place of the subblock at the starting end of the image, or the subblock next to the terminal end of the image which is also, the subblock at the starting of digital data in a lower portion of the screen may be replaced with a block at the terminal end of the screen.

There are various programs in which audio digital data to be inserted, that is, SWS (Still-With-Sound) data, is monaural or stereophonic, or represents human voice or music. Arrangements for such various programs will be described below.

FIG. 10 is a block diagram of a device for reproducing a video format signal containing audio data contains various contents, kinds, and tonal quality. The video format signal is applied to a TV synchronizing separator 12 which separates vertical and horizontal synchronizing signals that are supplied to a timing signal generator 2 for generating timing signals synchronous with those signals. The video format signal is also applied to an ATC circuit 13 which automatically determines an optimum threshold level based on peak and pedestal levels of data inserted in the video signal for preventing data readout errors due to variations in the video signal among players and variations among video disks. This data indicating the video signal is transferred into an NRZ digital signal which is shaped in waveform. The digital signal data is then applied to a clock run-in separator which extracts a clock run-in signal applied to a system clock generator 18 that produces a system clock signal in synchronism with the clock run-in signal.

After the clock run-in signal has been separated the digital data is converted by an S/P converter 24 from serial data into eight-bit parallel data with a signal from the timing signal generator 2. From the eight-bit parallel data, there is separated control data by a control data separator 39 witha timing signal from the timing signal generator 2. A sampling code (described below) in the control data is discriminated and held by a sampling code discriminator 40 with a latch signal from the timing signal generator 2. Other control data items than the sampling code are stored in a control code buffer 20 with a timing signal from the timing signal generator 2. Audio data other than the control data having passed through the control data separator 39 is stored in a large capacity buffer memory 5 at addresses specified by an address counter 22. The address counter 22 is supplied at a clock input terminal with a signal of $f_2(W)$. After a head address has been specified by a system controller 7, the address counter 22 counts up pulses to successively write the data therein. $f_2(W)$ indicates the transmission rate upon compression on a time basis.

A clock signal of $f_1(R)$ used when reading the data out of the large capacity buffer memory 5 is a sampling clock signal generated by a sampling clock generator 41 according to an output from the sampling code discriminator 40. The sampling signal is applied to a D/A converter 9 to start D/A conversion. A head address for reading out the data is also specified by the system controller 7 in the same manner as when the data is written. The address counter 22 counts up pulses with the signal of $f_1(R)$. The sampling code is expressed in two bits and latched in the code discriminator 4. The sampling clock generator 41 can generate four types of sampling clock signals in response to two-bit information. In the illustrated system, the sampling clock generator 41 generates three sampling clock signals of 32 KHz, 64 KHz, and 96 KHz. The D/A converter 9 is operated at the three sampling frequencies. The audio data is digitized by adaptive delta modulation (ADM), and the ADM audio data is converted by the D/A converter 9 into an analog audio signal.

A decoder 42 controls a switching circuit 43 and a selector circuit 44 based on the two-bit sampling codes to allow the data to pass through filters 45 to 47 corresponding to the sampling codes, respectively. When the sampling clock is 32 KHz, the filter 45 having a band of 2.5 KHz is selected. When the sampling clock is 64 KHz, the filter 46 of a band of 5 KHz is selected. When the sampling clock is 96 KHz, the filter 47 having a band of 7.5 KHz is selected. The codes stored in the control code buffer 20 enable the system controller 7 to effect control modes dependent on the codes. Any control on a player is effected by a player controller 19 for a stop mode, a playback mode, a mode of successive image display, and other modes. Although omitted from illustration in FIG. 19, the system includes error correcting units 3 and 4 inserted in appropriate positions as shown in FIG. 11.

Operation of the system of FIG. 19 will be described with reference to a video data example shown in FIG. 20. It is now assumed that SWS data for a still image 1 is composed of SWS data 1 and SWS data 2, SWS data for a still image 2 includes SWS data 3 and SWA data 4, and SWS data for a still image 3 is made up of SWS data 5 and 6. Two-bit sampling codes in the control data are indicated in Table 2:

TABLE 2

|   | Sampling frequency | Corres. code | Audio band |
|---|---|---|---|
| 1 | 32 KHz | 01 | 2.5 KHz |
| 2 | 64 KHz | 10 | 5.0 KHz |
| 3 | 96 KHz | 11 | 7.5 KHz |

The control data is recorded in a next frame preceding the frae of data controlled thereby. While the VDP is in a reproducing mode, the sampling code of 64 KHz is detected by the sampling code discriminator 40 with the control data in the frame prior to reproduction of the SWS data 1, and the SWS data 1 and the SWS data 2 are stored in the large capacity buffer memory 5. The SWS data 1 and the SWS data 2 are reproduced at the sampling frequency of 64 KHz for the still image 1. Then, at the time of reproducing the still image 1, the sampling frequency of 32 KHz for reproducing the SWS data 3 and the SWS data 4 is detected by the sampling code discriminator 40, and thereafter the mode is shifted to a moving image reproducing mode, in which the SWS data 3 and SWS data 4 are stored and reproduced at the sampling frequency of 32 KHz for the still image 2. Likewise, the data are reproduced at 96 KHz for the still image 3.

Accordingly, the data items can be recorded and reproduced at different sampling frequencies dependent on the contents and kinds of the SWS data and the tone quality and the like of original audio information.

Figure 21:
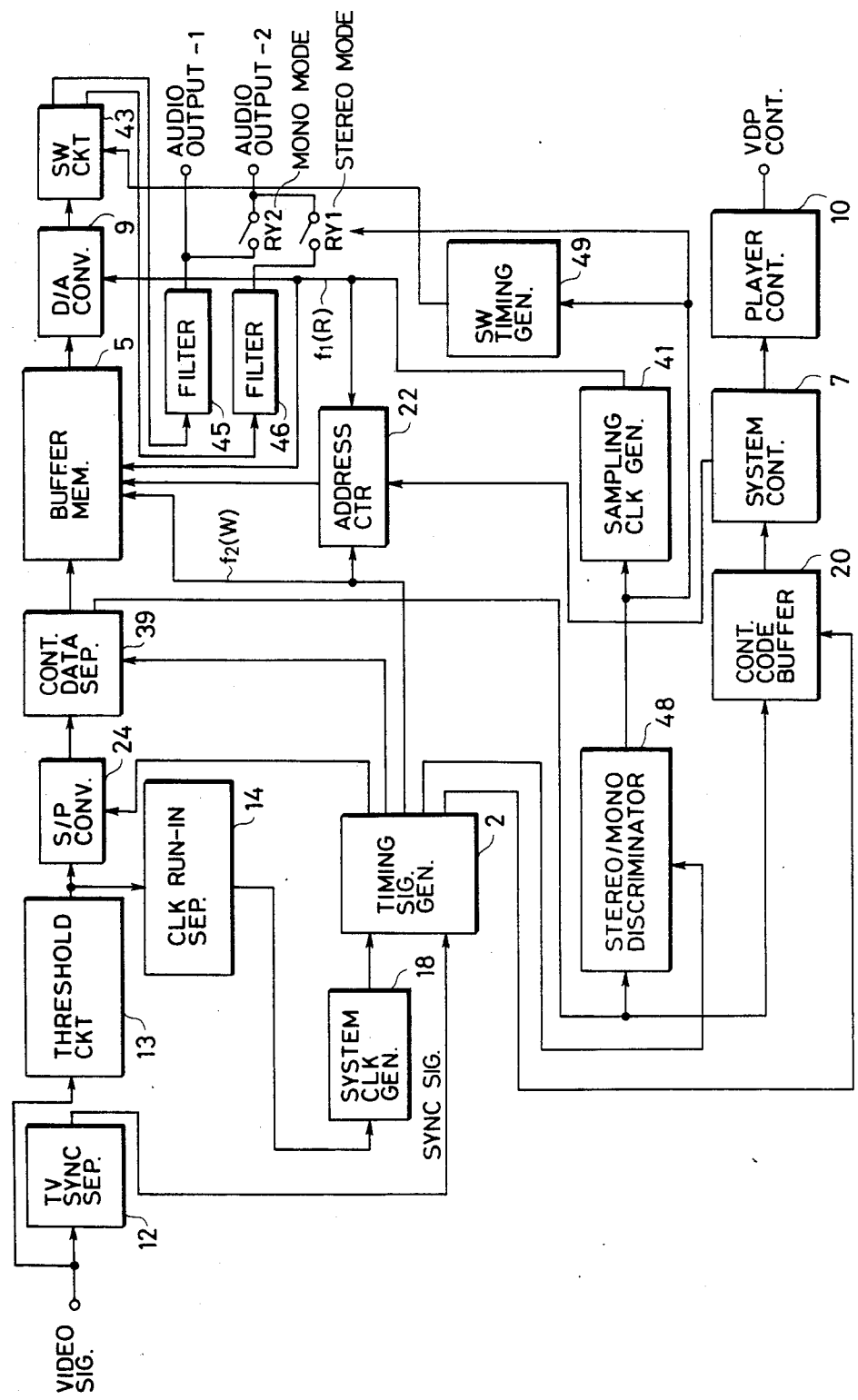
FIG. 21 is a block diagram of another system for reproducing a video format signal.
Figure 22:
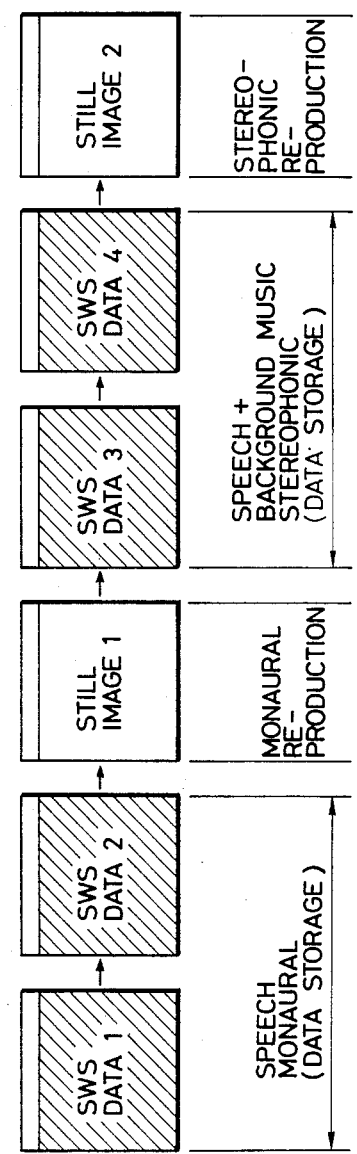
FIG. 22 is a diagram showing another example of video data.

Reproduction of monaural and stereophonic SWS data will be described with reference to FIGS. 21 and 22. FIG. 21 is a block diagram of a reproducing system, and only those portions thereof which differ from the system of FIG. 19 will be described. Stereophonic/monaural identification data inserted in the control mode is extracted and discriminated by a discriminator 48 which applies an output to a sampling clock generator 41, a switching timing generator 49, and relays RY1, RY2 for switching between audio output lines.

A switching circuit 43 serves to switch on analog audio signal to the applied selectively to filters 45 and 46 in response to a switching timing signal generated by the switching timing generator 49 dependent on the output from the discriminator 48. The filters 45 and 46 serve to eliminate high-frequency components such as sampling frequencies. The relays RY1 and RY2 serve to switch the audio signal dependent on the stereophonic and monaural modes. Although not shown, the system of FIG. 21 further includes error correcting units 3 and 4 as in the system of FIG. 19.

Operation of the system of FIG. 21 will be described with respect to a video data example of FIG. 22. The VDP is controlled to operate in a reproducing mode, and the stereophonic/monaural identification data in the control data in the frame prior to the SWS data 1 is extracted and discriminated as a monaural mode. SWS data 1 and SWS data 2 are stored in the large capacity buffer memory 5. The data items stored in the large capacity buffer memory 5 are then read out for monaural reproduction when the still image 1 is being reproduced. Then, a stereophonic mode is determined by the control data in the frame of the still image 1, and SWS data 3 and SWS data 4 are stored in the memory 5. When the still image 2 is read out, the data items are read out for stereophonic reproduction.

$f_1(R)$ has a frequency equal to the sampling frequency in the monaural mode, and to twice the sampling frequency in the stereophonic mode for time expansion. The relationship between $f_1(R)$ in the stereophonic and monaural modes is: $f_1(R)$ in stereophonic mode $=2\times(f_1(R)$ in monaural mode), if the same band is to be obtained in the stereophonic and monaural modes. Therefore, the sampling clock generator 41 generates a sampling frequency of the above relationship dependent on the monaural/stereophonic identification data to read the data out of the large capacity buffer memory 5.

While in this embodiment the output from a D/A converter 9 is separated by the switching circuit 43 in the sterephonic mode, these two circuits may be switched to separate the output from the large capacity buffer memory 5 with the switching circuit, connect the D/A converter to the separated outputs, and connect the filters 45 and 46 respectively to the outputs of the D/A converter.

Although the control data is described as being recorded in the next frame prior to the frame of the data controlled thereby, the control data may be recorded in the frame of the data to be controlled.

Figure 19:
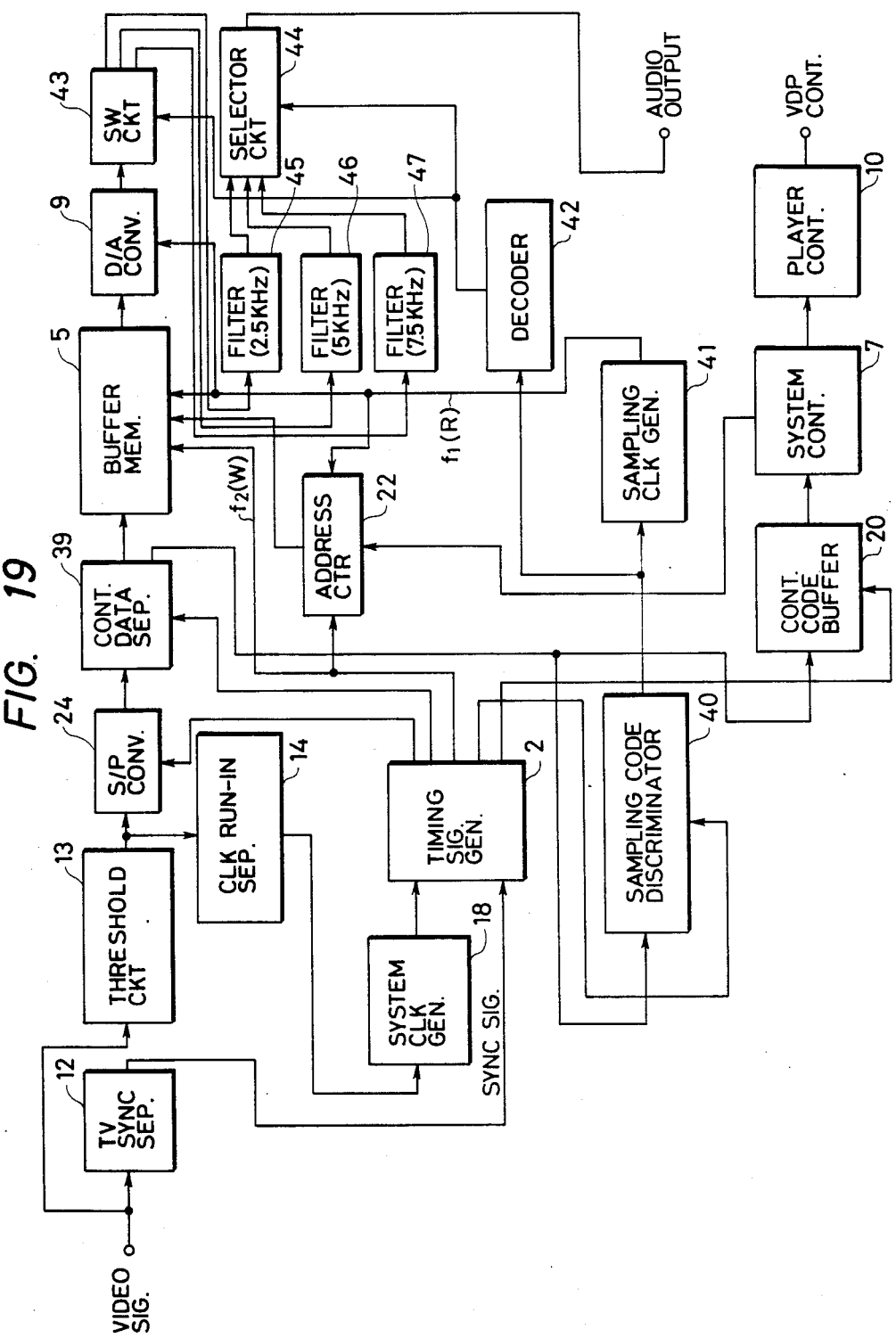
FIG. 19 is a block diagram of a still further system for reproducing a video format signal.
Figure 20:
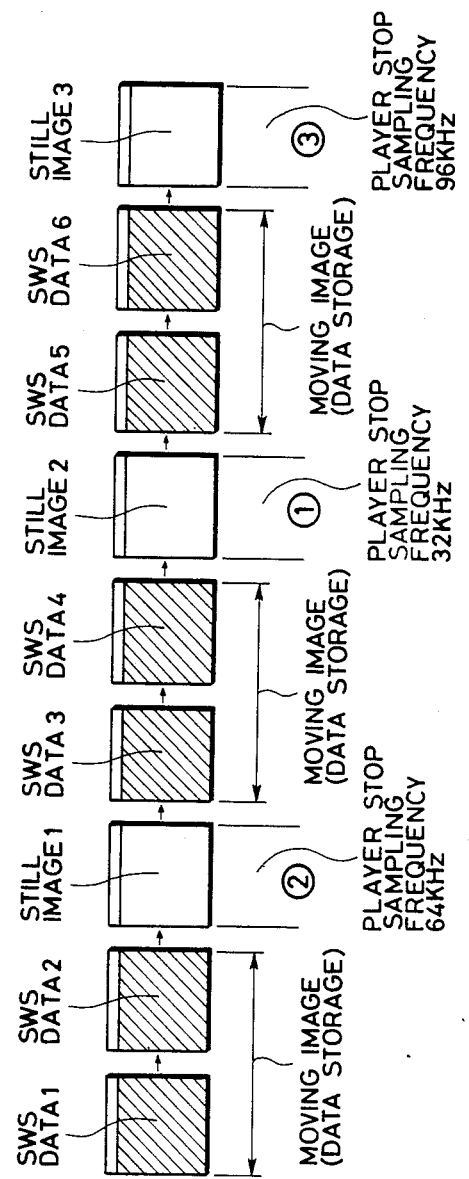
FIG. 20 is a diagram showing an example of video data.

In the embodiment of FIG. 19, three low-pass filters corresponding to the sampling frequencies are employed and independently switched for the respective bands. However, a single switched capacitor filter (composed primarily of a switch and a capacitor and having transmission characteristics variable in similar patterns with frequencies by changing the clock frequencies) may be employed to meet the various sampling frequencies. This filter can serve as filters of the bands by changing the clock frequency dependent on the sampling frequencies. Alternatively, a microcomputer may be incorporated for control.

Figure 23:
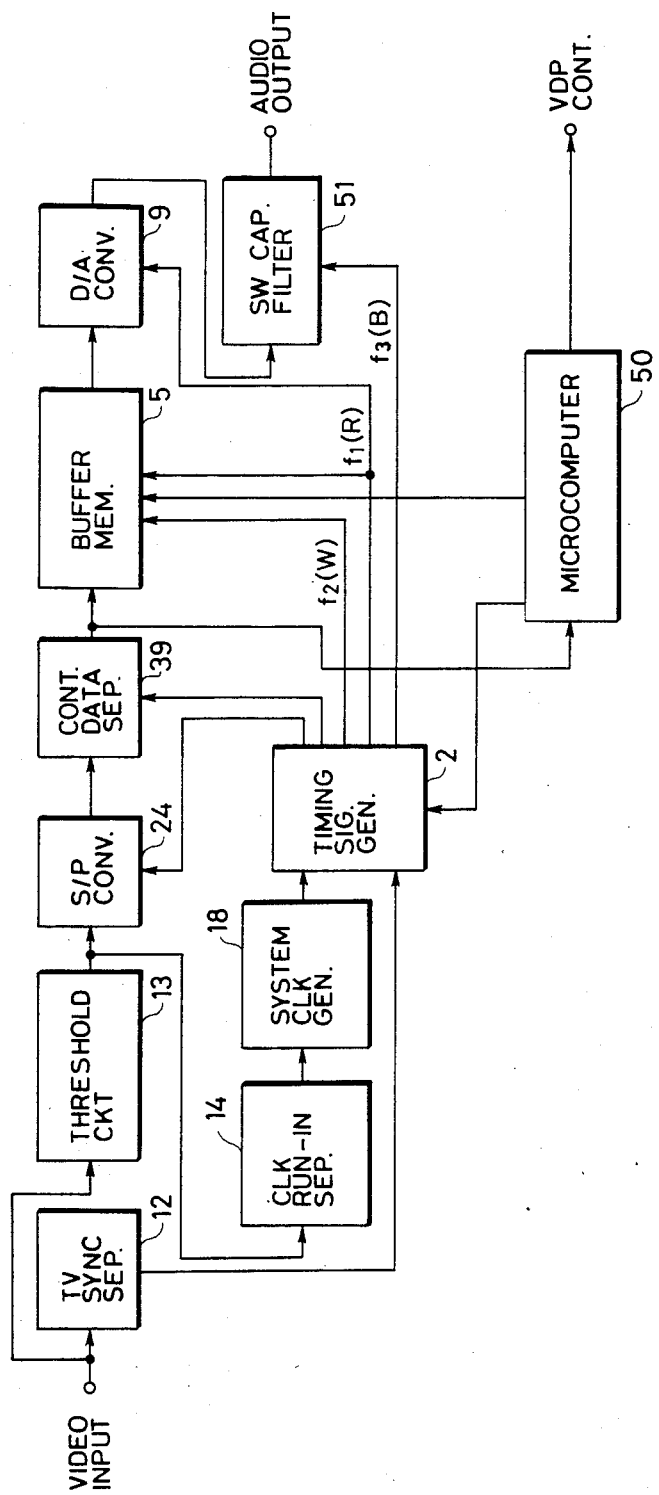
FIG. 23 is a block diagram of another system for reproducing a video format signal.

FIG. 23 is illustrative of a system which includes a switched capacitor filter and a microcomputer. Those parts which have been described with reference to FIG. 19 will not be described. Error correcting units 3 and 4 are omitted from illustration in FIG. 23. Control data separated by a control data separator 39 is applied to a microcomputer 50. The microcomputer 50 serves to supply address signals to a large capacity buffer memory 5 upon writing and reading data, generate player control signals, and supplies a timing signal generator 2 with three sampling frequencies by decoding sampling frequency switching codes and a control code for generating a clock frequency to a switched capacitor filter 51.

The timing signal generator 2 generates, in addition to the writing pulses of $f_2(W)$, three sampling pulses of $f_1(R)$ under the control of a control signal from the microcomputer 50 and a clock frequency of $f_3(B)$ for achieving the function of filters of bands corresponding to the sampling pulses. The pulses of $f_1(R)$ are supplied to the large capacity buffer memory 5 and a D/A converter 9, and the pulses of $f_3(B)$ are supplied to the switched capacitor filter 51. The switched capacitor filter 51 shifts transmission characteristics in similar patterns dependent on the clock frequency to achieve the function of the various band filters.

While the digital data is SWS data corresponding to an image in the foregoing arrangement, other information such as data information related to an external device, for instance, a digital signal processing device such as a personal computer may be added. By supplying such additional information to the external device, the VDP and the computer may be controlled to advantage by employing a video disk as a recording medium.

External digital data other than the internal SWS data can be inserted as desired in the block c, and identifying information for identifying internal and external data in the control data in the block b. FIG. 24 shows such an identifying information signal by way of example. An internal and external digital data identifying bit Y is inserted in the control data. When Y is "0" the data is internal SWS data, and when Y is "1" the data is external digital data. Another internal and external digital data identifying bit X may be inserted in another location. When X is "0", the control data following X is internal control data, and when X is "1", the control data is external control data. By discriminating the identifying bits X and Y in the reproducing mode, supply of data to and control of the external device such as a personal computer can be performed.

FIG. 25 is a block diagram of a reproducing system for such an application. An input video format signal includes internal and external digital data and control data, and is applied to a signal separator 1 and a screen processor 8. Separated synchronizing signals are applied to an input terminal of a timing signal generator 2. The control data separated by the signal separator 1 is applied to an input terminal of an error correcting unit 4. Internal (audio) data items or external data items are successively transmitted to and stored in a large capacity buffer memory 5 for expanding data on a time basis with a timing signal of $f_2(W)$ generated by the timing signal generator 2. The data items are then read out of the large capacity buffer memory 5 with a signal of $f_1(R)$ issued from the timing generator 2, and are applied to an error correcting unit 3. The corrected internal (audio) or external data items are applied to an input terminal of a data separator 52. The audio data separated by the data separator 52 is applied to an input terminal of a D/A converter 9 which converts the digital signal into an analog audio signal. The audio signal is expanded on a time basis by maintaining the frequency relationship of $f_2(W) > f_1(R)$. The corrected control data issued from the error correcting unit 4 is applied to an input terminal of a control code decoder 6.

An internal control data output separated by a data selector or the like with the bit in the position X in the data shown in FIG. 24 is applied to an input terminal of a system controller 7, and an external control data output from the control code decoder 6 is fed to an external interface 53. A digital data control signal in the form of the bit in the position Y in the internal control data which is one of the outputs from the system controller 7 is applied to the data separator 52. The data separator 52 issues an external data output to the external interface 53.

One of the outputs from the system controller 7 is applied to a writing and reading switching control terminal of the large capacity buffer memory 5, and other outputs are applied to a control terminal of the timing signal generator 2 and an input terminal of the screen processor 8. The screen processor 8 issues ordinary images as they are, and issues digital signals as converted into a black level.

A player controller 10 is responsive to various signals from the system controller 7 for producing control signals to stop the VDP, operate the VDP in an ordinary reproducing mode, display successive images, for example. An output from the external interface 53 is applied to an external input terminal of an external system (personal computer) 54. The personal computer 54 is supplied with external data and external control data for effecting various modes of operation. An external output (a player control demand or an SWS reproducing control, in general) from the personal computer 54 is applied to an input terminal of the external interface 53. The signal thus applied to the external interface 53 is applied to an input terminal of the system controller 7 and processed therein together with the internal control data. An RGB (three primary color) output from the personal computer 54 and a video output processed by the screen processor 8 are applied to input terminals of an external screen processor 55. A control signal from the personal computer 54 is applied to a control terminal of the screen processor 55. The screen processor 55 switches and issues a video output, an RGB output, and an output composed of the video and RGB signals. A keyboard 56 serves as a general input device for the personal computer.

Figures 26, 27:
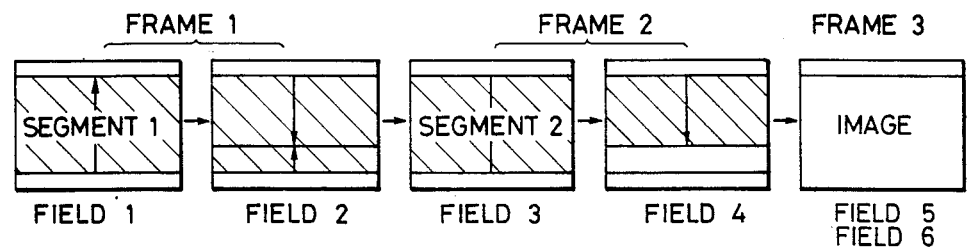
FIG. 26 is a diagram of still another example of video data.
FIG. 27 is a diagram showing the relationship between a block C and data identifying codes.

FIG. 26 shows another video format composed of digital data from the external device such as a personal computer and internal SWS data in the VDP. In this embodiment, the block c in each field is divided into three subblocks (hereinafter referred to as "blocks") $c_1$ to $c_3$. The content of a segment 1 is SWS data explanatory of a still image (frame 3), and is composed of a total of five blocks including the blocks $c_1$ to $c_3$ in the field 1 and the blocks $c_1$ and $c_2$ in the next field 2. A segment 2, which is external data, and is composed of a total of six blocks including the block $c_3$ in the field 2, the blocks $c_1$ to $c_3$ in a field 3, and the blocks $c_1$ and $c_2$ in a field 4. The block $c_3$ in a field 4 is a black-level image. The relationship between information related to these fields, segments, and blocks and internal and external data identification codes is shown in FIG. 27. The block count number is indicative of the count in a block counter 63 in a system illustrated in FIG. 28. Segment numbers are allotted to digital data items for respective segments, and the amount of data in each segment is expressed in the number of subblocks.

Figure 28:
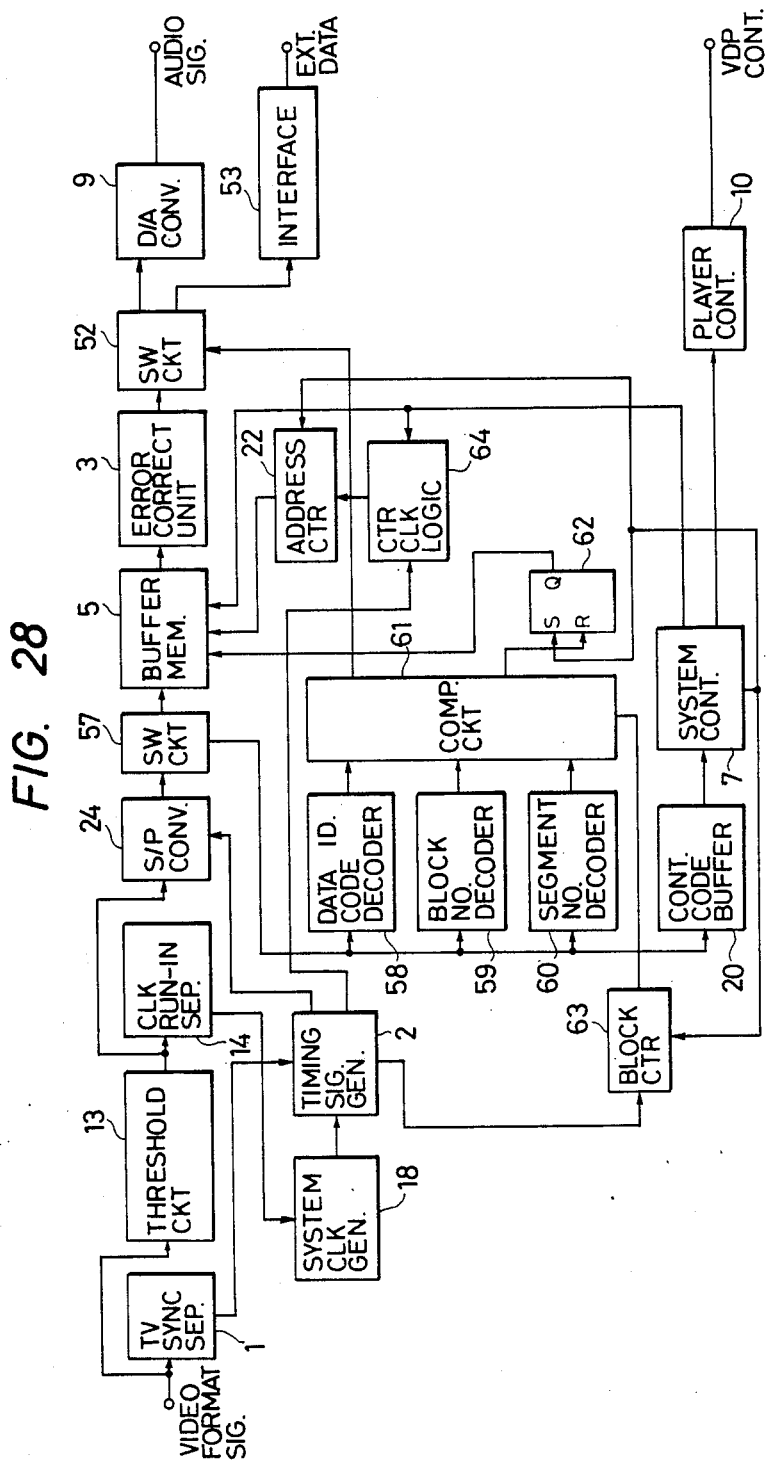
FIG. 28 is a block diagram of still another system for reproducing a video format signal.

FIG. 28 is a block diagram of a reproducing system suitable for reproducing a video format signal shown in FIG. 26. The system includes a circuit 57 for switching and issuing control data and other digital data, a switching circuit 52 for selectively issuing SWS data to a D/A converter 9 and other digital data to an interface circuit 53, a block counter 63 for counting pulses in each period of one block when data items are fed to a large capacity buffer memory 5, the block counter 63 being reset by a pulse from a system clock generator 18 as required, a data identification code decoder 58 for decoding digital data to ascertain whether it is SWS data or other external data based on a control code, a block number decoder 59 for decoding a code indicative of the number of blocks constituting each digital data item based on the control code and delivering the block number to a comparator 61, and a segment number decoder 60 for decoding a code indicative of each segment number based on the control data and issuing the segment number to the comparator 61.

The comparator 61 is responsive to the segment number, the block number, and the data identification code as decoded by the decoders 58 to 60 and an output from the block counter 63 for issuing a "0" while the block of SWS data is read out of the large capacity buffer memory 5 and issuing a "1" while the block of external data is read. When all data items are completely read out, the comparator 61 generates a reset pulse to reset an FF 62. The codes other than the control codes decoded by the decoders 58 to 60 are temporarily stored in a control code buffer 20. The FF 62 is set by an output from the system controller 7. Although omitted from illustration in FIG. 28, the system also includes an error correcting unit 4 inserted in an appropriate position.

The data items are successively written into the large capacity buffer memory 5, starting from head data in the segment 1 until all data items contained in the segments 1 and 2 are stored. Then, when the VDP starts reproducing a still image, the system controller 7 resets the block counter 63 and simultaneously place the large capacity buffer memory 5 into a readout mode. At the same time that the reading of the head block in the segment 1 is completed, the block counter 63 counts "1" and thereafter counts up pulses one by one each time one block is read out of the large capacity buffer memory 5. The blocks corresponding to the segment 1, that is, while the block counter 63 counts from "0" up to "4", correspond to a data identification code "0" (see FIG. 27), and a "1" representing SWS data is delivered to the switching circuit 52. The blocks corresponding to the segment 2, that is, while the block counter 63 counts from "5" to "10", correspond to a data identification code "1", and a "0" indicative of external data is issued to the switching circuit 52.

When the block counter 63 reaches "11" and all data items have been read out, the comparator 61 resets the FF 62 which produces a Q output to stop the reading of the large capacity buffer memory 5. Based on the above operation, the content of the segment 1 is issued as an audio signal from the D/A converter 9, and the content of the segment 2 is issued as external data through the interface 53 to a personal computer, for example.

Many applications are made possible by recording not only SWS data but characters and other codes in addition to still images, recording different SWS data items and characters or the like, and selecting these data and codes in a reproducing mode. Such a system will be described hereinbelow.

Figures 32, 33:
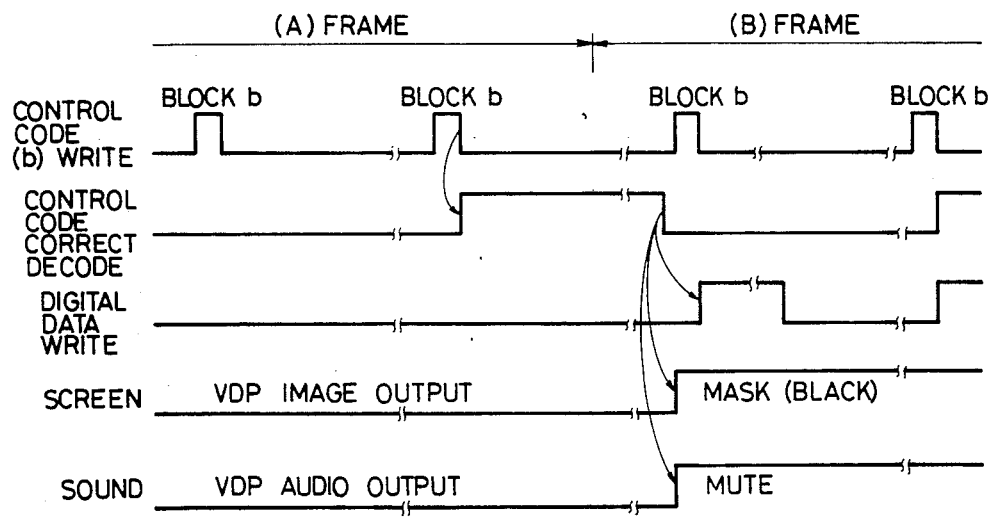
Figure 34:
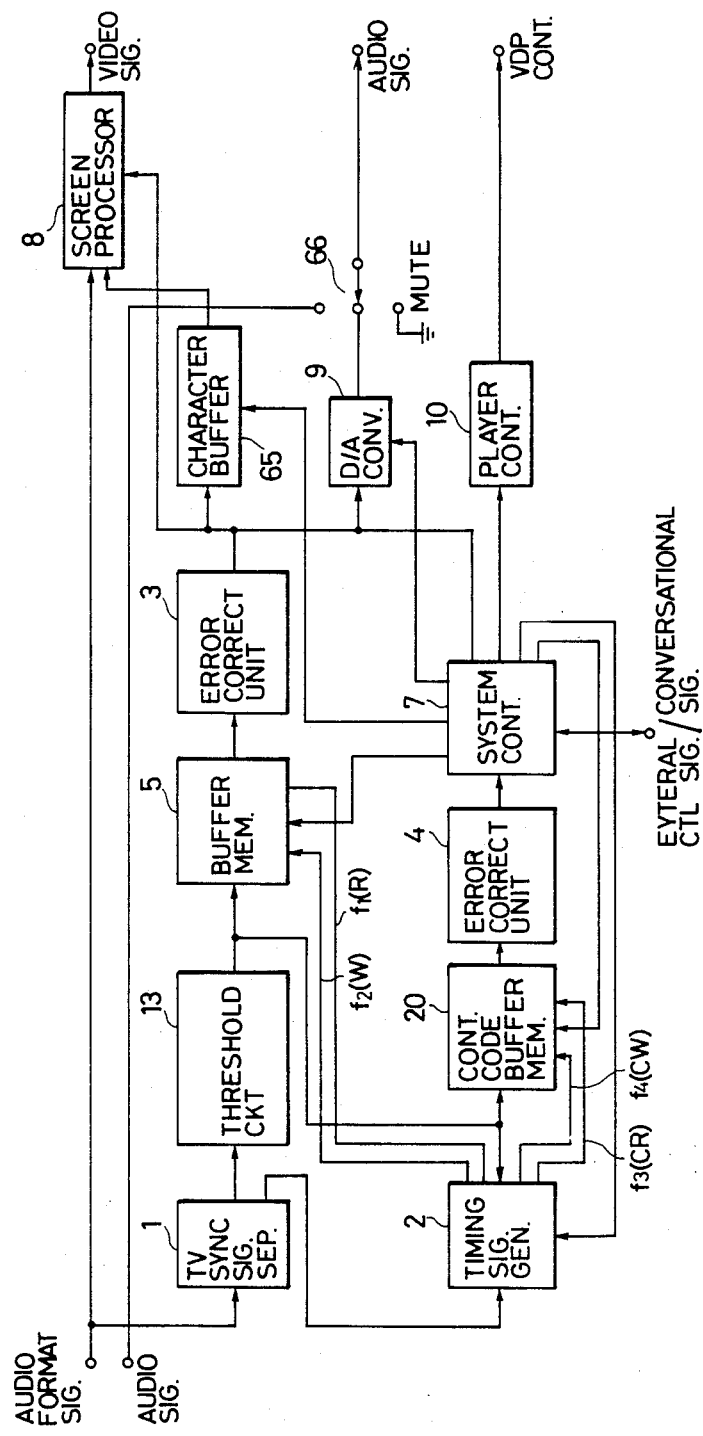
FIG. 34 is a block diagram of another system for reproducing a video format signal.

FIG. 29 is illustrative of a recorded video format for use with such a system. Each control code is recorded in a block b which is located one frame prior to an image and digital data to be controlled. Several different audio signals and characters and other digital data items are recorded with respect to one still image. In the illustrated example, four sound signals and data items are recorded. FIG. 30A shows sounds and character data items by way of example. FIG. 30B shows four sound signals. FIG. 30C illustrates four data items in which data 1 is data for comparison with an external input, and data 2 through 4 are indicative of character codes. FIG. 31 shows various control codes and corresponding processing modes. All of the illustrated codes are ASCII codes. $Y_1$ and $Y_2$ are segment numbers given to sounds and other data items, and $X_1$ to $X_6$ are sub-block numbers indicative of the amounts of data of the segments $Y_1$ and $Y_2$. FIG. 32 illustrates control codes in frames for the example of FIG. 30A in the video format shown in FIG. 29. FIG. 34 is a block diagram of an SWS decoder in the system.

The SWS decoder includes a control code buffer memory 20 for storing control codes in a prior frame. The control codes are read out of the control code buffer memory 20 and decoded, followed by various steps of processing. A system controller 7 determines whether digital data is SWS data or character data, or data for comparison with an external signal, and supplies various control data to respective blocks. The system controller 7 also has a control function for directly issuing a video signal, setting the screen at a black level, displaying characters on the black background, or adding characters to a video signal. Stated otherwise, image processing is effected while controlling operations of a character buffer 65 and an image processor 8. The character buffer 65 is a memory for temporarily storing character codes for characters to be displayed in image synthesis.

FIG. 32 shows the contents of control codes recorded in the block b in each frame in the event that sound character codes shown in FIG. 30A are recorded on a recording medium in the video format of FIG. 29. Image signals are generally reproduced in the order of odd-numbered fields and then even-numbered fields. Prior to reproductiong of the blocks a and b in an odd-numbered field, image and sound control is carried out according to a control code in a frame which is one frame prior to the frame. The, the block a is reproduced, and clock and data synchronization established in the reproducing system. Thereafter, the block b is reproduced, and a control code in the next frame is temporarily stored in a storage area for an odd-numbered field in the control code buffer memory 20 in the reproducing system. Then the block c is reproduced. Where the recorded content of the block c is an ordinary moving image, the image and audio signals are outputted based on signals supplied from the player. Wher the recorded content is digital data, digital data specified by the control code in the previous frame is read into the large capacity buffer memory 5 and the video and audio are muted. The reproduction of the block c is then completed, and the block Q is reproduced, followed by reproduction of an even-numbered field, in which the blocks a and b are reproduced in the same manner as the odd-numbered field. A control code recorded in the block b is stored in an even-numbered field area in the control code buffer memory 20. After the block b has been reproduced, a code for controlling a next frame is read into the control code buffer memory 20 in the decoder. Then the block c is reproduced. The block c in this frame is processed by a control codee read in the frame prior to this frame in the same manner as the odd-numbered field. At the same time, any error in the control code read in this frame is corrected, the control code is deinterleaved and decoded, and control signals are set in various parts in the system controller 7. Upon completion of reproduction of the blocks c and Q and prior to reproduction of a next frame, the video, audio and data signals are processed on the basis of control signals read in the frame and set in the various parts in the system controller 7.

Operations will be described in detail with reference to FIGS. 29 and 32. The frame of FIGS. 29A to 29E will be reproduced. In FIG. 34, when dodes AM, PM, and DAW101006018 to DAW03006078 are stored in the control code buffer memory 20, errors are corected by an error correcting unit 4, the corrected control codes are decoded by the system controller 7, and various control signals are set in a control output latch. Since an image (moving image) is recorded in this frame, video and audio outputs of the decoder are outputted from the player. Then, prior to reproduction of the frame of FIG. 29B, signals set in the parts in the system controller 7 effect direct control on the various components. The sound output is muted because AM is a code indicative of muting of the audio output. A video signal which makes the screen black is issued since PM is a code indicative of screen muting. Then, the blocks are successively reproduced. In the block b, a control code for the next frame is read, and in the block c, specified digital data is stored in the large capacity buffer memory 5. In this manner, the control codes are read into the decoder always one frame prior to the frame to be controlled in order to control the next frame and effect various control modes in the next frame. For reproducing the frame of FIG. 29E, control is effected using control codes read in the frame of FIG. 29D. Since AS initially indicates that the sound output is an SWS data sound output, the SWS data is subjected to D/A conversion, and an audio signal for a still image, after passed through a low-pass filter, is issued. PA serves to issue the sum of a video signal from the player and characters. Since PA is followed by SCT, no sound due to SWS data is produced and no character codes are read out so that only an image output from the player is issued. In the present frame, a stop code recorded in the vertical blanking period is decoded in the player, and a still image is reproduced. SCT is a command for issuing a group of data items specified externally, and hence no sound and character are issued unless instructed externally. If a second sound and a second character are specified externally, then SWS data is read out of a specified address in the large capacity buffer memory 5 and converted from a digital signal into an analog signal, which is issued through the low-pass filter. Character data is also read out of the large capacity buffer memory 5, stored in the character buffer 65, and then combined with the image output signal from the player for supply to an external device. In the illustrated example, the sound "mother" and the characters "Mother" are issued. Where other sounds and characters are to be issued, another code may be supplied from an external source. Short sentences, words and characters may be stored in advanced in the large capacity buffer memory 5 in relation to control codes, and other digital data containing desired sound and characters may be selected from the stored data and issued. When shifting from a still image reproducing mode into another mode, a control signal may be delivered from a remote control unit to the player. FIG. 33 is a timing chart showing processing of (A) and (B) frames on a time basis.

Operation of the system shown in FIG. 34 will be described. A video signal is applied to an input terminal of the TV synchronizing signal separator 1 and an intput terminal of the video processor 8. Vertical and horizontal synchronizing signals separated by the TV synchronizing signal separator 1 are applied to an input terminal of the timing signal generator 2. The timing signal generator 2 generates a system clock signal synchronous with the data and also generates timing signals in each block in the decoder based on the vertical and horizontal synchronizing signals. A timing signal of $f_4(CW)$ temporarily stored in the control code buffer memory 20 is a signal generated in horizontal lines 23 to 36 in each field. A timing signal $f_3(CR)$ for reading the control codes from the control code buffer memory 20 into the system controller 7 is a timing signal generated in 27 horizontal line or thereafter in even-numbered fields. Designated at $f_2(W)$ is a timing signal generated when digital data items are read into the large capacity buffer memory 5, and produced in the period of horizontal lines 27 to 260 where data is recorded in the block c. Designated at $f_1(R)$ is a timing signal generated when digital data is read out of the large capacity buffer memory 5 and produced when reproducing a still image and dependent on a sound sampling frequency if the digital data is SWS data. If the frequencies meet the relationship: $f_2(W) > f_1(R)$, then the SWS data is expanded on a time basis.

Each timing is controlled by generating the above various timing signals based on a control signal from the system controller 7. A video signal issued from the TV synchronizing signal separator 1 is applied to an input terminal of the threshold circuit 13. The threshold circuit 13 converts data items of the video signal into a series of digital signals by selecting a digital signal of "1" when the amplitude is larger than a preset level and a digital signal of "0" when the amplitude is smaller than the preset level, and then converts the digital signal series into eight-bit parallel data, which is supplied to the control code buffer memory 20 and the large capacity buffer memory 5. The control code buffer memory 20 obtains from the system controller 7 an address of an area for storing a control code for an odd-numbered field and an address of an area for storing a control code for an even-numbered field, and successively stores the addresses therein with the signal of $f_4(CW)$ generated by the timing signal generator 2. Upon completion of the control codes in the even-numbered field, then erroes are corrected by the error correcting unit 4 with the signal of $f_3(CR)$ and thereafter the corrected codes are applied to an input terminal of the system controller 7. The system controller 7 decodes the codes and set signals in various processing components. For a code for controlling the capacity of digital data, it is converted from an ASCII code into binary data which is set in a data control register for controlling the video processor 8 and a sound changeover switch 66 prior to reproduction of a next frame. Digital data supplied from the threshold circuit 13 is applied to an input terminal of the large capacity buffer memory 5. The large buffer memory 5 successively stores the applied data according to the timing signal $f_2(W)$ from the timing signal generator 2 and address signals for data writing from the system controller 7. Then, upon completion of writing of the data into the large capacity buffer memory 5, the data items are normally supplied from the large capacity buffer memory 5 to an input terminal of the error correcting circuit 3 according to the timing signal $f_1(R)$ obtained from the timing signal generator 2 and readout address signals obtained from the system controller 7. The data items are then corrected and deinterleaved by the error correcting unit 3. Thereafter, where the data items are SWS data items, they are applied to an input terminal of the D/A converter 9 by the system controller 7. The digital signal is converted by the D/A converter 9 into an analog signal, and then an audio signal is supplied through the low-pass filter and the sound changeover switch 66 to an external device. Where the data items are character data items, they are passed through the character buffer 65 according to a control signal from the system controller 7 and then combined with a video signal from the player by the vido processor 8, and the combined signal is supplied to the external device. Where the data items are composed of several kinds of sounds and character data, a control code (SCT) indicative of selection and readout in advance is read in and decoded one frame before so that no sound and character is issued unless an externally specified code is supplied. When an externally specified code is supplied to the system controller 7, the system controller 7 decodes the supplied code, and supplies address where specified SWS data and character data are recorded in the large capacity buffer memory 5 to the large capacity buffer memory 5, supplies a control signal to the timing signal generator 2 to generate pulses of $f_1(R)$ and supplies control signals to the D/A converter 9 and the character buffer 65 for thereby issuing specified sounds and characters. Where different sounds and characters are specified, the same process is followed for issuing such sounds and characters. In case the digital data is data for comparison with an external signal as indicated by data 1 in FIG. 30A, an error is corrected, and then the corrected data is supplied to the system controller 7 to wait for a data input from an external source.

For moving images, analog audio signals are normally recorded in superposed relation using generally known frequency multiplexing techniques. The analog audio signals applied as a reproduced output by the second changeover switch 66.

Where control data in the block c in each of the above examples is inserted in the same frame as digital data processed by the control data and as image information, it is necessary to effect high-speed processing in order to reproduce, decode, and identify the control data. To meet this requirement, high-speed circuits (emitter-coupled logic or Schottky device logic) for processing control codes at high speeds are required, making it difficult to reduce the size of the circuit and achieve a lower power consumption rate.

To eliminate this problem, the control data corresponding to the digital data to be processed as described above and image information is inserted at least one frame before the frame in which the digital data is inserted so that a period equivalent to at least one frame is available as a processing time for reproducing, decoding, and otherwise processing the control data.

More specifically, as shown in the timing chart of FIG. 33 with respect to the video format of FIG. 29, the control code in the block b in the frame (A) is corrected and decoded while an image in the frame (A) is being processed for reproduction, and the data processing for the successive frame (B) is effected according to the control code.

Figure 35A:
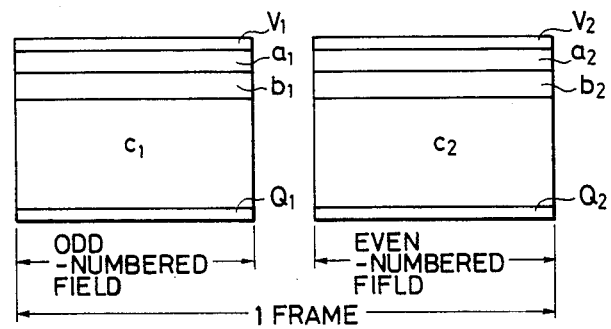
FIGS. 35A and 35B are a set of diagrams showing an example in which control data is inserted in a video format signal.
Figure 35B:
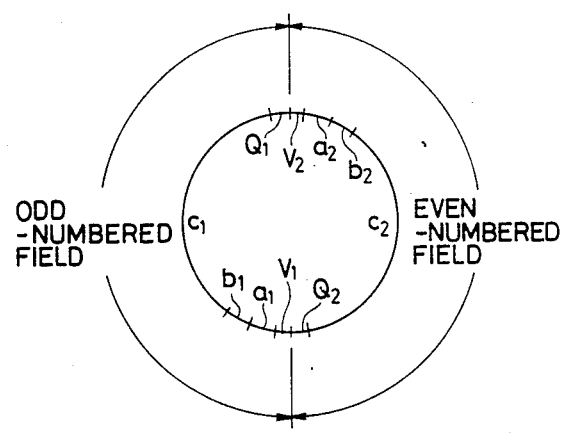

As the amount of information in the control codes increases, the control codes are assigned and inserted over the same horizontal scanning line corresponding to two fields (odd-numbered and even-numbered) constituting one frame. FIG. 35 shows such a control code assignment and insertion. Designated at V is a vertical synchronizing signal and blanking period. Blocks a, b, c, and Q are the same as those shown in FIG. 3. Suffixes 1 and 2 indicate odd-numbered and even-numbered fields, respectively. The numbers of scanning lines are as shown in FIG. 5. Although the control codes recorded in the block b have been described as being independently corrected and interleaved, interleaving and error correction are completed in two fields or one frame in order to add error correcting signs having a high error correcting capability. In the block c, interleaving and error correction are completed in each subblock (FIG. 3). The block b includes various control codes having information important for the control of the device, and is thus given error correcting codes having a high error correcting capability. For example, an error detecting signal and two error correcting codes are combined for correcting two words. Since there is no problem occurring with the digital data in the block c even if more or less error correction failure takes place unless any abnormal sound is produced or characters that cannot be understood are generated, the error correcting capability may be lower, and only one error correcting code, for example, may be used for correcting one word.

Figure 36:
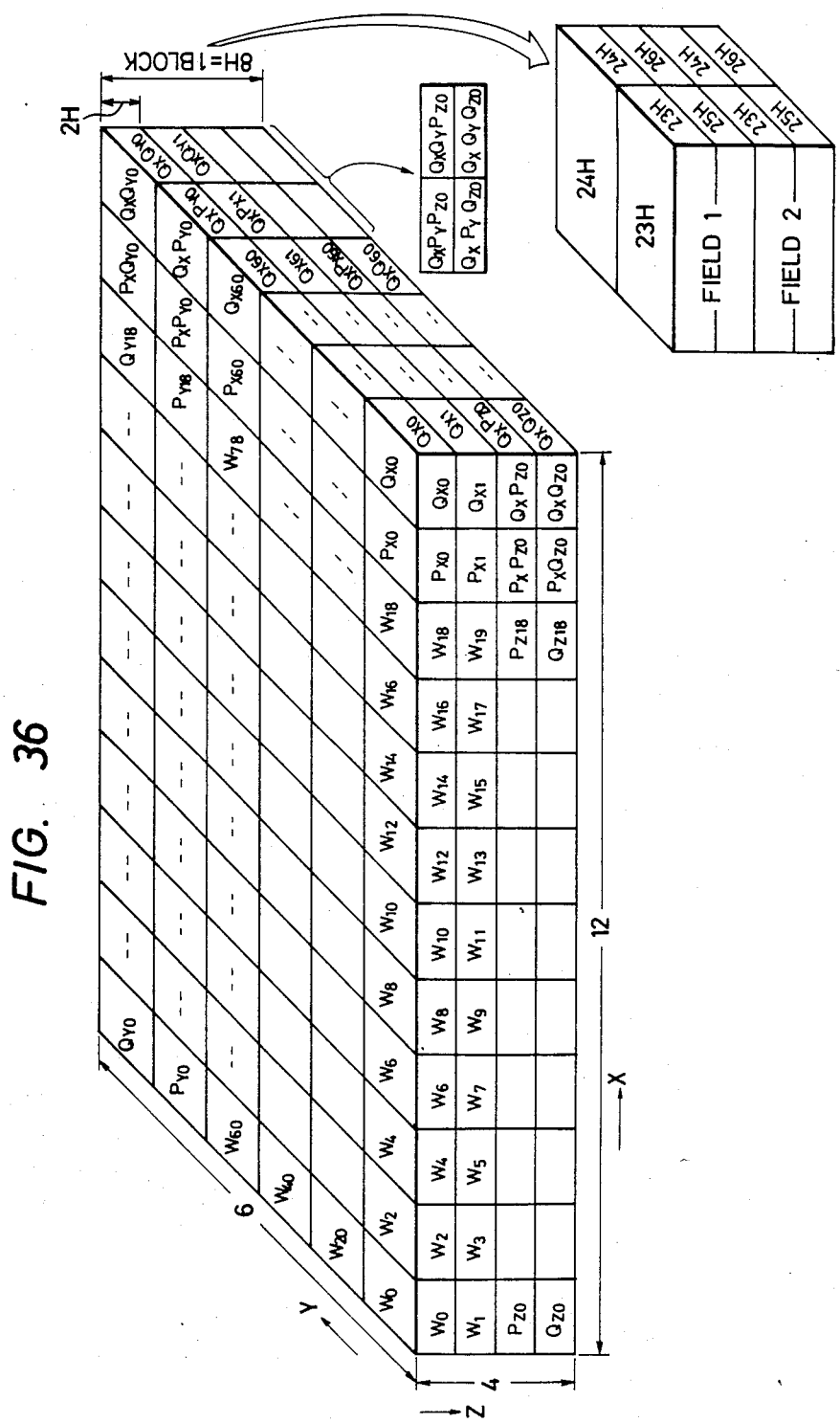
FIG. 36 is a diagram illustrative of the manner in which an error of control data is corrected.

FIG. 36 is a diagram showing error correction for control codes, wherein data words $W_i$ (i=0, 1, ..., 79) and parity words P and Q are recorded in blocks b in odd-numbered and even-numbered fields. The blocks b are located in horizontal lines 23 to 26 in each field, and the number of scanning lines in one frame is a total of eight horizontal line. 288 bytes of information are recorded. The effective information capacity (data word) is 80 bytes, and the remaining 208 bytes are indicative of parity words p and Q in the directions of X, Y and Z of a rectangular parallelepiped shown in FIG. 36. The suffixes X, Y and Z of P and Q are representative of directions of code words containing the parties. The numerical suffixes correspond to the numbers of head words of the code words. The word $P_X P_{Y0}$ is a parity $P_X$ in the direction X and at the same time a parity in the direction Y, and indicates that the numbers of $P_X$ and $P_Y$ at the heads in the directions are "0". The word $Q_X Q_Y Q_{Z0}$ is indicative of a parity $Q_X$ in the direction X, a check word $Q_Y$ in the direction Y, and a parity in the direction Z. Other words expressed by a combination of Ps or Qs and suffixes can be interpreted in the same way. One word is composed of eight bits.

A group of twelve words; $W_0$, $W_1$, $W_{20}$, $W_{40}$, $W_{41}$, $W_{60}$, $W_{61}$, $P_{Y0}$, $Q_{Y0}$, $P_{Y1}$, $Q_{Y1}$ belonging to a YX plane on the lefthand end are used as a frame identification code, as described later. Error detection is carried out by the code (n, k)=(12, 10) given for each ½ horizontal scanning line. This corresponds to error detection in the direction X according to $P_X$ and $Q_X$ as shown in FIG. 36. Error correction is carried out by the code (n, k)=(6, 4) given for six words for every ½ horizontal line. This corresponds to error correction in the direction Y according to $P_Y$ and $Q_Y$ in FIG. 36. Furthermore, error correction is effected by the code (n, k)=(4, 2) given for four words for every two horizontal lines. This corresponds to error correction in the direction Z according to $P_Z$ and $Q_Z$ in FIG. 36.

In this example, error detection and correction is effected for each eight-bit word by a Reed-Solomon code on the Galois field $GF(2^8)$, and an atomic element $\alpha$ is the root of $P(x) = x^8 + x^4 + x^3 + x^2 + 1$. $\alpha = (00000010)$. A check matrix H is given by:

$$H = \begin{bmatrix} 1, & 1, & \ldots 1, 1 \\ a_{n-1}, & a_{n-2}, \ldots a, 1 \end{bmatrix},$$

This can be expressed in bits by a matrix T as follows:

$$T = \begin{bmatrix} I, & I, & \ldots I, I \\ T^{n-1}, & T^{n-2}, \ldots T, I \end{bmatrix},$$

where I is a unit matrix of eight rows and eight columns, and T is the following matrix of 8 rows and 8 columns:

$$T = \begin{bmatrix} 01000000 \\ 00100000 \\ 00010000 \\ 10001000 \\ 10000100 \\ 10000010 \\ 10000001 \\ 10000000 \end{bmatrix}$$

To determine an error position and the content of an error, a syndrome S as defined below is determined, and the error is detected and corrected on the basis of S.

$$S = [S_P S_Q]^t = H[W_{n-1}, W_{n-2}, \ldots W_2, P, Q]^t,$$

where the suffixes of W are sequentially n−1, n−2, ... 2 from the head word in one code word.

P and Q together with information words are recorded to satisfy $S_P = S_Q = 0$ in the above equation. When data of the word $W_0$, $W_1$, $W_{20}$, $W_{40}$, $W_{41}$, $W_{60}$, $W_{61}$ is recorded as a frame identification code in an even-numbered frame, it is selected to be "00000000", and when the data is recorded in an odd-numbered frame, it is selected to be "00111110". At this time, the parity of $P_{Y0}$, $Q_{Y0}$, $P_{Y1}$, $Q_{Y1}$ is "00000000" for an even-numbered frame, and "00111111" for an odd-numbered frame. Since the five bits of the 3rd, 4th, 5th, 6th, and 7th bits from the left are equal to the above data bits, the parity can also be used as a frame identification code. The eight bits of the data and parity are composed of a first bit (MSB), a second bit, ..., and an eighth bit (LSB).

The above frame identification code is determined as a varying code between adjacent frames and recorded in the block. By detecting whether the frame identification code varies or not on reproduction, an image can readily be detected as a moving image when the code varies, and as a still image when the code remains unchanged.

Figure 37:
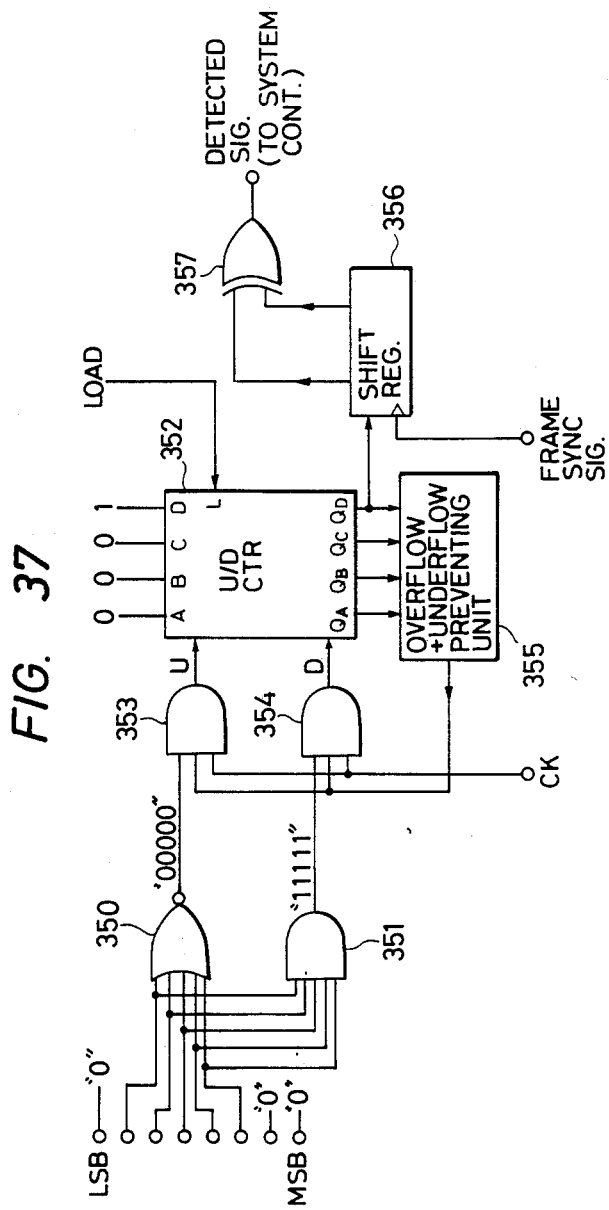
FIG. 37 is a block diagram of a control data detector.

The above operation can be implemented by adding a moving and still image detector for extracting and identifying a frame identification code out of the control codes issued from the switching circuit 57 in the reproducing system shown in FIG. 28, the moving and still image detector issuing a detected output to the system controller 7. One arrangement of such a moving and still image detector is illustrated in FIG. 37. The moving and still image detector includes a NOR gate 350 for detecting whether the third to seventh bits of a frame identification code are all "0", an AND gate 351 for detecting whether they are all "1", AND gates 353 and 354 for applying detected pulses of "1" to up and down counting control terminals, respectively, of an up/down counter 352 in synchronism with a clock SK when the gates 350, 351 detect (00000) and (11111), respectively, an overflow and underflow preventing unit 355 for monitoring fpir output bits $Q_A$, $Q_B$, $Q_C$ and $Q_D$ from the counter 352 and generating a low level signal when the four-bit output is indicative of 15 or 0 to close the gates 353 and 354 for thereby inhibiting the detected pulses from being applied to the counter 352 to prevent an overflow over a count of 16 or an underflow below a count of −1, a two-bit shift register 356 for reading a most-significant bit output from the counter 352 and shifting the same in a clock synchronous with a readout frame, and an exclusive-OR gate 357 for detecting a moving image or a still image to issue a detection flag by using two outputs from the two-bit shift register 356.

A frame identification code out of the control codes as read out is not corrected as high-speed detection is needed. The frame identification code is highly reliable because it is composed of 12 words, and is applied to the circuit of FIG. 37. The input identification code is applied to the gates 350 and 351 which detect whether the third to seventh bits thereof are all "0" or "1". If all bits are "0", then the up/down counter 352 is incremented, and if all bits are "1", then the up/down counter 352 is decremented. At this time, an initial value of the up/down counter 352 is selected to be eight or the most significant bit of the four bits is selected to be "1" by a load signal LOAD, so that when the frame identification code is (00000000), that is, while an even-numbered frame is being reproduced, the most significant bit $Q_D$ of the four-bit output from the up/down counter 352 is always "1", and while an odd-numbered frame is being reproduced, $Q_D$ is always "0". Therefore, it is possible to know whether an even-numbered frame or an odd-numbered frame is being produced.

Detection of an even-numbered frame or an odd-numbered frame is possible by reading only one word of the frame identification code. However, 12 words of the frame identification code are recorded for allowing reliable detection even when dropout occurs. The up/down counter 352 can therefore count the same frame identification code several times. To prevent this, the output from the up/down counter 352 is applied to the overflow and underflow preventing unit 355. When the output from the counter 352 is 15 or 0, the overflow and underflow preventing unit 355 closes the AND gates 353 and 354 connected to the gates 350 and 351 to cause the counter 352 to stop counting pulses. Prior to a frame identification code being applied to a next frame, the prevention of overflow and underflow is released by the load signal LOAD which sets the up/down counter 352 to 8.

The most significant bit $Q_D$ of the output from the up/down counter 352 is applied in a serial fashion to the two-bit shift register 356 by a clock signal in synchronism with the frame. When a moving image is reproduced at this time, different counter outputs are fed to the two-bit shift register 356. Upon applying these outputs to the gate 357, its output becomes "1". When a still image is reproduced, the output of the gate 357 becomes "0". Therefore, moving and still images as reproduced can be distinguished from each other. The detected output is applied from the system controller 7 to various parts in the system, and as desired to an external device such as a computer through the interface 53.

Figure 38:
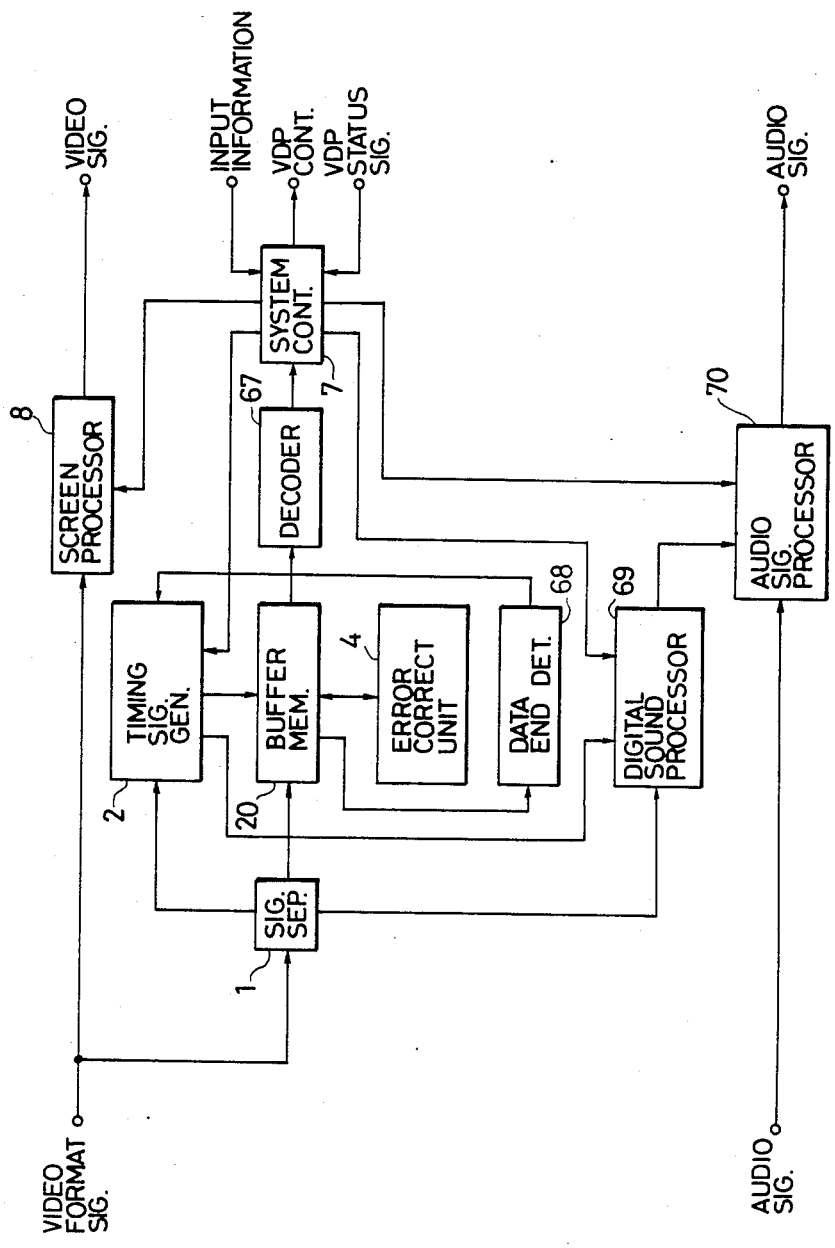
FIG. 38 is a block diagram of still another system for reproducing a video format signal.

According to another example, to handle a limited amount in the form of information of control codes recorded in each frame, the control codes corresponding to one frame are divided for a plurality of frames and inserted and recorded. A reproducing system for such an arrangement is shown in block form in FIG. 38. The system includes a signal separator 1 for separating vertical and horizontal synchronizing signals, a data synchronizing signal, control codes, SWS data, and other from a video format code, a timing signal generator 2 for generating timing signals for various parts in the system from the vertical and horizontal synchronizing signals and the data synchronizing signal, a digital sound processor 6 for converting the SWS data into an analog signal, a buffer memory 20 for storing control data, an error correcting unit 4 for correcting errors of the control data, a data end detector 68 for detecting an end of the control data, a decoder 67 for decoding data from the buffer memory 20, a system controller 7 for issuing control signals to the various system components in response to a control command from the decoder 67, input information from an input device (such as a computer), a screen processor 8 for processing a video signal in various modes, and a status signal from the VDP, and an audio signal processor 70 for effecting switching between the SWS data and a general audio signal.

The control data corresponding to one frame is divided, inserted and recorded in blocks b of a plurality of frame, and an identification signal indicative of whether the control data inserted in the block b in a certain frame is contiguous to a next succeeding frame is included in the control data and inserted. Error correction and interleaving of the control data is completed in each frame.

This operation will now be described in more detail. The video format signal input is applied to the signal separator 1 by which are separated a vertical synchronizing signal, a horizontal synchronizing signal, a data synchronizing signal, control data, and SWS data. The separated vertical synchronizing signal, horizontal synchronizing signal and data synchronizing signal are applied to the timing signal generator 2, which produces timing signals for the various system components. The SWS data is written in a buffer memory in the digital sound processor 69 in which errors are corrected. The corrected SWS data is then expanded, read out and converted to an analog audio signal by a D/A converter. The control data is written in the buffer memory 20 and corrected by the error correcting unit 4. Thereafter, the data end detector 68 detects an identification signal indicative of whether the control data is ended or contiguous to a next frame. Where the control data is contiguous to the next frame, the control data in the buffer memory 20 is not delivered to the decoder 67 but is held therein. Where the control data is ended, the decoder reads and decodes a control program in the buffer memory 20. The system controller 7 is responsive to a control command from the decoder 67, information from the input device, and a status signal from the player for issuing various control signals to the timing signal generator 2, the digital sound processor 69, the screen processor 8, the audio signal processor 70, and the video disk player. The screen processor 8 serves to mask the SWS data of the video format signal (by rendering the TV screen black), or superimpose characters and graphic patterns to produce a video signal output. The audio signal processor 70 switches between a demodulated sound signal of the SWS data and an audio signal input. The player control signal is applied to a control input terminal of the player for controlling the player to operate in a normal playback mode, a slow-motion playback mode, a still image playback mode, a mode for searching frame numbers, and other modes.

Video data can be made more sophisticated by recording an ordinary moving image (with sounds) and a still image with sounds (SWS) in a mixed manner on a recording medium. One method is to record identification codes for the ordinay moving image and the SWS for each frame, read and discriminate the identification code on reproduction, and change the reproducing modes according to the identification code.

For ordinary moving images, the audio signal is recorded in an analog fashion by frequency modulating sound subcarriers of 2.3 MHz and 2.8 MHz and frequency multiplexing the same with video information which is frequency modulated, as with general video disks. For still images, digitized SWS data is inserted in the block c and recorded by time-division multiplexing.

FIG. 39 shows the content of a control code for such a mode. Four high-order bits of the eight bits represent an output control code, and four low-order bits represent an input control code. The output control code serves as a code for distinguishing between stereophonic and monaural modes, and the input control code serves to select SWS data, select channel 1 or channel 2 of the analog audio signal, and determined whether sounds are to be muted when in the monaural mode. When the code is a logic "1", a selection is made, and when the code is a logic "0", no selection is made. X is a bit not related to control and is forcibly "0" in the illustrated example. When in the stereophonic mode, the channel 2 stereophonic reproduced output (reproduced from frequency multiplexed recording) from the VDP is selected as an audio input. The priority is greater for "stereophonic", and when a logic "1" is set for stereophonic mode, the other bits are rendered irrevelant. As described with reference to FIGS. 21 and 22, where there is both monaural and stereophonic SWS data, "stereophonic" may be used for discriminating the SWS data. That is, the stereophonic SWS data is indicated by the combination of "stereophonic" and "SWS", and the monaural SWS data is indicated by the combination of "monaural" and "SWS". In the following description, the SWS data is limited to the monaural mode.

Figure 40:
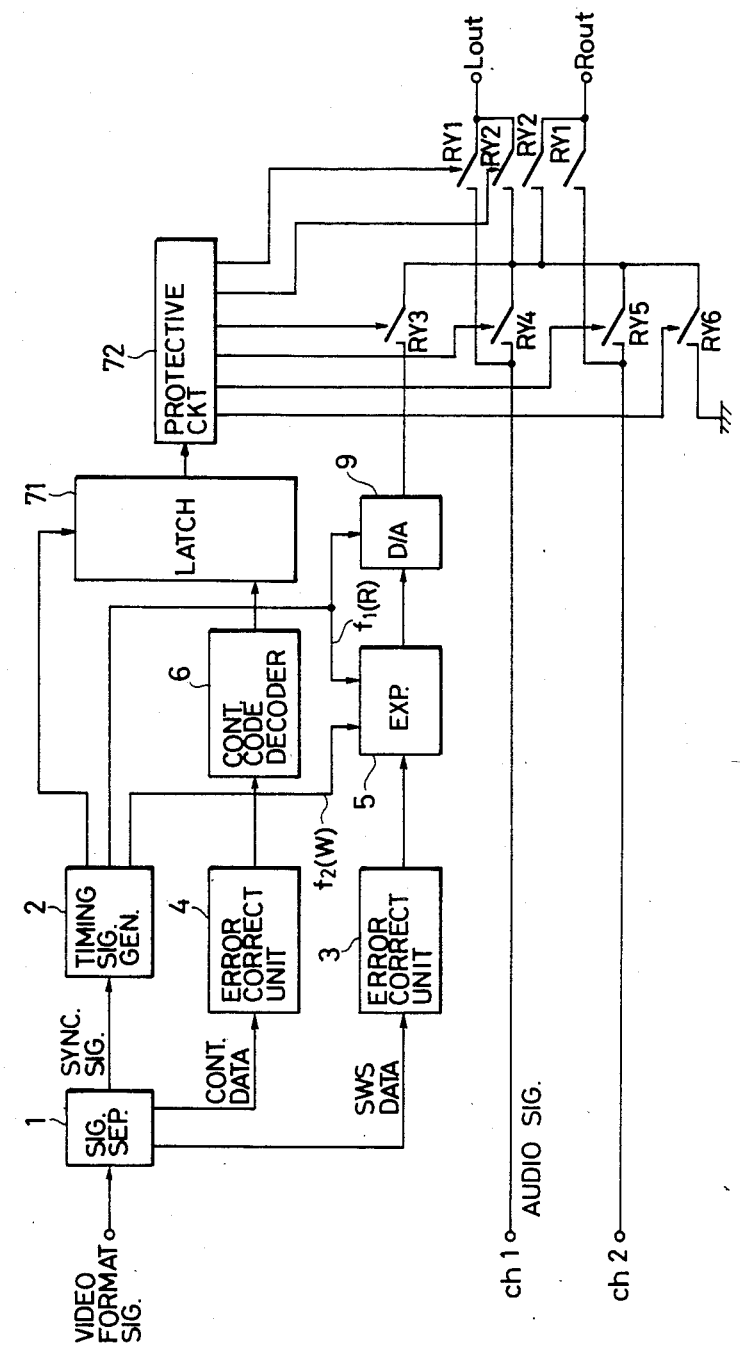
FIG. 40 is a block diagram of a still further system for reproducing a video format signal.

FIG. 40 is a block diagram of a reproducing system for the above arrangement. The system includes a six-bit latch 71 for temporarily storing a sound selecting code (FIG. 39) from the control code decoder 6, a protective circuit 72 responsive to an output from the latch 71 for driving sound selecting relays RY1 to RY6 and operable for preventing malfunctioning when the control codes are not corrected due to dropout or the like and error data is set, and the sound selecting relays RY1 to RY6 openable and closable under the control of outputs from the protective circuit 72.

FIG. 41 is illustrative of the relationship between the control codes and the operation of the relays $RY_1$ to $RY_6$. When a logic "1" is set for monaural, the same sound is produced from the R output through a sound source specified by the four lower-order bits (see FIG. 39). When a logic "1" is set for channel 1, the output of channel 1 of the VDP is issued, and when a logic "1" is set for channel 2, an output of a channel 2 of the VDP is issued. Such a combination is used in an application where different sounds are inserted for a moving image, and selected according to the user's preference. When a logic "1" is set for SWS, the SWS data as compressed on a time basis is expanded and converted into an analog sound signal which is issued. When a logic "1" is set for muting, no sound output is produced.

Figure 42:
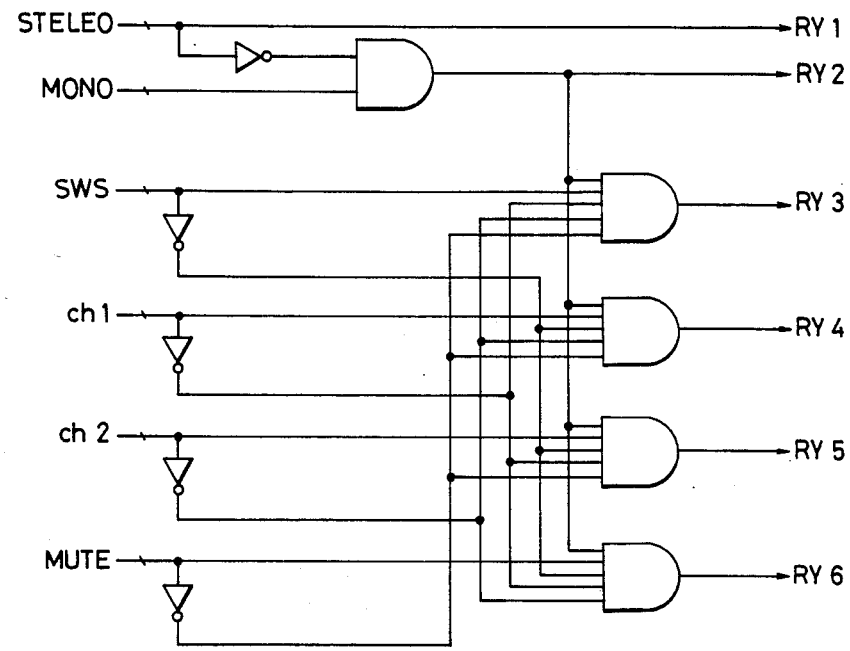
FIG. 42 is a block diagram of a protective circuit in FIG. 38.

FIG. 42 is illustrative of an arrangement of the protective circuit shown in FIG. 40, which is composed of inverters and AND gates operable with six bits except two bits indicated by X in FIG. 39.

Figures 43A, 43B, 43C, 43D:
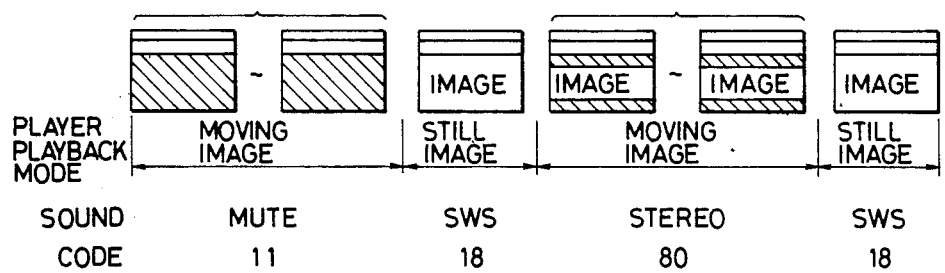
FIGS. 43A through 43D are diagrams showing another example of video data.

FIG. 43 shows a video format in the above embodiment. In the period (A), the audio is muted since SWS data is inserted fully in the block c. The SWS data is successively stored in the buffer memory 5 while a moving image is being reproduced, during which time the code is 11. In the period (B), the VDP reproduced a still image and the SWS data stored in the buffer memory 5 is expanded on a time basis and read out. An audio signal in analog form of the SWS data is delivered as an output, during which time the code is 18. In the period (C), a moving image is reproduced while storing the SWS data in the buffer memory 5, and at this time channel 1 and channel 2 are utilized and the code is 80. In the period (D), the VDP reproduces a still image again, and the SWS data is read out of the buffer memory 5 and expanded, during which time the code is 18.

A system for separating digital data will be described.

Figure 44:
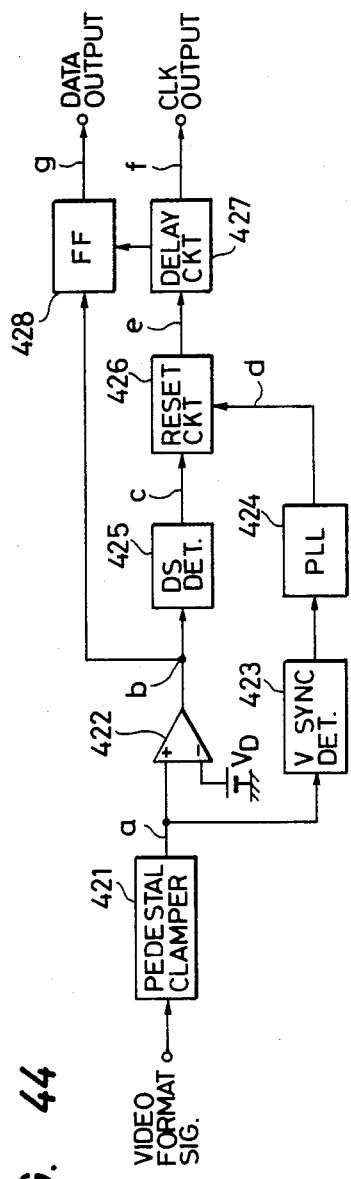
FIG. 44 is a block diagram of a conventional data separator.

FIG. 44 is a block diagram of a conventional data separator including a threshold circuit. Designated at 421 is a pedestal clamper for holding a pedestal level at a constant voltage, 422 a comparator for comparing a threshold level $V_D$ and digital data on the video format signal to shape the waveform of the digital data into a digital signal of "1" or "0", 423 a vertical synchronizing detector for detecting the vertical synchronizing signal, 424 a PLL (Phase-Locked Loop) supplied with the vertical synchronizing as an input, 425 a DS (Data Synchronizing) detector for picking up a pulse inserted in a furthermost data portion of a horizontal line, 426 a reset circuit for generating a signal serving as a reference to a (DCK Data Readout Clock) from the DS pulse and a clock from the PLL 424, 427 a delay circuit for delaying a clock produced from the reset circuit 426 for bringing a rising edge in the center of each bit interval, and 428 a FF for reading data based on the DCK from the delay circuit 427.

Figure 45:
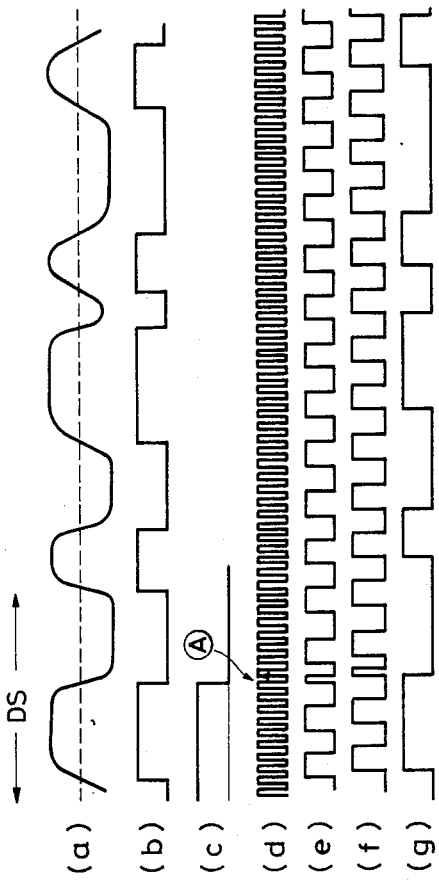
FIG. 45, consisting of (a)-(g), is a diagram showing the waveforms of various signals in the data separator of FIG. 44, explanatory of operations of the data separator.

The digital signal in the first horizontal line interval is different from that of FIG. 13 in that only a single pulse is inserted at the head of the first horizontal line interval prior to the data word or parity. The digital data containing the DS pulses is shown at an enlarged scale in FIG. 45. The signal (a) in FIG. 45 is clamped by the pedestal clamper 421 and converted by the comparator 422 into a digital signal of "1" or "0" with the threshold level $V_D$ as shown in at (b).

The PLL 424 is operated on the basis of the vertical synchronizing pulse detected by the vertical synchronizing detector 423 to produce a clock signal having a frequency which is four times higher than the bit rate frequency of the data as shown at (d). The DS pulses are detected by the DS detector 425 as shown at (c), and applied as gate pulses to energize the reset circuit 426, which is reset by a rising edge (indicated by A in FIG. 45) of the clock (d) from the PLL 424 to generate a clock signal having the same frequency as the bit rate as shown at (e). The clock signal (e) is delayed by the delay circuit 427 so that the rising edge will be positioned in the center of each bit interval, thus producing a clock signal DCK as shown at (f). The clock signal DCK serves as a system clock and is used as a clock for the FF 428 to obtain the data synchronous with DCK as a readout output.

In the circuit arrangement of FIG. 44, the threshold level $V_D$ of the comparator 422 remains constant without following amplitude variations of an input signal. Therefore, it is possible to shape the waveform of the data accurately, and no correct data readout is possible. Although a reset point for producing the reference DCK clock (e) should be a falling edge of the DS pulse (c), the clock (e) is actually reset at a rising edge of the clock pulses (d). Therefore, the clock (e) is shifted in phase by one period of the maximum clock pulses (d) and no DCK in phase with the data phase cannot finally be obtained.

Since the data in the first horizontal line interval is read with the rising edge of the DS pulse serving as the phase reference for DCK, the DS pulse shown in FIG. 13 may not be detected due to dropout, or if it is detected at a wrong position, no correct reset can be effected in the first horizontal line interval, resulting in a data readout error. Besides the above system for producing DCK, a system such as one using a PLL for monitoring data inversion at all times and producing DCK in following relation to the data inversion can be employed. The above shortcomings can be remedied to a certain extent by employing such a system. However, even this system is incapable of shaping the data waveform accurately, and hence renders the phase of DCK inaccurate.

Figures 46, 47:
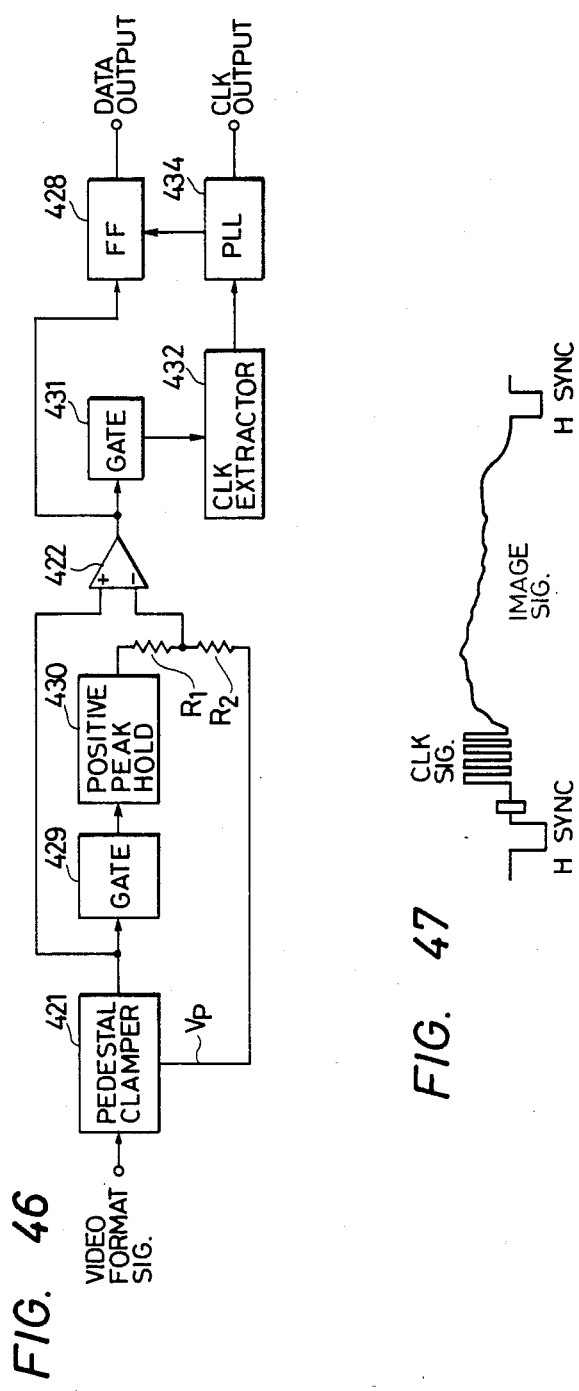
FIG. 46 is a block diagram of a data separator employed in the present invention.
FIG. 47 is a diagram of the waveform of a signal of a first horizontal line which is suitable for use in the data separator of FIG. 46.

To overcome the above problem, the field synchronizing data shown in FIG. 12 which is inserted in the block at the frontmost end of the field is employed to implement an ATC (Automatic Threshold Control) circuit. FIG. 46 is a block diagram of a specific arrangement of such a system.

A video format signal is clamped by a pedestal clamper 421 which produces a pedestal level $V_p$. Since an image signal other than a digital signal is contained in the video format signal, only the digital signal is issued through a gate circuit 429. The positive peak of the digital signal is held by a peak hold circuit 430. The pedestal level $V_P$ and the output from the peak hold circuit 430 are equally voltage divided by a voltage divider composed of resistors R1 and R2 which applies a threshold level $V_D$ to one of the input terminals of a comparator 422.

The threshold level $V_D$ and an output from the pedestal clamper 421 are compared in level by the comparator 422 which produces an output that is shaped in waveform. Digital data out of the output from the comparator 422 is issued through a gate circuit 431. Pulses having rising edges synchronous with inversions of an output from the gate circuit 431 are generated by a clock extractor 432. The PLL circuit 434 produces PCK in synchronism with the rising edges of the pulses generated by the clock extractor 432, the DCK having the same frequency as the bit rate of the data and having rising edges located in the center of the respective bit intervals. The FF 428 is responsive to a clock input (DCK) and a data input, which is an output from the comparator 422 for reading digital data in synchronism with DCK.

The peak hold circuit 430 has a large time constant selected so that it operates irrespectively of abrupt amplitude variations due to data dropout and noise. As described above, the peak holding and the locking of the PLL are effected by the field synchronizing data inserted in the frontmost end of each field. Therefore, accurate data separation can be performed while maintaining an accurate threshold level $V_D$ and PLL locking with respect to the data in the blocks b and c. Since no peak detection and no clock component extraction are effected in case an image is present wholly in the block c, the peak as held is gradually deviated and PLL is unlocked. However, because the time constant of the peak hold circuit 430 is large, the peak deviation is small, and the PLL is subjected to no abrupt phase change, with the result that the frequency is subjected to only a small change. Therefore, frames in which only an image is included in the block c are successively present, and even when a frame containing digital data in the block c is reached subsequently, accurate peak holding and PLL locking can immediately be accomplished, making it possible to separate data stably. Even if the PLL is unlocked in a field due to a dropout, for example, it is possible to lock a clock run-in signal or the data itself immediately prior to digital data if the first horizontal line interval is a signal as shown in FIG. 13.

Where an image signal period is relatively long when digital data is present after the image signal in the block c of one field, there is danger of the PLL becoming unlocked and of digital data subsequent to the image signal period thus not being accurately read out. When dropout occurs in the first clock run-in in the digital data period, relocking of the PLL is delayed and the data readout error is especially severe. To solve this problem, as shown in FIG. 47, pulses synchronous with a clock synchronizing signal are inserted for a few cycles at the head of each horizontal line period containing image information and a clock component is extracted at the head of each horizontal line period within the image signal period so that the PLL remains locked during the image signal period.

While in the above embodiment the PLL 434 is employed, the system of FIG. 44 (referred to as a "reset system") may be used in which field synchronizing data as shown in FIG. 12 is inserted at the head of a field and the digital signal in the first horizontal line interval is selected as shown in FIG. 13. More specifically, the blocks denoted at 431 to 434 in FIG. 46 may be changed to the blocks denoted at 423 to 427 in FIG. 44. However, instead of resetting with a single DS pulse as in the conventional system, resetting is effected by a clock run-in signal as illustrated in FIGS. 12 and 13. Since the clock run-in signal is composed of 12-cycle pulses, resetting is performed by detecting a portion of a signal pattern rather than with a single pulse rising or falling edge. This makes the system more immune to dropout than the prior system since correct resetting is highly probable to occur even if dropout occurs, wrong resetting is less probable to take place, and good operation is ensured unless substantially all of the signal is subjected to dropout. Because 10 clock run-in pulses are inserted in the field synchronizing data, reliable resetting can be effected and DCK is obtained in phase with the data. Operation of the ATC circuit in the reset system remains the same as that of the PLL. The DS signal in FIGS. 12 and 13 is employed for synchronization for each word of data composed of eight bits. In the reset system, no resetting is done during the image signal period when no clock is inserted before the image signal as shown in FIG. 47. Therefore, when DCK is repeatedly brought out of phase with the data until digital data is reached again, and if the clock run-in signal in the first horizontal line is dropped-out, no resetting is achieved, and during that the first horizontal line period incorrect data readout is caused by DCK out of phase with the data. However, since pulses in synchronism with the clock are inserted at the head of each horizontal line as shown in FIG. 47, DCK will not be repeatedly brought out of phase with the data and the above incorrect data readout is eliminated. However, the reset system of FIG. 45 is less advantageous than the PLL system in that a phase deviation at the maximum of one clock period cannot be avoided.

While in the above embodiments a video disk has been described as the recording medium, it may be a video tape. Digital data in the form of a video format signal may be character information, storage information in the mechanical field, medical information such as electrocardiograms physical information such as temperature information, and other forms of information, in addition to sound data. The digital data may be encoded by various encoding systems such as linear or polygonal PCM, adaptive differential PCM (ADPCM), ADM and the like. The type of the video format signal may be of a PAL system or SECAM system rather than the NTSC sysetm. Further, the numbers of scanning lines in the blocks a through Q are not limited to the example given in FIG. 5.

With the present invention, in recording a digital signal with a video format signal, one field is divided into blocks a, b, and c. In the block a, a clock run-in signal and a data synchronizing signal are inserted as field synchronizing at the head of each field for providing a reference for setting a threshold level for clock synchronization data synchronization, and ATC, so that each digital signal in blocks b and c can be demodulated and reproduced with accuracy and ease.

Since the clock run-in signal and the data synchronizing signal are also inserted prior to recorded information in each horizontal line in the blocks b and c, more reliable synchronization can be achieved. By inserting control codes in the block b in each field for each field or each frame and reproducing the control codes, each control code successively records and reproduces only codes in one field or codes related to one field so that the number of buffer memories for the control codes may be small, and the memory capacity may be smaller than if a control program for all recorded disks is stored in a centralized manner. If control were effected by an external computer without recoridng control codes in the block b, programs would have to be changed each time the disc is changed. However, the present invention eliminates such a shortcoming. By placing the region b out of the visible range of the TV screen, the control codes can be recorded and reproduced without reducing the effective image. With the block c divided into a plurality of subblocks, only an image, or an image and digital data, or only digital data can be recorded in one field. The digital data can be recorded or reproduced independently of or in combination with compressed sound data for still images, a computer program, digital data for a printer or other data. The present invention is appliable not only to a device for adding sounds to still images of video disks, but to recording and reproduction of all forms of digital data.

Other embodiments of the present invention will be described with reference to FIGS. 48 through 58.

FIG. 48 is schematically illustrative of principles of the present invention. Horizontal scanning lines (equivalent to an effective picture) corresponding to a one field signal of a video format signal as it is recorded is divided into a plurality of blocks a, b, c, Q. The blocks a, b, c are each composed of horizontal lines the number of which is an integer. The number of horizontal scanning lines in the block c can be exactly divided by a given integer x so that $m=c/x$ (m is an integer). Therefore, the block c is composed of x subblocks $c_1$-$c_x$ each containing m scanning lines. The number of scanning lines in the block Q may not be an integer. A field synchronizing signal composed of a clock synchronization signal and a data synchronization signal is inserted in the block a and a control code serving as control information is inserted in the block b.

FIGS. 49A and 49B show a portion of the video format signal shown in FIG. 48. FIG. 49A shows a waveform in which image information is recorded in the blocks c, Q, and FIG. 49B shows a waveform in which digital data is recorded in the block c. FIG. 50 is illustrative of specific numerical values in the divided blocks a, b, c, Q in an NTSC signal. The number of effective scanning lines (those containing information to be displayed) in 262.5 one-field scanning lines is 241.5, and the blocks a and b are preset to be located out of a visible range of a television monitor screen. In the illustrative example, a=1, b=4, c=234, x=9, m=26, and Q=2.5.

Where digital data items are inserted in the blocks b, c, the data items are interleaved so that no successive errors will be produced even if errors are concentrated due to dropout, and an error correcting code is added for error detection and correction. In the illustrated block b, the data items are interleaved independently of the other blocks and error correction completed in the block. Likewise, the data items are interleaved and error correction completed independently respectively in the subblocks $c_1$ through $c_x$ of the block c.

FIG. 51 is a diagram showing an example in which digital data items are inserted in one horizontal scanning line. The data transfer rate is 408 $f_H$ ($f_H$ is the horizontal scanning frequency), and a clock run-in signal, which is a clock synchronization signal, is inserted prior to the digital data items. The clock run-in signal is followed by a few bits of a data synchronization signal for achieving data synchronization, which is in turn followed by a data word and a code for error detection and correction.

FIGS. 52A through 52E illustrate various recording modes. FIG. 52A shows a mode in which only an image is inserted in the blocks c and Q with the blocks a and b located out of the visible range. The image mode of FIG. 52A is the same as ordinary television images. FIG. 52B shows a mode in which digital data items are inserted in all of the block c, and FIG. 52C shows a mode in which digital data items are inserted in the subblocks $c_1$, $c_2$, $c_8$, $c_9$ out of the nine subblocks of the block c, while an image is inserted in the subblocks $c_3$ through $c_7$. FIG. 52D is illustrative of a mode in which digital data items are inserted in the subblocks $c_1$, $c_2$, and an image is inserted in the subblocks $c_3$ through $c_9$, and FIG. 52E of a mode in which an image is inserted in the subblocks $c_1$ through $c_7$ with digital data items inserted in the subblocks $c_8$ and $c_9$.

In FIG. 53, frames (fields) in which the digital data items are inserted in the block c are successively present in a period A. Such successive frames range from a few frames to a few tens of frames dependent on the amount of data required. An image is inserted all in the block c in a succeeding period B. In the period B, there is normally inserted an image corresponding to the data in the period A, and which may be a still image or one of successively varying images. Where a still image is inserted, there may be instances in which one image is recorded in a few frames to prevent crosstalk between adjacent frames.

FIG. 54 shows an example in which there are a few to a few tens of successively frames over the period A, each frame having digital data items inserted in the subblocks $c_1$, $c_9$ and an image inserted in the subblocks $c_2$ through $c_8$ and only an image is inserted in the block c over the following period B. In this pattern, a portion of the screen displays an image in the period A, resulting in an uninterrupted image.

FIG. 55 shows in block form a recording arrangement according to a system for recording and reproducing a video format signal according to the present invention. An analog audio signal containing sound information or the like is digitized into a digital signal by an A/D (analog-to-digital) converter 180 based on the ADM system. The signal is applied to an error correcting circuit 181 in which it is rearranged on a time base, i.e., interleaved, and thereafter a redundancy bit is added to the signal to produce an error correcting code which is completed in each subblock. The signal is interleaved since any error in the digital signal due to a defect on the recording medium or signal dropout, for instance, produced by dust on the recording medium, is dispersed over time basis. The signal with the error correcting coded added is written at a sampling frequency $f_1$ into a memory 182 which compresses the signal on a time basis. The signal can be compressed on the time axis by being read out of the memory 182 at a frequency $f_2$ which is higher than the frequency $f_1$.

A control signal serving as control information includes the content and capacity of information in each subblock and various items of processing information at the time the information in each subblock is reproduced. To the control signal is added an error correcting code by an error correcting circuit 183. The digital data signal containing audio data compressed on a time basis by the buffer memory 182 and the control signal with the error correcting code added is supplied to a switching circuit 184. Selective operation of the switching circuit 184 is controlled by a timing signal generator 185, and the data items are written into and read out of the buffer memory 182 also under the control of the timing signal generator 185. The timing signal generator 185 has an internal oscillator operable in synchronism with the synchronizing signal of the applied video signal for producing various timing signals in response to a control signal supplied from an external source. The switching circuit 184 produces as an output a video format signal to be recorded.

Figure 56:
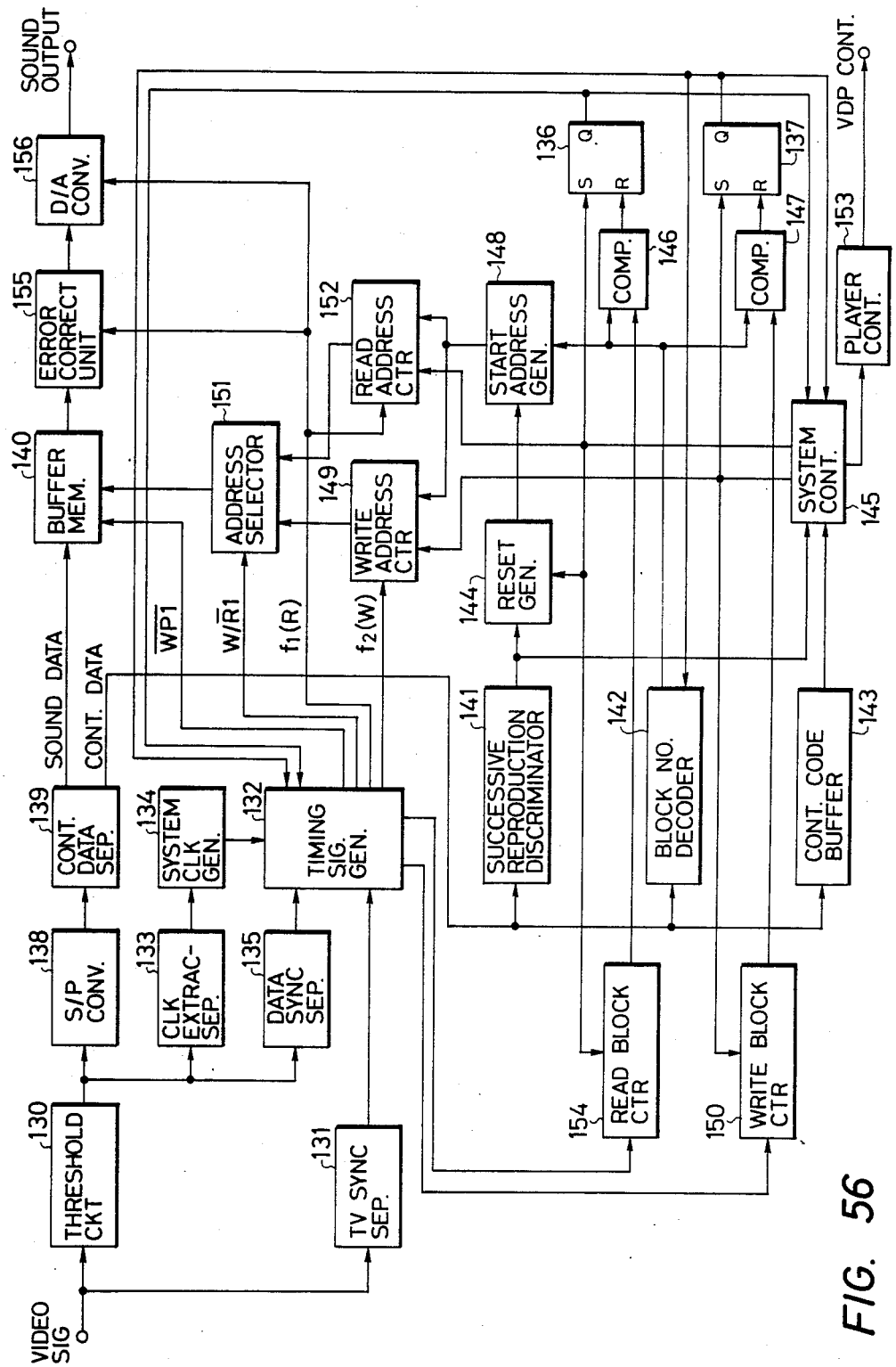
FIG. 56 is a block diagram of a sound adding device in a reproducing system.

FIG. 56 is a block diagram of a sound adding device for adding compressed audio information to a reproduced image in a system for reading and reproducing information from a recording medium on which the video format signal thus produced is recorded. A video format signal is applied to a threshold circuit 130 which automatically sets an optimum threshold level based on a peak level and a pedestal level in the data section in the video format signal. The threshold circuit 130 compares the data level in the video format signal with the threshold level to issue the data as an NRZ digital signal. The video format signal is also supplied to a TV synchronizing separator 131 which separates and issues horizontal and vertical synchronizing signals to a timing signal generator 132. The output signal from the threshold circuit 130 is supplied to a clock component extractor 133 which extracts a clock synchronizing signal (clock run-in) in the block a and at the head of each horizontal line and a clock component contained in the data, and supplies the extracted clock run-in signal and clock component to a system clock generator 134. The output from the threshold circuit 130 is also fed to a data synchronizing separator 135 which detects and separates a data synchronizing signal (data synchronizing) in the block a and at the head of each horizontal line, and supplies the separated data synchronizing to the timing signal generator 132. The system clock generator 134 generates a system clock signal in synchronism with data bits based on a clock component extracted by the clock component extractor 133. The system clock signal issued from the system clock generator 134 is supplied to the timing signal generator 132. The timing signal generator 132 serves to establish synchronization with bits of data in the video format signal and data words composed of eight bits based on the system clock signal, the data synchronization signal, the horizontal synchronization signal, and the vertical synchronization signal, and generates various timing signals according to the statuses of readout and write flags produced at outputs of the flip-flops 136 and 137.

The output from the threshold circuit 130 is also supplied to an S/P converter 138 which coverts the applied input into parallel data in which one word is composed of eight bits. The parallel data is then supplied to a control data separator 139 which separates the parallel data into control data and audio data. The audio data issued from the control data separator 139 is supplied to a large capacity buffer memory 140. The control data is corrected in the control data separator 139, and then supplied to a successive reproduction discriminator 141, a block number decoder 142, and a control code buffer 143. The successive reproduction discriminator 141 decodes a successive reproduction code in the control data and issues a successive reproduction flag of "1" when in a successive reproduction mode. The output from the successive reproduction discriminator 141 is supplied to a reset generator 144 composed, for example, of a flip-flop and a system controller 145. The block number decoder 142 decodes a clock number code in the control data, and stores and holds the number of subblocks, for at least one audio unit in which there exist successive audio data items forming an audio unit. Output data from the block number decoder 142 is supplied to comparators 146 and 147 and a start address generator 148. The control code buffer 143 serves to decode and store a code which cannot be decoded by the successive reproduction discriminator 141 and the block number decoder 142. An output from the control code buffer 143 is fed to the system controller 45.

When the successive reproduction flag is "0", the reset generator 144 supplies a reset signal to the start address generator 148 for initializing the start address generator 148 which then issues data corresponding to "0". The system controller 145 is responsive to the output from the control code buffer 143 for detecting audio data to be written into the buffer memory 140 and supplying a write start pulse to a write address counter 149, a write block counter 150, and a set terminal of the flip-flop 137. Upon application of the write start pulse, a numerical value indicated by the output data from the start address generator 148 is set in the write address counter 149, and at the same time a count in the write block counter 150 is reset and a Q output of the flip-flop 137 which is a write flag becomes "1". Then, the timing signal generator 132 issues a negative write command pulse WP1 in synchronism with audio data supplied to the buffer memory 140 and supplies the negative write command pulse WP1 to the buffer memory 140. At this time, a switching control signal W/$\overline{R}$1 supplied from the timing signal generator 132 to a control input terminal of an address selector 151 becomes a logic "1". The address selector 151 is supplied with output data from the write address counter 149 and output data from the readout address counter 152. When the switching control signal W/$\overline{R}$1 is a logic "1", the address selector 151 selectively issues the output data from the write address counter 149 to an address input terminal of the buffer memory 140, whereupon a first one word of audio data is written at the zeroth address in the buffer memory 140. Thereafter, a write pulse $f_2(W)$ is supplied from the timing signal generator 132 to the write address counter 49 to cause the latter to count up the pulse. Then, the write command pulse WP1 is issued again to write a next one word at a 1st address in the buffer memory 140.

Audio data items are successively written in the buffer memory 140 at its addresses starting from the zeroth address. When audio data of one subblock is supplied and written in the buffer memory 140, a pulse is supplied from the timing signal generator 132 to the write block counter 140 to cause the latter to count upwardly. When all of audio data items forming one audio unit are written, the output data from the write block counter 150 will coincide with the output data from the block number decoder 142. The output data from the write block counter 150 is supplied to the comparator 147 and compared therein with the output data from the block number decoder 142. When the compared output data items coincide with each other, a pulse is supplied from the comparator 147 to the reset terminal of the flip-flop 137. The Q output of the flip-flop 137 then becomes a logic "0", whereupon the writing operation is completed.

When a stop code is thereafter stored in the control code buffer 143, a still image reproduction command signal is supplied from the system controller 145 to the player controller 153. The player controller 153 issues a control signal to a video disc player (not shown) for effecting a still image reproduction mode in response to the still image reproduction command signal, and a control signal to the video disc player for effecting a normal reproduction mode in response to a play command signal. At the same time that the still image reproduction mode is started by the player controller 153, a readout start pulse is issued from the system controller 145 to the readout address counter 152, the reset terminal of the readout block counter 154, the reset generator 144, and the set terminal of the flip-flop 136. Since the successive reproduction flag is "0", the reset generator 144 supplies a reset signal to the start address generator 148. Upon issuance of the readout start pulse, an output of "0" from the start address generator 148 is set in the readout address counter 152. The count of the readout block counter 154 is reset, and the Q output of the flip-flop 136 which is a readout flag becomes a logic "1". Then, the switching control signal W/$\overline{R}$1 from the timing signal generator 132 becomes a logic "0", causing the address selector 151 to issue the output data from the readout address counter 152 to the address input terminal of the buffer memory 140. Readout pulses $f_1(R)$ are issued from the timing signal generator 132 and supplied to the readout address counter 152, an error correcting circuit 155, and a D/A converter 156. In response to the readout pulses $f_1(R)$, the readout address counter 152 counts up the pulses to successively read the audio data out of the addresses starting from the zeroth address in the buffer memory 140. The audio data read out of the buffer memory 140 is corrected by the error correcting circuit 135, and the corrected audio data is converted into an audio signal by the D/A converter 156. When audio data equivalent to one subblock is read out, the timing signal generator 132 supplies a pulse to the block counter 154. The readout counter 154 then is incremented. When all audio data items forming one audio unit are read out, the output from the readout clock counter 154 will coincide with the output from the block number decoder 142. The output from the readout block counter 154 is compared by the comparator 146 with the output from the block number decoder 142. When the compared outputs agree with each other, the comparator 146 supplies a pulse to the reset terminal of the flip-flop 136. Then, the readout operation is finished as the Q output of the flip-flop 136 becomes a logic "0". The block number decoder 142 is arranged to issue the number of subblocks of audio units being written when the write flag is "1", and the number of subblocks of audio units being read out when the write flag is "0". Upon completion of the readout operation, the system controller 145 issues a play command signal to shift the video disc player from the still image reproduction mode to the moving image reproduction mode. The above operation will be repeated in response to next audio data supplied.

Figure 57:
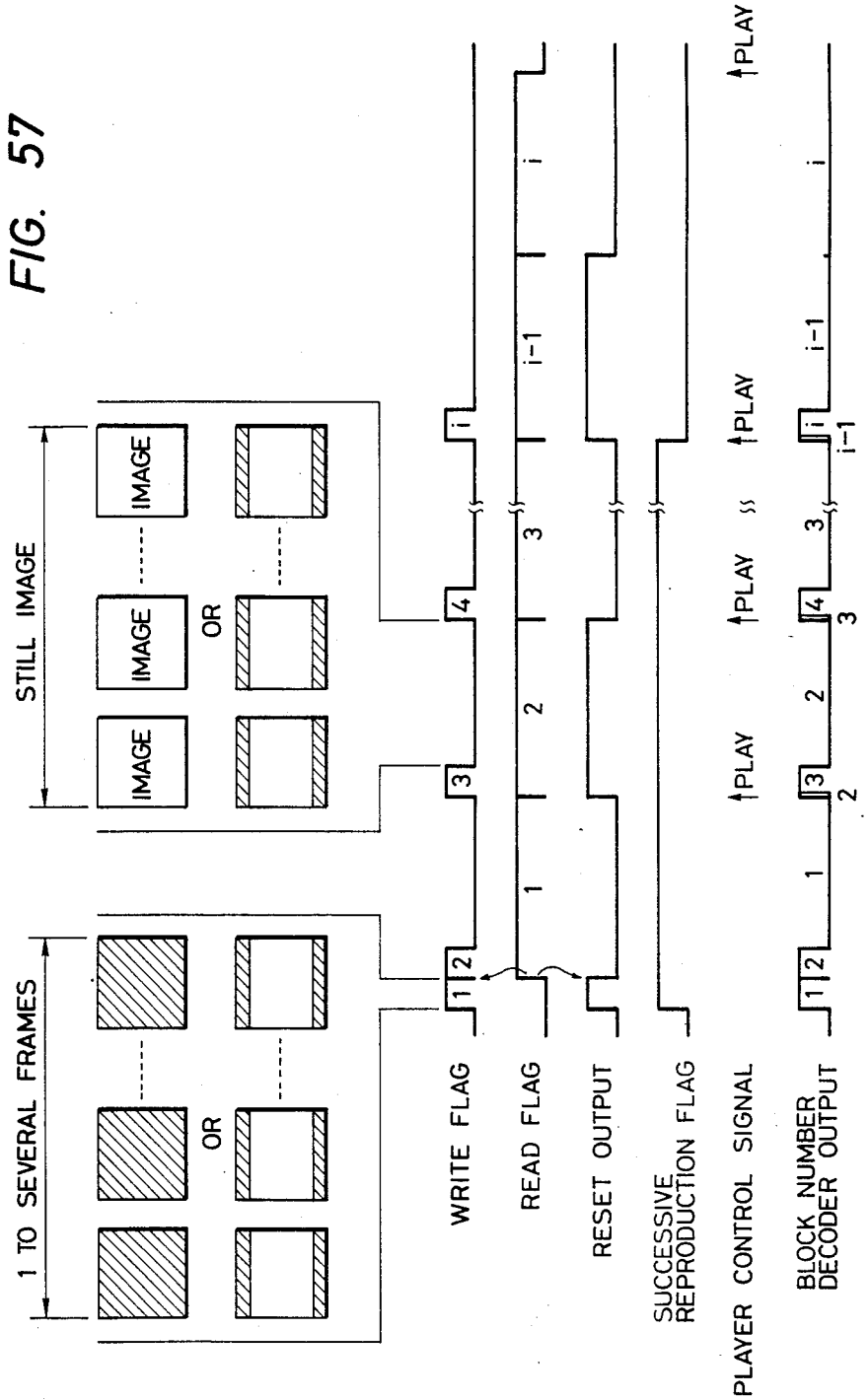
FIG. 57 is a diagram showing signal waveforms illustrative of operation of the device of FIG. 11.

When the successive reproduction flag is "1", the signals are as shown in FIG. 57. The numbers given to the write flag, the readout flag, and the output of the block number decoder indicate the numbers of audio units, and the audio units are recorded over one to several frames in the period A of FIG. 53 or the period A of FIG. 54. A still image with a stop code inserted between adjacent audio units, and such a still image is reproduced while the write flag "0". The still image is a fullscreen image as shown in the period B of FIG. 53 or 54. Alternatively, the still image may be in a final frame including an audio unit recorded in the pattern in the period A of FIG. 54. In FIG. 57, there is no period for still image reproduction between the audio units 1 and 2 because the signal timing in FIG. 57 is such that immediately after a certain audio unit starts to be read out, a next audio unit is written. Since successive reproduction is possible if a next audio unit is written while a certain audio unit is being read out, there may be a still image reproduction period between the audio units 1 and 2 provided the above condition is met.

Operation of the circuit components in the mode of successive reproduction mode will be described. If the successive reproduction flag is "1", then the reset generator 144 is in the same initial condition as when the successive reproduction flag is "0". The start address generator 148 is reset at the time of starting to write the audio unit 1. Since the output from the reset generator 144 is inverted immediately after each audio unit starts being read out in response to the readout start pulse, the operation to reset the start address generator 148 is released in reading out odd-numbered audio units. Upon release of the resetting of the start address generator 148, it determines the position to start writing a next audio unit in response to the output from the block number decoder 142 and generates a corresponding address. Therefore, the audio unit 1 starts to be written and read out in the same manner as when the successive reproduction flag is "0". Immediately after the readout is started, an address for starting to write the audio unit 2 is set as an initial value in the write address counter 149 in response to a write start pulse. As a result, the audio unit 2 is written successively in addresses following the audio unit 1. The audio units 1 and 2 are recorded as being adjacent to each other in FIG. 57. Where there is a still image inserted between the audio units 1 and 2, however, a play control signal is supplied from the player controller 153 to the video disc player while the audio unit 1 is being read out, and the audio unit 2 is written after the still image reproduction mode is released. The other audio units are written in the same manner. In order to read out the audio unit 1 while the audio unit 2 is being written, the timing signal generator 132 issues readout pulses $f_1(R)$ and write pulses $f_2(W)$. So that the output from the address selector 151 is switchable on a time-division basis, the switching control signal $W/\overline{R}1$ becomes "0" when there is no write command pulse WP1 in synchronism with the readout pulses $f_1(R)$. Since the relationship between frequencies is $f_1(R) < f_2(W)$, the switching control signal $W/\overline{R}1$ is a signal in which the period of "1" is long with occasional "0"s. At this time, the block number decoder 142 issues the number of subblocks of the audio unit 2. When the comparator 147 detects that all of audio data items forming the audio unit 2 have been written and the audio unit 2 is completely written, only operation to read out the audio unit 1 is effected, and the switching control signal $W/\overline{R}1$ becomes "0" and no write pulses $f_2(W)$ are issued. The block number decoder 142 issues the number of subblocks of the audio unit 1, and the comparator 146 detects that all of audio data items forming the audio unit 1 have been read out, whereupon operation to read out the audio unit 1 is finished. At this time, the system controller 145 immediately issues a readout start pulse to start reading out the audio unit 2 following the audio unit 1. When the audio unit 2 starts being read out, the block number decoder 142 issues the number of subblocks of the audio unit 1, and the start address generator 148 reads out the same address as the initial address at the time of writing the audio unit 2 and issues the address to the address counter 152, and sets the initial address for writing the audio unit 2 in the readout address counter 152 in response to the readout start pulse. As the audio unit 2 starts to be written, the block number decoder 142 issues the number of subblocks of the audio unit 2. The still image reproduction mode is released by a play control signal issued immediately thereafter by the player controller 153 to apply the video format signal in which a audio unit 3 is recorded, whereupon the system controller 145 issues a write start pulse. Then, the audio unit 3 starts to be written, and the block number decoder 142 simultaneously issues the number of subblocks of the audio unit 3.

Immediately after the audio unit 2 has started to be read out, the output from the reset generator 144 is inverted to reset the start address generator 148. Then, the start address generator 148 issues "0" which is set in the write address counter 149 in response to a write start pulse. Therefore, the audio unit 3 is written in the memory region in which the audio unit 1 has been written.

Thereafter, the audio unit 3 is written and the audio unit 2 is read out in the same manner as the manner in which the audio unit 2 is written and the audio unit 1 is read out. When the reading of the audio unit 2 is finished and the reading of the audio unit 3 is started, the output from the reset generator 144 becomes "0" again to release the resetting of the start address generator 148. Since the block number decoder 142 supplies the number of subblocks of the audio unit 3 to the start address generator 148, the start address generator 148 generates an address following the audio unit 3 and supplies the address to the write address counter 149. Therefore, the address following the audio unit 3 is set as an initial value in the write address counter 149 at the time a audio unit 4 starts to be written. When the audio unit 4 starts being written, the block number decoder 142 issues the number of subblocks of the audio unit 4.

Subsequently, the audio units are written and read out in parallel relation, and audio data items forming the respective audio units as read successively at the period of readout pulses $f_1(R)$ pass through the error correcting circuit 155 and D/A converter 156 and are reproduced as successive audios. A successive reproduction code indicative of whether a successive reproduction mode or not in the control code for the final audio unit i represents an unsuccessful reproduction mode, and the successive reproduction flag which is an output from the successive reproduction discriminator 141 becomes "0". When the audio unit i starts being read out, the player controller 153 issues no play mode control signal, but continues to issue a control signal for the still image reproduction mode. When the reading of the audio unit i is completed, the player controller 153 issues a play mode control signal. The inversion pattern of the output from the reset generator 144 remains unchanged until the audio unit i is read out.

The successive reproduction mode is effected in the the above manner.

A method of reducing needed memory capacity utilizing the successive reproduction mode will be described. One frame in the period A of FIG. 54 is employed as one audio unit, and frames of respective audio units are recorded in adjacent relation while these frames are also used for still images. This corresponds to an arrangement in which the frame in a write flag in FIG. 57 is "1" and the same frame is used as a still image, and the video disc player operates to produce one of successive images each time the play mode control signal is issued. The successive images are produced at a rate which is a reciprocal of the time required to reproduce an audio signal from each audio data item. Therefore, if the time for reproducing the audio signal is 1/30 sec., then 30 successive images are produced per second, thereby reproducing a moving image.

The writing of data into the buffer memory 140 is performed per frame. To continue the successive reproduction mode, a next audio unit should be written before the reading of one audio unit is completed. At this time, the buffer memory 140 may be of a minimum capacity which is the sum of a capacity for one audio unit and the amount of audio data to be read out while a next audio unit is being written. Therefore, the buffer memory capacity may be slightly greater than the amount of audio data to be recorded in one frame. With the timing of FIG. 57, the buffer memory requires a capacity equal to the audio data to be recorded in two frames.

For recording and reproducing successive audio segments, therefore, audio data corresponding to the successive audio segments is divided into small audio units which are recorded in respective frames. By successively reproducing the audio units, the audio segments can be reproduced with a small memory capacity. For adding audio segments to a still image, the images in the respective frames should be rendered identical. For adding audios to successive images, a slow-motion image, and a moving image, the images in the respective frames should differ from each other. Since audio data is recorded partly in one frame in the period A of FIG. 54 in the method utilizing the successive reproduction mode, as described above, more frames are necessary for recording the same amount of data as compared with the instance in which the data is to be recorded in the pattern in the period A of FIG. 53, but images will not be completely interrupted. This holds true for a process in which audio segments are reproduced by writing all of audio data items recorded in the pattern in the period A of FIG. 54 into the large capacity buffer memory, and then reading the audio data items out of the memory.

In the buffer memory 140, according to the foregoing embodiment, a 2jth (j is an integer) audio unit is written at an address following a $(2j-1)$th audio unit, and a $(2j+1)$th audio unit is written up to an address immediately prior to the head address of a 2jth audio unit which has already been written fron the zeroth address. Therefore, it is necessary to equalize all of the block numbers for odd-numbered audio units so as not to write the $(2j-1)$th audio unit up to the head address of the 2jth audio unit. This requirement can be met by spacing the addresses in which odd-numbered and even-numbered audio units are written so that each audio unit may basically be composed of any desired number of subblocks in the successive reproduction mode.

Figure 58:
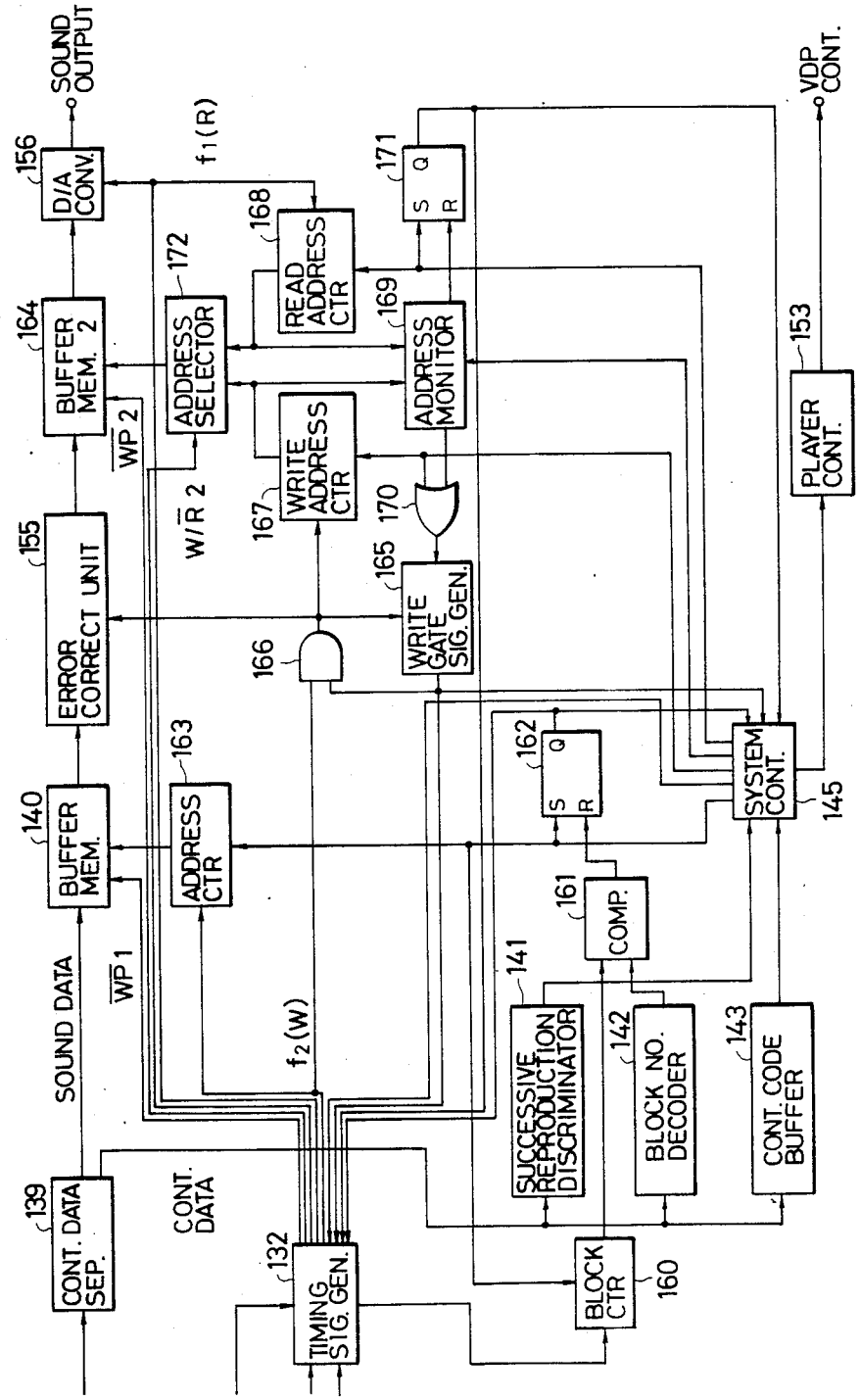
FIG. 58 is a block diagram of another reproducing system according to the present invention.

FIG. 58 is illustrative of a modification of the system shown in FIG. 56. In the arrangement of FIG. 58 there are omitted from illustration the threshold circuit 130, the TV snychronizing separator 131, the clock component extractor 133, the system clock generator 134, the data synchronizing separator 135, and the S/P converter 138 since they are arranged and connected in the same manner as shown in FIG. 56. While in FIG. 56 the data is written in and read out of the buffer memory 140 in parallel relation on a time-division basis, the data is written in and read out of the buffer memory 140 at different times in the arrangement of FIG. 58. There are employed common circuits in the arrangement of FIG. 58. More specifically, a block counter 160 (FIG. 58) serves as the readout block counter 154 and the write block counter 150 (FIG. 56), a comparator 161 serves as the comparators 146, 147, a flip-flop 162 serves as the flip-flops 136 and 137, and an address counter 163 serves as the write address counter 149 and the readout address counter 152. Furthermore, the system of FIG. 58 does not have the reset generator 144, the start address generator 148, and the address selector 151 as illustrated in FIG. 56. However, the system additionally includes a buffer memory 164 for successive reproduction, a write gate signal generator 165 for generating a write gate signal indicative of a period in which data is written in the buffer memory 164, an AND gate 166 for issuing pulses $f_2(W)$ when the write gate signal is "1", a write address counter 167 for being reset by a write start pulse and counting up pulses of an output from the AND gate 166, a readout address counter 168 for being reset by a readout start pulse and counting up pulses $f_1(R)$, an address monitor circcuit respective frames should be rendered identical. iuit 169 for monitoring outputs from the write address counter 167 and the readout address counter 168 to generate a write demand pulse and a readout end pulse, an OR gate 170 for supplying the write start pulse and the write demand pulse to the write gate signal generator 165, a flip-flop 171 for being set by the readout start pulse and reset by the readout end pulse, and an address selector 172 for selectively issuing an output from the address counter 167 when the switching control signal $W/\overline{R2}$ is "1" and an output from the address counter 168 when the switching control signal $W/\overline{R2}$ is "0".

The buffer memory 164 and associated circuits effect successive reproduction of each block at all times when audios are produced. More specifically, when only one audio unit is to be issued, audio data items contained in the subblocks forming the audio unit are successively reproduced. When a plurality of audio units are to be successively reproduced and issued, all of subblocks forming the plurality of audio units are successively reproduced. Accordingly, no fundamental difference is present between the mode of successive reproduction of respective audio units and the mode of nonsuccessive reproduction.

The audio data is written into the buffer memory 140 in the same manner as that of the arrangement of FIG. 56. More specifically, the block counter 140 and the address counter 163 are reset and the flip-flop 162 is set by a start pulse issued from the system controller 145 to thereby start writing data. When an output from the block counter 160 coincides with an output from the block number decoder 142, the comparator 161 supplies a pulse to a reset terminal of the flip-flop 162 to reset the latter, thus finishing writing of the data. Then, a start pulse is issued again from the system controller 145 to start reading data in the same manner as when the data is written. The write and read conditions are discriminated by the system controller 145 based on an output from the control code buffer 143 and a Q output of the flip-flop 162, and the system controller 145 supplies a write flag to the timing signal generator 132. The timing signal generator 132 then issues a write command signal WP1 only when data is written. Audio data read out of the buffer memory 140 in each block after the buffer memory 140 is in a readout mode is corrected by the error correcting circuit 155, and the corrected audio data is thereafter written into the buffer memory 164. At this time, a start pulse read out of the system controller 145 is supplied to the write address counter 167, and to the write gate signal generator 165 through the OR gate 170, thus resetting the write gate signal generator 165 and the address counter 167. The write gate signal generator 165 has therein a one-block data counter which produces an output of "1" when reset, and an output of "0" when it counts write pulses $f_2(W)$ for one block. An output from the write gate signal generator 165 is supplied to the AND gate 166 to control the supply of the write pulses $f_2(W)$ to the write address counter 167 and the write gate signal generator 165. Consequently, the write address counter 167 counts up pulses from "0" according to one-block audio data, and one-block audio data is written into the buffer memory 164. The write pulses $f_2(W)$ are issued from the timing signal generator 32 only in the period in which the output from the write gate signal generator 165 is "1" when the buffer memory 140 is in the readout mode. The AND gate 166 operates not to supply the write pulses $f_2(W)$ generated when the buffer memory 140 is in the write mode to the write gate signal generator 65 and the address counter 167. A write command signal WP2 is supplied together with the audio data to the buffer memory 164, and the switching control signal W/$\overline{R}$2 turns to "1" to enable the address selector 172 to selectively issue the output of the address counter 167. When one block is completely written in the buffer memory 164, the system controller 145 issues a readout start pulse to reset the readout address counter 168. At the same time, the Q output from the flip-flop 171 which is a readout flag becomes "1" to start data readout, and the read-out audio data is converted into an audio signal by the D/A converter 156. When the readout flag becomes "1", the switching control signal W/$\overline{R}$2 becomes "0", and the output of the readout address counter 168 is selectively issued by the address selector 172. The write command pulse WP2 is no longer issued. At this time, the address monitor circuit 169 is responsive to a monitor period flag from the system controller 145 to monitor the outputs from the write address counter 167 and the readout address counter 168. When regions in the buffer memory 164 in which data can be written except for regions in which audio data has been written reach a capacity equal to one block as data readout proceeds, the address monitor circuit 169 issues a write demand pulse through the OR gate 170 to the write gate signal generator 165. Then, the write gate signal generator 165 is reset to write one-block audio data again into the buffer memory 164. Since the buffer memory 164 is read successively, the data is written on a time-division basis in the same manner as with the arrangement of FIG. 56. When the write address counter 167 and the readout address counter 168 reach a maximum counter, they return to "0" upon a next count, and hence the region in the buffer memory 164 returns from a maximum address to 0 address, so that the buffer memory 164 is used cyclically.

As described above, the data readout is effected following the data writing such that when a readout address approaches a write address after one block has been written, a next block is written. By repeating such operation, blocks are successively reproduced. When a final block of audio units is read out of the buffer memory 140 and written into the buffer memory 164, the outputs from the block counter 160 and the block number decoder 142 will coincide with each other to cause the comparator 161 to reset the flip-flop 162. If the successive reproduction flag is "0" at this time, the system controller 145 causes the monitor period flag to be "0", and thereafter the address monitor circuit 169 does not issue a write demand pulse, whereupon the writing of data in the buffer memory 164 is finished. When the outputs from the write address counter 167 and the readout address counter 168 coincide with each other as the reading of the buffer memory 164 proceeds, the address monitor circuit 169 supplies a readout end pulse to the flip-flop 171 to reset the same. The readout flag now becomes "0", thus finishing the data readout. If the successive reproduction flag is "1", then the system controller 145 keeps the monitor period flag of "1" and brings the buffer memory 140 into the readout mode immediately after a next audio unit has been written in the buffer memory 140, so that a next audio unit can be written in the buffer memory 164 in each block following the previous audio unit. The audio units can thus be successively reproduced in the above manner.

As described above, the capacity of the buffer memory 164 may be of an extent slightly greater than one block. However, where the system is arranged to operate at a timing such that two successive blocks are initially written as shown in FIG. 57 as with the system of FIG. 56, the buffer memory 164 should be of a capacity equal to two blocks.

While the error correcting circuit 155 is disposed immediately after the buffer memory 140 in the arrangements of FIGS. 56 and 58, the error correcting circuit 155 may be placed in front of the buffer memory 140. The error correcting circuit 155 may be positioned immediately after the buffer memory 164 in FIG. 58.

Although the operation for successively reproducing all audio units for audio reproduction has been described, audio units may selectively be successively reproduced. For example, where audio units in Japanese, English, and French are repeatedly recorded in the order named, the operator may select a desired language, and the reproducing system successively reproduces audio units in the selected language. Selection of each audio unit may be effected when the audio units are written in the buffer memory 140, or a set of audio units to be selected may all be written in the buffer memory 140, and then may be selectively read out. To make such a selection possible, codes for identifying audio units and blocks numbers for respective audio units may be contained in the control codes.

The method of effecting successive reproduction while saving the memory capacity has been described. Successively reproduced audio segments may be added to either a still image successive images, a slow-motion image, or a moving image.

While in the above embodiments the recording medium has been described as a video disc, it may be a video tape. Digital data in the form of a video format may be character information, storage information in the mechanical field, medical information such as electrocardiograms in the medical field, physical information such as temperature information, and other forms of information, in addition to audio data. The digital data may be encoded by various encoding systems such as linear or polygonal PCM, adaptive differential PCM (ADPCM), ADM, and the like. The type of the video format signal may be of a PAL system or SECAM system, rather than the NTSC system.

With the present invention, as described above in detail, audios digitized and recorded in a video format signal can successively be reproduced without interruption. Switching between successive reproduction and unsuccessive reproduction in the reproducing system can automatically be effected by referring to audio data and recorded control signals, so that the reproducing system can be operated with ease. The system of the invention can therefore handle various forms of video data. For example, still images can successively be reproduced while producing audios. Audio segments can be added to a still image or the like with a small buffer memory in the reproducing system through successive reproduction.

Although in the above embodiment different kinds of sounds and characters are given to a still image and can be selectively read out, not only characters may be recorded but the answer to a problem presented in the form of a still image may be recorded as a digital signal, and symbols or the like may be displayed. An image to which sounds, characters, and the like are added is not limited to a still image, but may be a moving image or successively changing images. Although in the embodiment digital data items such as sounds and characters as they are read out of the large-capacity buffer memory are selected, they may be selected when they are written into the large-capacity buffer memory. With such an alternative, however, it is not possible to issue different sounds and characters successively while only one still image is being reproduced. The capacity of the memory may be small since all kinds of audio and characters are written therein.

Although certain preferred embodiments have been shown and described, it should be understood that many changes and modifications may be made therein without departing from the scope of the appended claims.

I claim:

1. A method of recording a video format signal of the type having a plurality of successive line signal portions, with each line signal portion including a horizontal synchronizing signal portion followed by an information signal portion, said video format signal corresponding to a two-dimensional image of a plurality of lines and containing digital data having a predetermined clock timing and synchronizing signals for determining synchronizing timing for detecting said digital data, said method comprising the steps of:

dividing said two-dimensional image into a plurality of blocks each containing at least one line;

generating said video format signal with said digital data included in the information signal portion of said video format signal corresponding to a first of said blocks and with synchronizing signals for determining the synchronizing timing for detecting said digital data in the information signal portion of said video format signal corresponding to a second of said blocks; and recording said video format signal on a recording medium.

2. The method according to claim 1, further comprising the step of inserting a clock signal synchronous with said clock timing for said digital data in said second block.

3. The method according to claim 1, further comprising the step of inserting into a third of said blocks a control signal for processing the data contained in said first block.

4. A method of recording and reproducing a video format signal of the type having successive frames each made up of plural fields and each field having a plurality of successive lines, with each line including a horizontal synchronizing signal portion followed by an information signal portion, said video format signal containing digital data having a predetermined clock timing and synchronizing signals for determining synchronizing timing for detecting said digital data, said method comprising the steps of:

dividing a field into a plurality of blocks each containing at least one line;

generating said video format signal with said digital data included in the information signal portion of the at least one line in a first of said blocks and with synchronizing signals for determining the synchronizing timing for detecting said digital data in the information signal portion of the at least one line in a second of said blocks;

recording said video format signal on a recording medium;

reading said video format signal from said recording medium; and reproducing said digital data from the read video format signal while synchronizing said digital data in accordance with the synchronizing signals included in the read video format signal.

5. The method according to claim 4, said generating step further comprising the step of inserting into said second block a clock signal synchronous with said clock timing for said digital data and recording said second block onto said recording medium.

6. The method according to claim 4, said generating step further comprising the steps of inserting into a third of said blocks a control signal for processing said digital data in said first block and recording said first block onto said recording medium, and said reproducing step including the step of processing said digital data under the control of said control signal.

7. A method of recording a video format signal of the type having successive frames each made up of plural fields and each field having a plurality of successive lines, with each line including a horizontal synchronizing signal portion followed by an information signal portion, said video format signal containing video information corresponding to the image to be displayed, digital data, and control information for identifying a predetermined position of at least one of said video information and said digital data, said method comprising the steps of:

dividing at least one of said plural fields into a plurality of blocks each having at least one line;

generating said video format signal with information signal portions in a first block including said digital data, information signal portions in a second block including said video information, and information signal portions in a third block including said control information; and recording said video format signal on a recording medium.

8. The method according to claim 7, wherein said control information comprises a signal indicative of a position where said video information starts and a position where digital data starts following the video information.

9. The method according to claim 7, wherein said control information comprises a signal indicative of a position where said digital data ends and a position where said video information ends following the digital data.

10. A method of recording and reproducing a video format signal of the type having successive frames each made up of plural fields and each field having a plurality of successive lines, with each line including a horizontal synchronizing signal portion followed by an information signal portion, said video format signal containing video information corresponding to the image to be displayed, digital data, and control information for identifying a starting position of at least one of said video information and predetermined digital data, said method comprising the steps of:

dividing at least one of said plural fields into a plurality of blocks each having at least one line;

generating said video format signal with information signal portions in a first block including said digital data, information signal portions in a second block including said video information, and information signal portions in a third block including said control information;

recording said video format signal on a recording medium;

reading said video format signal from said recording medium; and discriminating said video information and digital data in accordance with said control information.

11. A method of recording and reproducing a video format signal of the type having successive frames each made up of plural fields and each field having a plurality of successive lines, with each line including a horizontal synchronizing signal portion followed by an information signal portion, said video format signal containing video information corresponding to the image to be displayed, a plurality of items of digital data, and control information, said method comprising the steps of:

generating said video format signal with said digital data, said video information and said control information included in information signal portions of said signal;

recording said video format signal on a recording medium;

reading said video format signal from said recording medium;

writing each of said plurality of items of digital data into a specific location of memory means;

providing an external control signal from an external source; and selecting one or more of said items of digital data, reading said one or more of said items out of said memory means and reproducing the selected items together with said video information in accordance with said control information and said external control signal.

12. The method according to claim 11, wherein said control information comprises a signal indicative of the content of said digital data, a signal indicative of the amount of said digital data, and a signal indicative of a process of combining and selecting digital data items.

13. A method of recording and reproducing a video format signal of the type having successive frames each made up of plural fields and each field having a plurality of successive lines, with each line including a horizontal synchronizing signal portion followed by an information signal portion, said video format signal containing video information corresponding to the image to be displayed, a plurality of items of digital data, and control information, said method comprising the steps of:

generating said video format signal with said digital data, said video information and said control information included in information signal portions of said signal;

recording said video format signal on a recording medium;

providing an external control signal from an external source;

selecting one or more of said items of digital data, reading said one or more of said items out of said memory means, reproducing the selected items together with said video information in accordance with said control information and said external control signal;

reading said video format signal from said recording medium;

writing said video format signal from said recording medium;

reading said video format signal from said memory means.

14. A method of recording and reproducing a video format signal of the type having successive frames each made up of plural fields and each field having a plurality of successive lines, with each line including a horizontal synchronizing signal portion followed by an information signal portion, said video format signal corresponding to a two-dimensional image and containing video information corresponding to the image to be displayed, control information and time compressed digital data, said method comprising the steps of:

dividing said two-dimensional image into a plurality of blocks each having at least one subblock and each subblock having at least one line, with at least a first of said blocks having a plurality of subblocks;

generating said video format signal with the information signal portions of each subblock in said first block including one of video information and digital data, and with video information and control information included in the remaining blocks;

recording said video format signal on a recording medium;

reading said video format signal from said recording medium; and writing said digital data from at a first subblock group of said first block into memory means;

reading the digital data out of said memory means while expanding said digital data on a time basis, and writing digital data from a second subblock group subsequent to said first subblock group into said memory means during reading of said data, whereby said digital data in said first subblock group and said second subblock group are successively reproduced.

15. The method according to claim 14, wherein said first subblock group and said second subblock group are in respective first and second frames, video information present in said second frame being reproduced while said digital data from said second subblock group is being written into said memory means and the digital data in said first subblock group is being read out of said memory means.

16. A method for recording and reproducing a video format signal on and from a recording medium, comprising the steps of:

dividing a two-dimensional screen based on the video format signal into a plurality of blocks with one of said blocks divided into a plurality of subblocks;

inserting at least one of video information and digital data into each of said subblocks, inserting video information and control information into the remaining blocks, and recording the resulting information on a recording medium; and writing said information in at least one of said subblocks into memory means in a reproduction mode, thereafter reading said information in said at least one subblock out of said memory means while expanding said information on a time basis, and writing said information next to the information in said at least one subblock into said memory means during reading said information, whereby said information in at least said one subblock and said next information are successively reproduced, wherein said control information includes successive reproduction information indicative of whether said digital data in at least said one subblock and said next digital data are to be successively reproduced or not so that said digital data in at least said one subblock and next digital data are successively reproduced according to said successive reproduction information.

17. The method according to claim 16 or 14, wherein said digital data comprises a time compressed digital data which is compressed on a time basis.

* * * * *